US012682428B2

(12) United States Patent
Shimada et al.

(10) Patent No.: US 12,682,428 B2

(45) Date of Patent: Jul. 14, 2026

(54) IMAGE PROCESSING APPARATUS, IMAGING APPARATUS, IMAGE PROCESSING METHOD, AND PROGRAM FOR OBTAINING A COMPOSITE IMAGE UTILIZING CHARACTERISTICS OF A PLURALITY OF IMAGES

(71) Applicant: FUJIFILM Corporation, Tokyo (JP)

(72) Inventors: Tomoharu Shimada, Saitama (JP); Taro Saito, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 277 days.

(21) Appl. No.: 18/350,613

(22) Filed: Jul. 11, 2023

(65) Prior Publication Data

US 2024/0037710 A1     Feb. 1, 2024

(30) Foreign Application Priority Data

Jul. 27, 2022     (JP) ................................. 2022-120029

(51) Int. Cl.
*G06T 5/50* (2006.01)
*G06T 7/13* (2017.01)
(Continued)

(52) U.S. Cl.
CPC .................. *G06T 5/50* (2013.01); *G06T 7/13* (2017.01); *G06V 10/24* (2022.01); *G06V 10/60* (2022.01);
(Continued)

(58) Field of Classification Search
None
See application file for complete search history.

(56) References Cited

U.S. PATENT DOCUMENTS 11,164,323 B2 *   11/2021   Xiang ........................ G06T 7/74
2011/0051816 A1 *   3/2011   Kitamura ............... H04N 19/61
375/E7.026
(Continued)

FOREIGN PATENT DOCUMENTS

JP       2016-156934 A       9/2016
JP       2018-206382 A       12/2018
(Continued)

OTHER PUBLICATIONS

S. Huang; Haze Removal Algorithm for Optical Remote Sensing Image Based on Multi-Scale Model and Histogram Characteristic; Aug. 2019; IEEE Access; vol. 7; p. 104179-104180; https://ieeexplore. ieee.org/stamp/stamp.jsp?tp=&arnumber=8765553 (Year: 2019).*
(Continued)

*Primary Examiner* — Joni Hsu

(74) *Attorney, Agent, or Firm* — Studebaker Brackett PLLC

(57)     ABSTRACT

The image processing apparatus includes a processor. The processor is configured to: acquire a second image, which is obtained by performing first AI processing on a first image, and a fourth image, which is obtained without performing the first AI processing on the first image or a third image; and combine the second image and the fourth image according to an indicator of the first image and/or the third image.

9 Claims, 32 Drawing Sheets

(51) Int. Cl.
    *G06V 10/24*        (2022.01)
    *G06V 10/60*        (2022.01)
    *G06V 10/74*        (2022.01)

(52) U.S. Cl.
    CPC .. *G06V 10/761* (2022.01); *G06T 2207/10036*
    (2013.01); *G06T 2207/10048* (2013.01); *G06T*
    *2207/20084* (2013.01); *G06T 2207/20221*
    (2013.01)

(56)       References Cited

U.S. PATENT DOCUMENTS

| | | | | |
|---|---|---|---|---|
| 2012/0054075 | A1* | 3/2012 | Ostroff | G06F 8/34 |
| | | | | 715/838 |
| 2013/0272490 | A1* | 10/2013 | Noguchi | G06T 11/006 |
| | | | | 378/4 |
| 2016/0248967 | A1* | 8/2016 | Sasaki | H04N 23/673 |
| 2018/0240251 | A1* | 8/2018 | Kitagawa | G06V 20/52 |
| 2018/0349759 | A1 | 12/2018 | Isogawa et al. | |
| 2019/0370586 | A1* | 12/2019 | Otsuki | G06V 10/143 |
| 2020/0213487 | A1* | 7/2020 | Nakata | H10F 39/8053 |
| 2020/0334843 | A1 | 10/2020 | Kasuya et al. | |
| 2020/0349675 | A1 | 11/2020 | Park et al. | |
| 2021/0104313 | A1 | 4/2021 | Mizobe et al. | |
| 2021/0224957 | A1 | 7/2021 | Iwase et al. | |
| 2021/0326694 | A1* | 10/2021 | Wang | G06N 3/08 |
| 2021/0390696 | A1 | 12/2021 | Iwase et al. | |
| 2021/0398259 | A1 | 12/2021 | Yamazoe et al. | |

| | | | | |
|---|---|---|---|---|
| 2022/0036573 | A1 | 2/2022 | Kim et al. | |
| 2022/0122227 | A1 | 4/2022 | Park et al. | |
| 2022/0301189 | A1* | 9/2022 | Yamada | G06T 7/248 |
| 2023/0117621 | A1 | 4/2023 | Isogawa et al. | |

FOREIGN PATENT DOCUMENTS

| | | |
|---|---|---|
| JP | 2019-124537 A | 7/2019 |
| JP | 2020-166814 A | 10/2020 |
| JP | 2020-184300 A | 11/2020 |
| JP | 2022-027464 A | 2/2022 |
| WO | 2019/026287 A1 | 2/2019 |

OTHER PUBLICATIONS

An Office Action, "Notice of Reasons for Refusal," mailed by the Japanese Patent Office on Jan. 6, 2026, which corresponds to Japanese Patent Application No. 2022-120029 and is related to U.S. Appl. No. 18/350,613; with English language translation.

Joongchol Shin et al., "Region-Based Dehazing via Dual-Supervised Triple-Convolutional Network," IEEE Transactions on Multimedia, vol. 24, IEEE, Jan. 8, 2021, https://ieeexplore.ieee.org/document/9316931, pp. 245-260.

An Office Action, "Notice of Reasons for Refusal," mailed by the Japanese Patent Office on May 26, 2026, which corresponds to Japanese Patent Application No. 2022-120029 and its related to U.S. Appl. No. 18/350,613; with English language translation.

* cited by examiner

Figure 15:
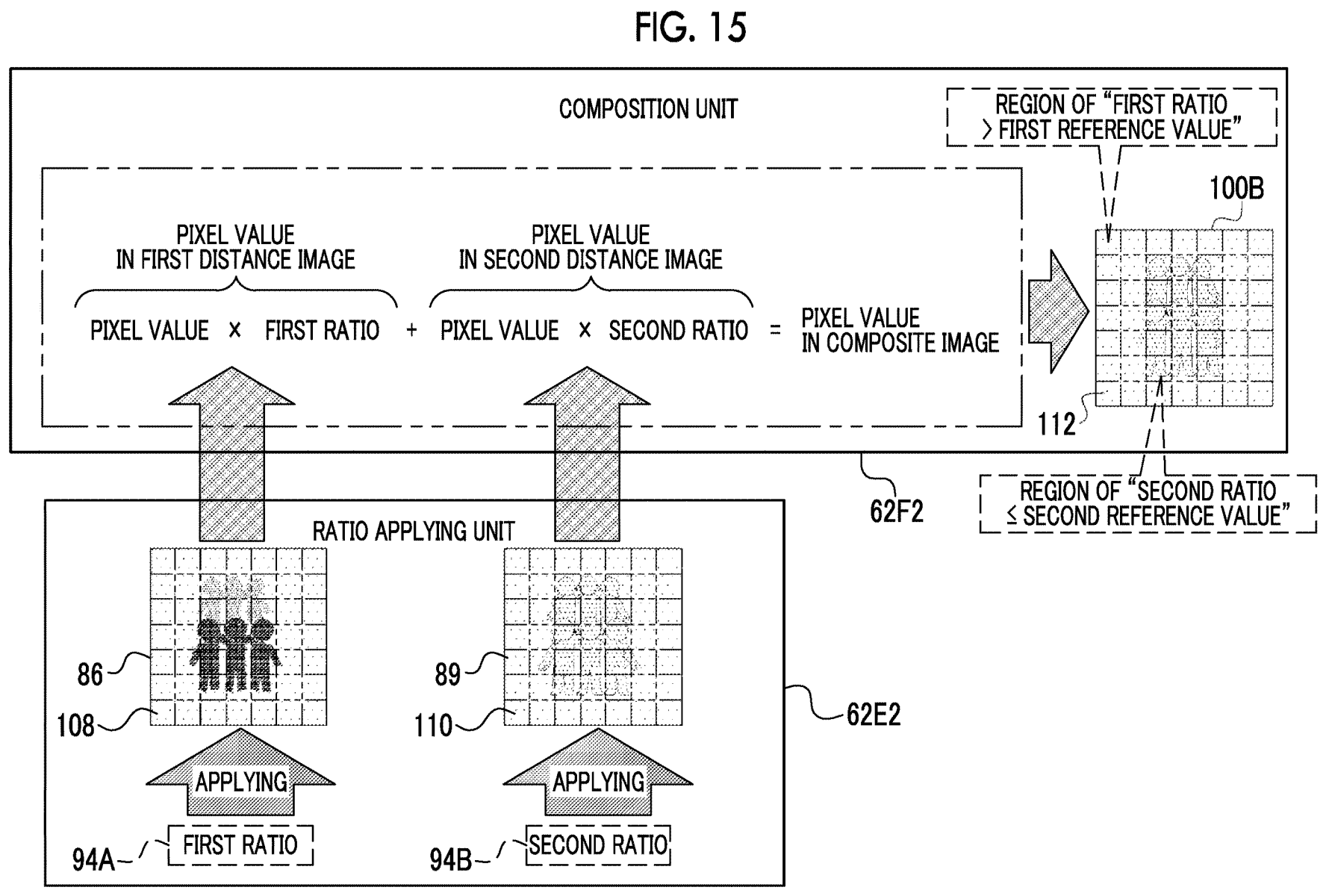

COMPOSITION UNIT

REGION OF "FIRST RATIO > FIRST REFERENCE VALUE"

REGION OF "SECOND RATIO ≤ SECOND REFERENCE VALUE"

100B

112

$$\underbrace{\text{PIXEL VALUE} \times \text{FIRST RATIO}}_{\substack{\text{PIXEL VALUE} \\ \text{IN FIRST DISTANCE IMAGE}}} + \underbrace{\text{PIXEL VALUE} \times \text{SECOND RATIO}}_{\substack{\text{PIXEL VALUE} \\ \text{IN SECOND DISTANCE IMAGE}}} = \underbrace{\text{PIXEL VALUE}}_{\substack{\text{PIXEL VALUE} \\ \text{IN COMPOSITE IMAGE}}}$$

62F2

62E2

RATIO APPLYING UNIT

APPLYING

SECOND RATIO

94B

89

110

APPLYING

FIRST RATIO

IMAGE PROCESSING APPARATUS, IMAGING APPARATUS, IMAGE PROCESSING METHOD, AND PROGRAM FOR OBTAINING A COMPOSITE IMAGE UTILIZING CHARACTERISTICS OF A PLURALITY OF IMAGES

CROSS-REFERENCE TO RELATED APPLICATIONS

This application claims priority under 35 USC 119 from Japanese Patent Application No. 2022-120029 filed on Jul. 27, 2022, the disclosure of which is incorporated by reference herein.

BACKGROUND

1. Technical Field

The technology of the present disclosure relates to an image processing apparatus, an imaging apparatus, an image processing method, and a program.

2. Related Art

JP2018-206382A discloses an image processing system including a processing unit that performs processing on an input image, which is input to an input layer, by using a neural network having the input layer, an output layer, and an interlayer provided between the input layer and the output layer, and an adjustment unit that adjusts internal parameters calculated by learning, which are at least one internal parameter of one or more nodes included in the interlayer, based on data related to the input image in a case where the processing is performed after the learning.

Further, in the image processing system described in JP2018-206382A, the input image is an image that includes noise, and the noise is removed or reduced from the input image by the processing performed by the processing unit.

Further, in the image processing system described in JP2018-206382A, the neural network includes a first neural network, a second neural network, a division unit that divides the input image into a high-frequency component image and a low-frequency component image and inputs the high-frequency component image to the first neural network while inputting the low-frequency component image to the second neural network, and a composition unit that combines a first output image output from the first neural network and a second output image output from the second neural network, and an adjustment unit adjusts the internal parameters of the first neural network based on the data related to the input image while not adjusting the internal parameters of the second neural network.

Further, JP2018-206382A discloses the image processing system including the processing unit that generates an output image in which the noise is reduced from the input image by using a neural network and the adjustment unit that adjusts the internal parameters of the neural network according to an imaging condition of the input image.

JP2020-166814A discloses a medical image processing apparatus including an acquisition unit that acquires a first image, which is a medical image of a predetermined portion of a subject, a high image quality unit that generates a second image, which has higher image quality than that of the first image, from the first image by using a high image quality engine including a machine learning engine, and a display control unit that displays a composite image, which is obtained by combining the first image and the second image based on a ratio obtained by using information related to at least a part of a region of the first image, on a display unit.

JP2020-184300A discloses an electronic apparatus including a memory that stores at least one command and a processor that is electrically connected to the memory, obtains a noise map, which indicates a input image quality, from the input image by executing the command, applies the input image and the noise map to a learning network model including a plurality of layers, and obtains an output image having improved input image quality, in which the processor provides a noise map to at least one interlayer among a plurality of layers, and the learning network model is a trained artificial intelligence model obtained by training a relationship between a plurality of sample images, and the noise map for each sample image and an original image for each sample image, by using an artificial intelligence algorithm.

SUMMARY

One embodiment according to the present disclosed technology provides an image processing apparatus, an imaging apparatus, an image processing method, and a program capable of obtaining a composite image utilizing characteristics of a plurality of images that are composition targets.

An image processing apparatus according to a first aspect of the present disclosed technology comprises: a processor, in which the processor is configured to: acquire a second image, which is obtained by performing first AI processing on a first image, and a fourth image, which is obtained without performing the first AI processing on the first image or a third image; and combine the second image and the fourth image according to an indicator of the first image and/or the third image.

A second aspect according to the present disclosed technology is the image processing apparatus according to the first aspect, in which the third image is an image in which a content of the first image is represented by a different representation method.

A third aspect according to the present disclosed technology is the image processing apparatus according to the first or second aspect, in which the fourth image is an image that shows a distribution of distances with respect to a subject.

A fourth aspect according to the present disclosed technology is the image processing apparatus according to the first aspect, in which the second image and the fourth image are combined at a ratio obtained in accordance with a reliability degree derived based on the indicator.

A fifth aspect according to the present disclosed technology is the image processing apparatus according to the fourth aspect, in which the reliability degree is obtained based on a processing result of non-AI processing.

A sixth aspect according to the present disclosed technology is the image processing apparatus according to the fifth aspect, in which the non-AI processing is performed on the first image and/or the third image.

A seventh aspect according to the present disclosed technology is the image processing apparatus according to any one of the fourth to sixth aspects, in which the reliability degree is derived by using a trained model.

An eighth aspect according to the present disclosed technology is the image processing apparatus according to the seventh aspect, in which the trained model is a reliability degree network, and the reliability degree network is a neural network that outputs the reliability degree.

A ninth aspect according to the present disclosed technology is the image processing apparatus according to any one of the fourth to eighth aspects, in which the reliability degree is one value assigned to the first image and/or the third image, and the second image and the fourth image are combined at one of the ratios corresponding to the reliability degree.

A tenth aspect according to the present disclosed technology is the image processing apparatus according to any one of the fourth to ninth aspects, in which the reliability degree includes a first reliability degree indicating a reliable degree with respect to the first image and/or a second reliability degree indicating a reliable degree with respect to the third image.

An eleventh aspect according to the present disclosed technology is the image processing apparatus according to the tenth aspect, in which the first reliability degree is a plurality of first division reliability degrees, the plurality of first division reliability degrees correspond to a plurality of first image regions in the first image, and the first division reliability degree is a reliable degree with respect to the corresponding first image region.

A twelfth aspect according to the present disclosed technology is the image processing apparatus according to the eleventh aspect, in which the plurality of first division reliability degrees are distributed with respect to the plurality of first image regions.

A thirteenth aspect according to the present disclosed technology is the image processing apparatus according to the eleventh or twelfth aspect, in which in a case where the second image and the fourth image are combined, an image region in the second image, which corresponds to the first image region where the first division reliability degree exceeds a first reference value in a first reliability degree map that represents a correspondence relationship between the plurality of first division reliability degrees and the plurality of first image regions, is combined at a ratio higher than a corresponding image region in a fourth image.

A fourteenth aspect according to the present disclosed technology is the image processing apparatus according to the thirteenth aspect, in which the image region in the fourth image is used in a first specific image region in a composite image in which the second image and the fourth image are combined, without using the image region in the second image, and the image region in the fourth image, which is used in the first specific image region, is a region that corresponds to the first image region where the first division reliability degree is equal to or less than a second reference value, which is a value less than the first reference value.

A fifteenth aspect according to the present disclosed technology is the image processing apparatus according to any one of the tenth to fourteenth aspects, in which the second reliability degrees are a plurality of second division reliability degrees, the plurality of second division reliability degrees correspond to a plurality of second image regions in the third image, and the second division reliability degree is a reliable degree with respect to the corresponding second image region.

A sixteenth aspect according to the present disclosed technology is the image processing apparatus according to the fifteenth aspect, in which the plurality of second division reliability degrees are distributed with respect to the plurality of second image regions.

A seventeenth aspect according to the present disclosed technology is the image processing apparatus according to the fifteenth or sixteenth aspect, in which in a case where the second image and the fourth image are combined, an image region in the fourth image, which corresponds to the second image region where the second division reliability degree exceeds a third reference value in a second reliability degree map that represents a correspondence relationship between the plurality of second division reliability degrees and the plurality of second image regions, is combined at a ratio higher than a corresponding image region in a second image.

An eighteenth aspect according to the present disclosed technology is the image processing apparatus according to the seventeenth aspect, in which the image region in the second image is used in a second specific image region in a composite image in which the second image and the fourth image are combined, without using the image region in the fourth image, and the image region in the second image, which is used in the second specific image region, is a region that corresponds to the second image region where the second division reliability degree is equal to or less than a fourth reference value, which is a value less than the third reference value.

A nineteenth aspect according to the present disclosed technology is the image processing apparatus according to any one of the first to eighteenth aspects, in which the fourth image is an image on which non-AI method processing that plays the same role as the first AI processing is not performed.

A twentieth aspect according to the present disclosed technology is the image processing apparatus according to any one of the first to nineteenth aspects, in which a composition of the second image and the fourth image is implemented by performing a product-sum operation of the second image and the fourth image.

A twenty-first aspect according to the present disclosed technology is the image processing apparatus according to any one of the first to twentieth aspects, in which the indicator is information that is capable of being mapped.

A twenty-second aspect according to the present disclosed technology is the image processing apparatus according to any one of the first to twenty-first aspects, in which in a case where a dimension of the second image and a dimension of the fourth image are different from each other, the second image and the fourth image are combined after aligning one of the dimensions of the second image and the fourth image with the other of the dimensions.

A twenty-third aspect according to the present disclosed technology is the image processing apparatus according to the twenty-second aspect, in which normalization processing is performed as processing of aligning the one of the dimensions with the other of the dimensions, the normalization processing is processing of normalizing the second image or the fourth image based on a plurality of first representative values corresponding to a plurality of third image regions in the second image and on a plurality of second representative values corresponding to a plurality of fourth image regions in the fourth image, and the plurality of third image regions and the plurality of fourth image regions are similar to each other to a degree exceeding a first similarity degree.

A twenty-fourth aspect according to the present disclosed technology is the image processing apparatus according to the twenty-second aspect, in which normalization processing is performed as processing of aligning the one of the dimensions with the other of the dimensions, the normalization processing is processing of normalizing the second image or the fourth image based on a plurality of third representative values within a single fifth image region in the second image and on a plurality of fourth representative values within a single sixth image region in the fourth image, and the fifth image region and the sixth image region are similar to each other to a degree exceeding a second similarity degree.

A twenty-fifth aspect according to the present disclosed technology is the image processing apparatus according to any one of the first to twenty-fourth aspects, in which the first image is a captured image obtained by imaging a subject, the first AI processing includes distance image generation processing of generating a first distance image that shows a distribution of distances from imaging positions to the subject, and the fourth image is a second distance image that shows a distribution of results obtained by performing a distance measurement on the subject.

A twenty-sixth aspect according to the present disclosed technology is the image processing apparatus according to the twenty-fifth aspect, in which the indicator includes an edge region in the captured image.

A twenty-seventh aspect according to the present disclosed technology is the image processing apparatus according to the twenty-sixth aspect, in which in a case where the second image and the fourth image are combined, a first edge corresponding region, which is an image region that corresponds to the edge region in the second distance image, is combined at a higher ratio than a second edge corresponding region, which is an image region that corresponds to the edge region in the first distance image.

A twenty-eighth aspect according to the present disclosed technology is the image processing apparatus according to any one of the twenty-fifth to twenty-seventh aspects, in which the indicator includes a non-edge region in the captured image.

A twenty-ninth aspect according to the present disclosed technology is the image processing apparatus according to the twenty-eighth aspect, in which in a case where the second image and the fourth image are combined, a first non-edge corresponding region, which is an image region that corresponds to the non-edge region in the first distance image, is combined at a higher ratio than a second non-edge corresponding region, which is an image region that corresponds to the non-edge region in the second distance image.

A thirtieth aspect according to the present disclosed technology is the image processing apparatus according to any one of the first to twenty-ninth aspects, in which the first image is an image obtained by imaging a subject that includes an environmental phenomenon and a moving body, the fourth image is an image obtained by performing non-AI method processing of reducing reflection of the environmental phenomenon from the first image, the indicator includes information that is capable of specifying whether or not the moving body is captured in the first image, and in a case where specification is made that the moving body is captured in the first image based on the indicator, and the second image and the fourth image are combined, an image region in the second image, where the moving body is captured, is combined at a higher ratio than an image region in the fourth image, where the moving body is captured.

A thirty-first aspect according to the present disclosed technology is the image processing apparatus according to any one of the first to thirtieth aspects, in which the first image is an image obtained by imaging a subject that includes haze, the fourth image is an image obtained by performing non-AI method processing of reducing reflection of the haze from the first image, the second image is an image in which the reflection of the haze is reduced from the first image by performing the first AI processing on the first image, the indicator includes information that is capable of specifying a haze region, which is an image region in the first image where the haze is captured, and in a case where the second image and the fourth image are combined, an image region in the fourth image, which corresponds to the haze region specified based on the indicator, is combined at a higher ratio than an image region in the second image, which corresponds to the haze region specified based on the indicator.

A thirty-second aspect according to the present disclosed technology is the image processing apparatus according to any one of the first to thirty-first aspects, in which the third image is an infrared light image obtained by imaging an imaging target region, the fourth image is a first temperature distribution image that shows a distribution of temperature within the imaging target region and that is based on the infrared light image, the second image is a second temperature distribution image that shows a distribution of temperature within the imaging target region and that is obtained by performing the first AI processing on the first image, the indicator includes information that is capable of distinguishing between a first region, which is an image region showing a thermal radiator that is not captured in the first temperature distribution image, and a second region, which is an image region other than the first region, in the second temperature distribution image, and in a case where the second image and the fourth image are combined, and based on the indicator, an image region in the first temperature distribution image, which corresponds to the second region, is combined at a higher ratio than the second region, and the first region is combined at a higher ratio than an image region in the first temperature distribution image, which corresponds to the first region.

A thirty-three aspect according to the present disclosed technology is the image processing apparatus according to any one of the first to thirty-two aspects, in which the third image is a multispectral image obtained by imaging a subject, the fourth image is an image based on the multispectral image, the second image is an image obtained by performing the first AI processing on the multispectral image, the indicator includes information that is capable of distinguishing between a specific subject region, which is an image region that shows a specific subject, and a non-specific subject region, which is an image region other than the specific subject region, in the second image, and in a case where the second image and the fourth image are combined, and based on the indicator, an image region in the fourth image, which corresponds to the non-specific subject region, is combined at a higher ratio than the non-specific subject region, and the specific subject region is combined at a higher ratio than an image region in the fourth image, which corresponds to the specific subject region.

An image processing apparatus according to a thirty-fourth aspect of the present disclosed technology comprises: a processor, in which the processor is configured to: acquire a second image, which is obtained by performing first AI processing on a first image, and a fourth image, which is obtained without performing the first AI processing on a third image; and combine the second image and the fourth image according to an indicator of the third image.

An imaging apparatus according to a thirty-fifth aspect of the present disclosed technology comprises: the image processing apparatus according to any one of the first to thirty-fourth aspects; and an image sensor, in which the first image is an image obtained by being captured by the image sensor.

An image processing method according to a thirty-sixth aspect of the present disclosed technology comprises: acquiring a second image, which is obtained by performing first AI processing on a first image, and a fourth image, which is obtained without performing the first AT processing on the first image or a third image; and combining the second image and the fourth image according to an indicator of the first image and/or the third image.

A program according to a thirty-seventh aspect of the present disclosed technology causing a computer to execute a process comprises: acquiring a second image, which is obtained by performing first AT processing on a first image, and a fourth image, which is obtained without performing the first AT processing on the first image or a third image; and combining the second image and the fourth image according to an indicator of the first image and/or the third image.

BRIEF DESCRIPTION OF THE DRAWINGS

Exemplary embodiments of the technology of the disclosure will be described in detail based on the following figures, wherein:

FIG. 3 is a schematic configuration diagram showing an example of hardware configurations of an optical system and an electrical system of the imaging apparatus;

FIG. 4 is a block diagram showing an example of a function of an image processing engine;

FIG. 5 is a conceptual diagram showing an example of the content of processing of an AI method processing unit and a reliability degree map generation unit according to a first embodiment;

FIG. 14 is a conceptual diagram showing an example of the content of processing of a ratio applying unit according to the fourth embodiment;

FIG. 15 is a conceptual diagram showing an example of the content of processing of the composition unit according to the fourth embodiment;

FIG. 16 is a conceptual diagram showing an example of the content of processing of the reliability degree map generation unit according to a fifth embodiment;

FIG. 17 is a conceptual diagram showing an example of the content of processing of the ratio applying unit according to the fifth embodiment;

FIG. 18 is a conceptual diagram showing an example of the content of processing of the composition unit according to the fifth embodiment;

FIG. 19 is a conceptual diagram showing an example of content of processing of the AI method processing unit and a moving body detection unit according to a sixth embodiment;

FIG. 21 is a conceptual diagram showing an example of the content of processing of the non-AI method processing unit according to the sixth embodiment;

FIG. 27 is a conceptual diagram showing an example of the content of processing of the non-AI method processing unit according to the eighth embodiment;

FIG. 28 is a conceptual diagram showing an example of the content of processing of the AI method processing unit and the reliability degree map generation unit according to the eighth embodiment;

DETAILED DESCRIPTION

Hereinafter, an example of an embodiment of an image processing apparatus, an imaging apparatus, an image processing method, and a program according to the present disclosed technology will be described with reference to the accompanying drawings.

First, the wording used in the following description will be described.

CPU refers to an abbreviation of a "Central Processing Unit". GPU refers to an abbreviation of a "Graphics Processing Unit". TPU refers to an abbreviation of a "Tensor processing unit". NVM refers to an abbreviation of a "Non-volatile memory". RAM refers to an abbreviation of a "Random Access Memory". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". I/F refers to an abbreviation of an "Interface". UI refers to an abbreviation of a "User Interface". fps refers to an abbreviation of a "frame per second". MF refers to an abbreviation of "Manual Focus". AF refers to an abbreviation of "Auto Focus". CMOS refers to an abbreviation of a "Complementary Metal Oxide Semiconductor". CCD refers to an abbreviation of a "Charge Coupled Device". LAN refers to an abbreviation of a "Local Area Network". WAN refers to an abbreviation of a "Wide Area Network". AI refers to an abbreviation of "Artificial Intelligence". A/D refers to an abbreviation of "Analog/Digital". FIR refers to an abbreviation of a "Finite Impulse Response". IIR refers to an abbreviation of an "Infinite Impulse Response". VAE is an abbreviation for "Variational Auto-Encoder". GAN refers to an abbreviation for a "Generative Adversarial Network".

First Embodiment

Figure 1:
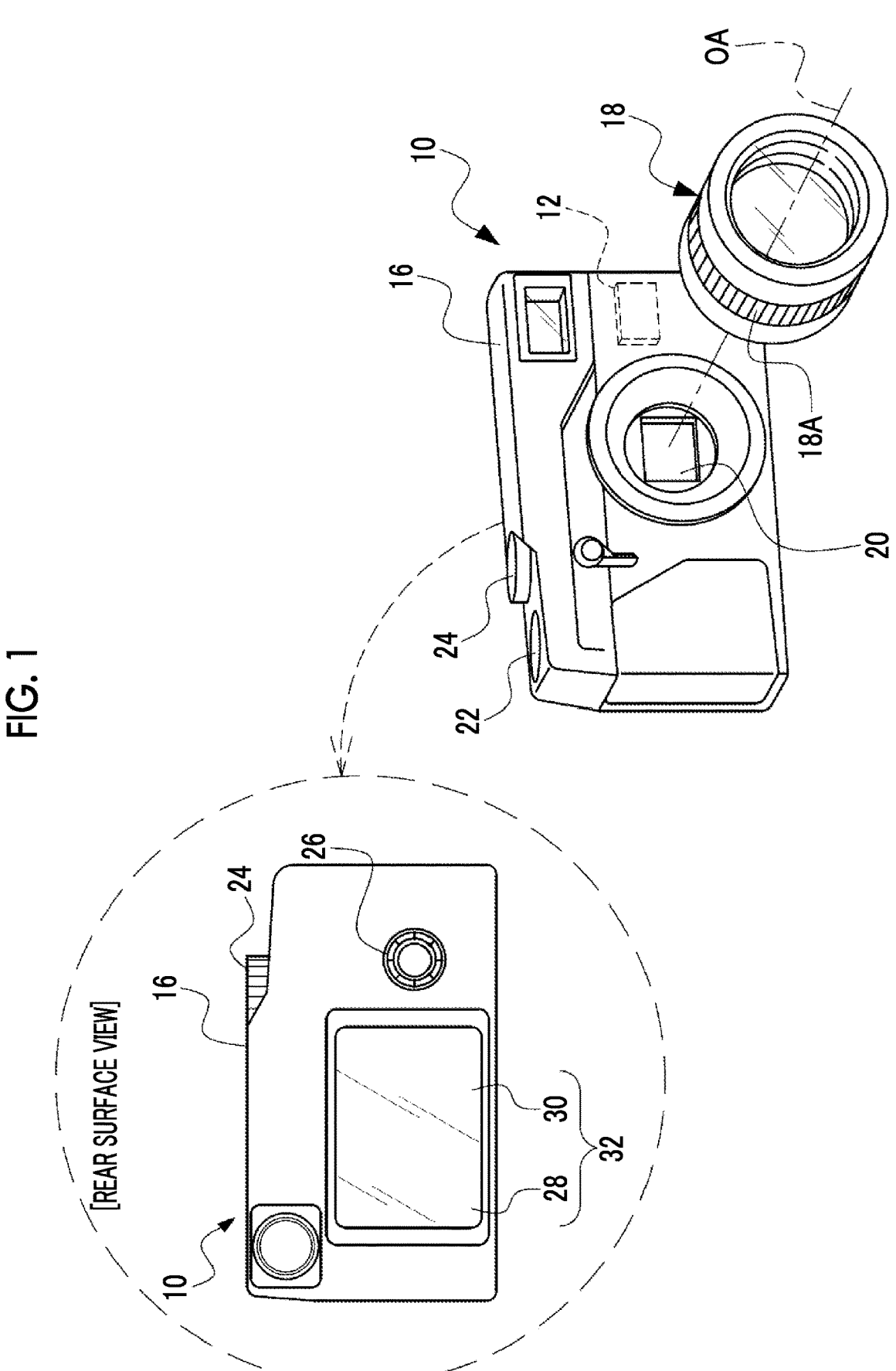
FIG. 1 is a schematic configuration diagram showing an example of a configuration of an entire imaging apparatus.

As an example shown in FIG. 1, the imaging apparatus 10 is an apparatus for imaging a subject and includes an image processing engine 12, an imaging apparatus main body 16, and an interchangeable lens 18. The imaging apparatus 10 is an example of an "imaging apparatus" according to the present disclosed technology. The image processing engine 12 is an example of an "image processing apparatus" and a "computer" according to the present disclosed technology.

The image processing engine 12 is built into the imaging apparatus main body 16 and controls the entire imaging apparatus 10. The interchangeable lens 18 is interchangeably attached to the imaging apparatus main body 16. The interchangeable lens 18 is provided with a focus ring 18A. In a case where a user or the like of the imaging apparatus 10 (hereinafter, simply referred to as the "user") manually adjusts the focus on the subject by the imaging apparatus 10, the focus ring 18A is operated by the user or the like.

In the example shown in FIG. 1, a lens-interchangeable digital camera is shown as an example of the imaging apparatus 10. However, this is only an example, and a digital camera with a fixed lens may be used or a digital camera, which is built into various types of electronic devices such as a smart device, a wearable terminal, a cell observation device, an ophthalmologic observation device, endoscope, or a surgical microscope may be used.

An image sensor 20 is provided in the imaging apparatus main body 16. The image sensor 20 is an example of an "image sensor" according to the present disclosed technology.

The image sensor 20 is a CMOS image sensor. The image sensor 20 generates and outputs image data indicating an image by imaging the subject. In a case where the interchangeable lens 18 is attached to the imaging apparatus main body 16, subject light indicating the subject is transmitted through the interchangeable lens 18 and formed on the image sensor 20, and then image data is generated by the image sensor 20.

In the present first embodiment, although the CMOS image sensor is exemplified as the image sensor 20, the present disclosed technology is not limited to this, for example, the present disclosed technology is established even in a case where the image sensor 20 is another type of image sensor such as a CCD image sensor.

A release button 22 and a dial 24 are provided on an upper surface of the imaging apparatus main body 16. The dial 24 is operated in a case where an operation mode of the imaging system, an operation mode of a playback system, and the like are set, and by operating the dial 24, an imaging mode, a playback mode, and a setting mode are selectively set as the operation mode in the imaging apparatus 10. The imaging mode is an operation mode in which the imaging is performed with respect to the imaging apparatus 10. The playback mode is an operation mode for playing the image (for example, a still image and/or a moving image) obtained by the performance of the imaging for recording in the imaging mode. The setting mode is an operation mode for setting the imaging apparatus 10 in a case where various types of set values used in the control related to the imaging are set.

The release button 22 functions as an imaging preparation instruction unit and an imaging instruction unit, and is capable of detecting a two-step pressing operation of an imaging preparation instruction state and an imaging instruction state. The imaging preparation instruction state refers to a state in which the release button 22 is pressed, for example, from a standby position to an intermediate position (half pressed position), and the imaging instruction state refers to a state in which the release button 22 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 22, and the imaging instruction state may be a state in which the operating user's finger is moved from the state of being in contact with the release button 22 to the state of being away from the release button 22.

An instruction key 26 and a touch panel display 32 are provided on a rear surface of the imaging apparatus main body 16.

Figure 3:
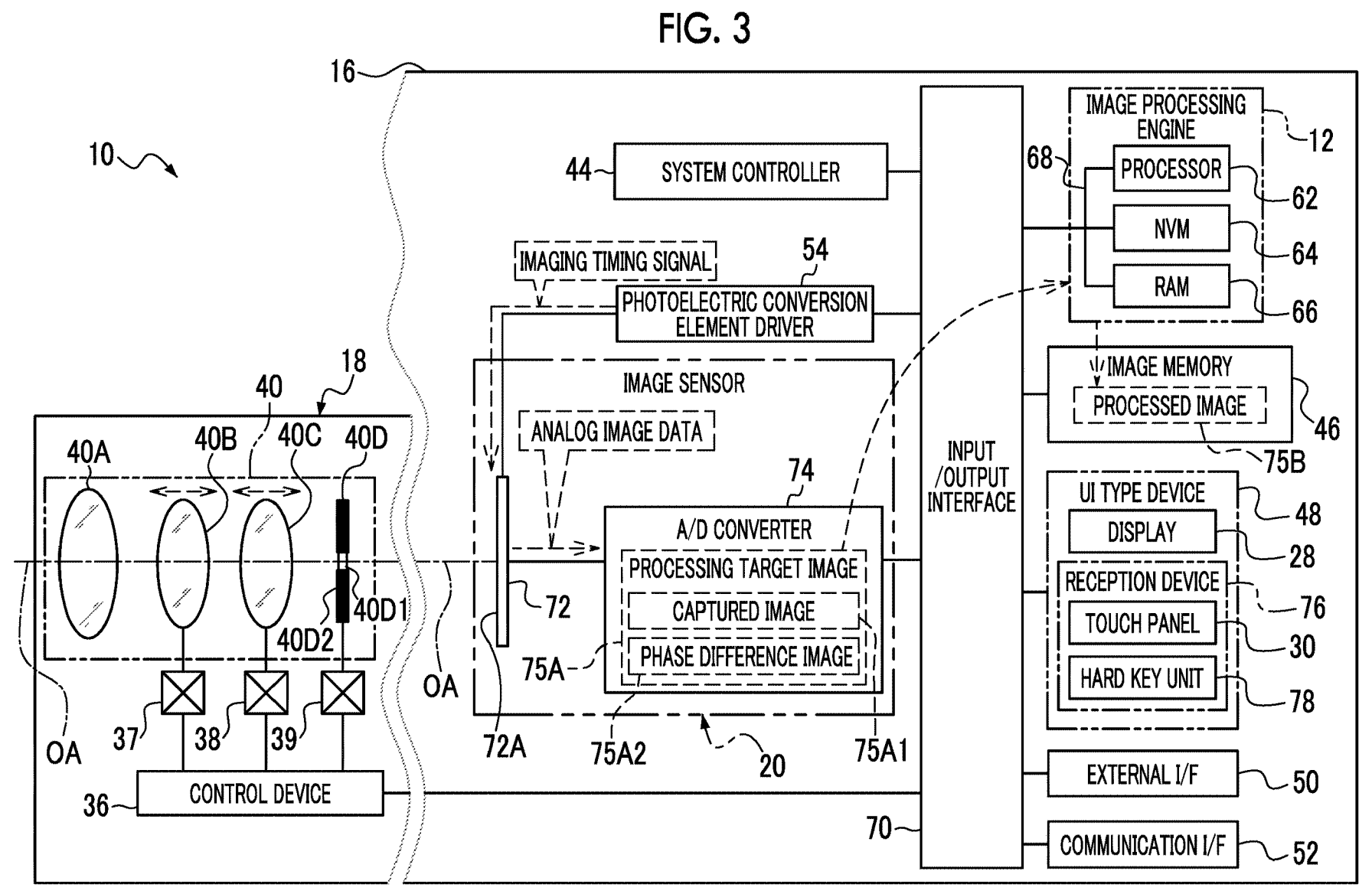

The touch panel display 32 includes a display 28 and a touch panel 30 (see also FIG. 3). Examples of the display 28 include an EL display (for example, an organic EL display or an inorganic EL display). The display 28 may not be an EL display but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. Here, the "live view image" refers to a moving image for display based on the image data obtained by being imaged by the image sensor 20. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

The display 28 is also used for displaying a still image obtained by the performance of the imaging for a still image in a case where an instruction for performing the imaging for a still image is provided to the imaging apparatus 10 via the release button 22. The display 28 is also used for displaying a playback image or the like in a case where the imaging apparatus 10 is in the playback mode. Further, the display 28 is also used for displaying a menu screen where various menus can be selected and displaying a setting screen for setting the various types of set values used in control related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" includes a state in which the user turns on a softkey for starting the imaging via the touch panel 30.

In the present first embodiment, although an out-cell type touch panel display in which the touch panel 30 is superimposed on the surface of the display region of the display 28 is exemplified as an example of the touch panel display 32, this is only an example. For example, as the touch panel display 32, an on-cell type or in-cell type touch panel display can be applied.

The instruction key 26 receives various types of instructions. Here, the "various instructions" refer to, for example, various types of instructions such as an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

Figure 2:
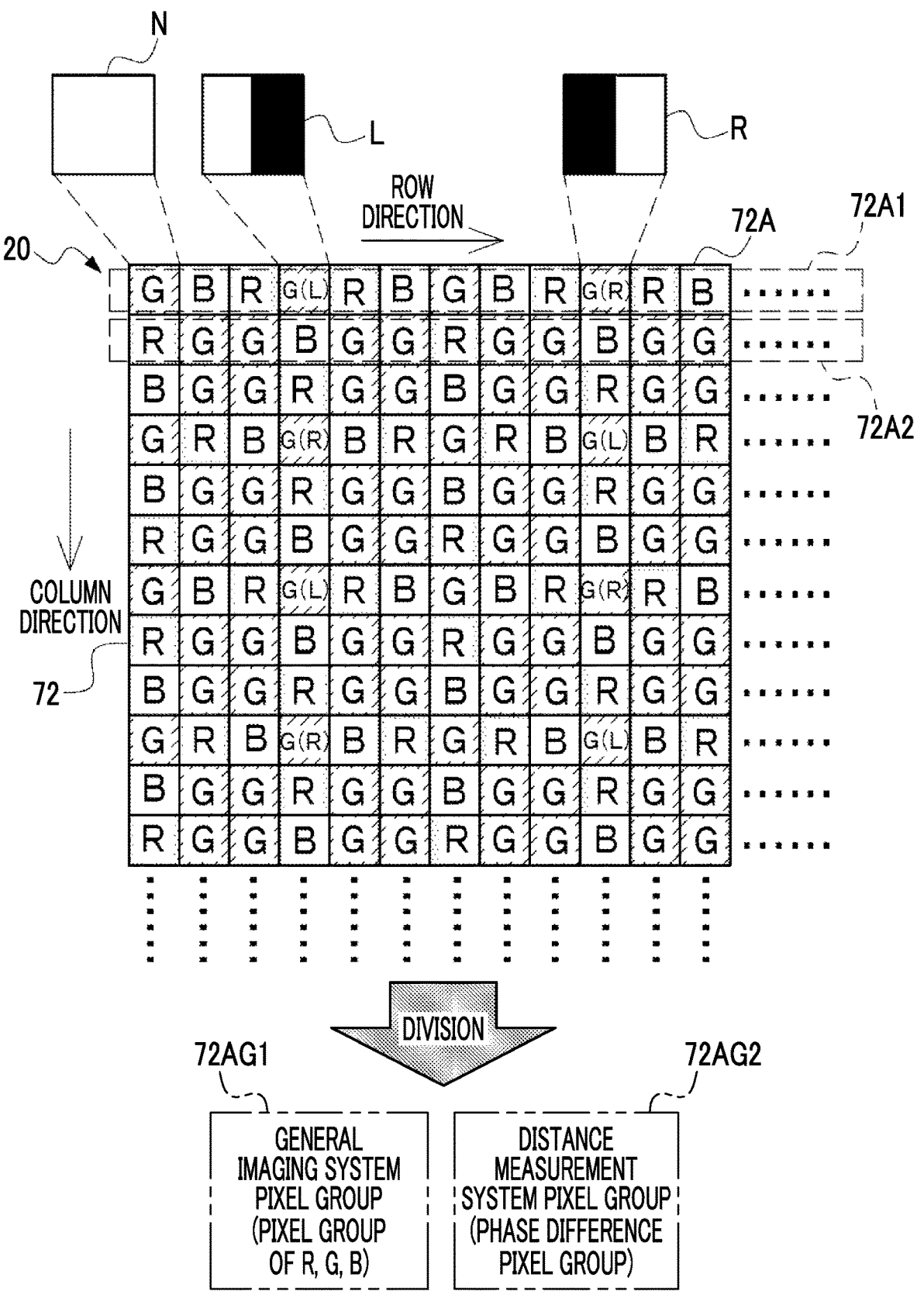
FIG. 2 is a conceptual diagram showing an example of an arrangement of a pixel group constituting a photoelectric conversion element of an image sensor.

As an example shown in FIG. 2, the image sensor 20 includes photoelectric conversion elements 72. The photoelectric conversion element 72 includes a plurality of photosensitive pixels arranged in a matrix shape. The photosensitive pixel is a physical pixel having a photodiode, which photoelectrically converts the received light and outputs an electric signal according to the light-receiving amount.

Further, color filters are arranged in a default pattern arrangement (for example, Bayer arrangement, G stripe R/G complete checkered pattern, X-Trans (registered trademark) arrangement, honeycomb arrangement, or the like) on each photodiode included in the photoelectric conversion element 72. The color filter includes a G filter corresponding to a G (green) wavelength range, an R filter corresponding to an R (red) wavelength range, and a B filter corresponding to a B (blue) wavelength range, which contribute most to obtaining a brightness signal.

The photoelectric conversion element 72 includes two types of photosensitive pixels, that is, a phase difference pixel and a non-phase difference pixel N, which is a pixel different from the phase difference pixel. In contrast to the phase difference pixel, the non-phase difference pixel N is also referred to as a normal pixel. The photoelectric conversion element 72 includes three types of photosensitive pixels of an R pixel, a G pixel, and a B pixel, as the non-phase difference pixel. The R pixel, the G pixel, the B pixel, and the phase difference pixel are regularly arranged in each of a row direction (for example, the horizontal direction) and a column direction (for example, the vertical direction) with a default periodicity. The R pixel is a pixel corresponding to the photodiode on which an R filter is disposed, the G pixel and the phase difference pixel are pixels corresponding to photodiodes on which a G filter is disposed, and the B pixel is a pixel corresponding to the photodiode on which a B filter is disposed. In the following, for convenience of description, in a case where it is not necessary to distinguish among the R pixel, the G pixel, and the B pixel, these are referred to as "visible light pixels".

A plurality of phase difference pixel lines 72A1 and a plurality of non-phase difference pixel lines 72A2 are arranged on the light-receiving surface 72A of the photoelectric conversion element 72. The phase difference pixel line 72A1 is a horizontal line including a phase difference pixel. Specifically, the phase difference pixel line 72A1 is a horizontal line in which the phase difference pixels and the non-phase difference pixels N are mixed. The non-phase difference pixel line 72A2 is a horizontal line including only a plurality of non-phase difference pixels N.

On the light-receiving surface 72A, the phase difference pixel lines 72A1 and the non-phase difference pixel lines 72A2 for a default number of lines are alternately arranged along the column direction. The "default number of lines" mentioned here refers to, for example, two lines. Note that, although two lines are illustrated here as the default number of lines, the present disclosed technology is not limited to this, and the default number of lines may be three lines or more, or ten-odd lines, tens of lines, or hundreds of lines.

The phase difference pixel lines 72A1 are arranged by skipping two rows in the column direction from the first row to the last row. Some pixels of the phase difference pixel line 72A1 are phase difference pixels. Specifically, the phase difference pixel line 72A1 is the horizontal line in which the phase difference pixels and the non-phase difference pixels N are periodically arranged. The phase difference pixel is roughly classified into a first phase difference pixel L and a second phase difference pixel R. In the phase difference pixel line 72A1, the first phase difference pixels L and the second phase difference pixels R are alternately arranged as G pixels at intervals of several pixels in the line direction.

The first phase difference pixel L and the second phase difference pixel R are arranged so as to appear alternately in the column direction. In the example shown in FIG. 2, in the fourth column, the first phase difference pixel L, the second phase difference pixel R, the first phase difference pixel L, and the second phase difference pixel R are arranged in this order along the column direction from the first row. That is, the first phase difference pixels L and the second phase difference pixels R are alternately arranged along the column direction from the first row. Further, in the example shown in FIG. 2, in the tenth column, the second phase difference pixel R, the first phase difference pixel L, the second phase difference pixel R, and the first phase difference pixel L are arranged in this order along the column direction from the first row. That is, the second phase difference pixels R and the first phase difference pixels L are alternately arranged along the column direction from the first row.

The photoelectric conversion element 72 is divided into two pixel groups. That is, the photoelectric conversion element 72 includes a general imaging system pixel group 72AG1 and a distance measurement system pixel group 72AG2. The general imaging system pixel group 72AG1 and the distance measurement system pixel group 72AG2 receive visible light and output an electric signal according to the light-receiving amount.

The general imaging system pixel group 72AG1 is a visible light pixel group composed of a plurality of visible light pixels and is used for generating a visible light image. The distance measurement system pixel group 72AG2 is a phase difference pixel group composed of a plurality of phase difference pixels arranged two-dimensionally and is used for distance measurement. Note that, the distance measurement system pixel group may be any pixel group capable of being used for distance measurement, and for example, the pixels that are used in the distance measurement system pixel group may be pixels including a plurality of photodiodes, such as dual pixels or quad pixels.

In the present first embodiment, the distance measurement refers to the measurement of a distance from the light-receiving surface 72A to the subject. The distance measurement is executed in response to an instruction given by the user via the release button 22 and/or the touch panel display 32 or the like.

As an example shown in FIG. 3, the photoelectric conversion elements 72 are disposed in the imaging apparatus main body 16 such that the center of the light-receiving surface 72A and an optical axis OA coincide with each other. The subject light is formed on the light-receiving surface 72A via the interchangeable lens 18.

The interchangeable lens 18 includes an imaging lens 40. The imaging lens 40 has an objective lens 40A, a focus lens 40B, a zoom lens 40C, and a stop 40D. The objective lens 40A, the focus lens 40B, the zoom lens 40C, and the stop 40D are disposed in the order of the objective lens 40A, the focus lens 40B, the zoom lens 40C, and the stop 40D along the optical axis OA from the subject side (that is, object side) to the imaging apparatus main body 16 side (that is, image side).

Further, the interchangeable lens 18 includes a control device 36, a first actuator 37, a second actuator 38, and a third actuator 39. The control device 36 controls the entire interchangeable lens 18 according to the instruction from the imaging apparatus main body 16. The control device 36 is a device having a computer including, for example, a CPU, an NVM, a RAM, and the like. The NVM of the control device 36 is, for example, an EEPROM. Further, the RAM of the control device 36 temporarily stores various types of information and is used as a work memory. In the control device 36, the CPU reads a necessary program from the NVM and executes the read various types of programs on the RAM to control the entire imaging lens 40.

Although a device having a computer is exemplified here as an example of the control device 36, this is only an example, and a device including an ASIC, FPGA, and/or PLD may be applied. Further, as the control device 36, for example, a device implemented by a combination of a hardware configuration and a software configuration may be used.

The first actuator 37 includes a slide mechanism for focus (not shown) and a motor for focus (not shown). The focus lens 40B is attached to the slide mechanism for focus so as to be slidable along the optical axis OA. Further, the motor for focus is connected to the slide mechanism for focus, and the slide mechanism for focus operates by receiving the power of the motor for focus to move the focus lens 40B along the optical axis OA.

The second actuator 38 includes a slide mechanism for zoom (not shown) and a motor for zoom (not shown). The zoom lens 40C is attached to the slide mechanism for zoom so as to be slidable along the optical axis OA. Further, the motor for zoom is connected to the slide mechanism for zoom, and the slide mechanism for zoom operates by receiving the power of the motor for zoom to move the zoom lens 40C along the optical axis OA.

The third actuator 39 includes a power transmission mechanism (not shown) and a motor for stop (not shown). The stop 40D has an opening 40D1 and is a stop in which the size of the opening 40D1 is variable. The opening 40D1 is formed by a plurality of stop leaf blades 40D2, for example. The plurality of stop leaf blades 40D2 are connected to the power transmission mechanism. Further, the motor for stop is connected to the power transmission mechanism, and the power transmission mechanism transmits the power of the motor for stop to the plurality of stop leaf blades 40D2. The plurality of stop leaf blades 40D2 receives the power that is transmitted from the power transmission mechanism and changes the size of the opening 40D1 by being operated. The stop 40D adjusts the exposure by changing the size of the opening 40D1.

The motor for focus, the motor for zoom, and the motor for stop are connected to the control device 36, and the control device 36 controls each drive of the motor for focus, the motor for zoom, and the motor for stop. In the present first embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 36. Although an example in which the motor for focus, the motor for zoom, and the motor for stop are provided in the interchangeable lens 18 has been described here, this is only an example, and at least one of the motor for focus, the motor for zoom, or the motor for stop may be provided in the imaging apparatus main body 16. The constituent and/or operation method of the interchangeable lens 18 can be changed as needed.

In the imaging apparatus 10, in the case of the imaging mode, an MF mode and an AF mode are selectively set according to the instructions provided to the imaging apparatus main body 16. The MF mode is an operation mode for manually focusing. In the MF mode, for example, by operating the focus ring 18A or the like by the user, the focus lens 40B is moved along the optical axis OA with the movement amount according to the operation amount of the focus ring 18A or the like, thereby the focus is adjusted.

In the AF mode, the imaging apparatus main body 16 calculates a focusing position according to a subject distance and adjusts the focus by moving the focus lens 40B toward the calculated focusing position. Here, the focusing position refers to a position of the focus lens 40B on the optical axis OA in a state of being in focus.

The imaging apparatus main body 16 includes the image processing engine 12, the image sensor 20, the system controller 44, an image memory 46, a UI type device 48, an external I/F 50, a communication I/F 52, a photoelectric conversion element driver 54, and an input/output interface 70. Further, the image sensor 20 includes the photoelectric conversion elements 72 and an A/D converter 74.

The image processing engine 12, the image memory 46, the UI type device 48, the external I/F 50, the photoelectric conversion element driver 54, the mechanical shutter driver (not shown), and the A/D converter 74 are connected to the input/output interface 70. Further, the control device 36 of the interchangeable lens 18 is also connected to the input/output interface 70.

The system controller 44 includes a CPU (not shown), an NVM (not shown), and a RAM (not shown). In the system controller 44, the NVM is a non-temporary storage medium and stores various types of parameters and various programs. The NVM of the system controller 44 is, for example, an EEPROM. However, this is only an example, and an HDD and/or SSD or the like may be applied as the NVM of a system controller 44 instead of or together with the EEPROM. Further, the RAM of the system controller 44 temporarily stores various types of information and is used as a work memory. In the system controller 44, the CPU reads a necessary program from the NVM and executes the read various types of programs on the RAM to control the entire imaging apparatus 10. That is, in the example shown in FIG. 3, the image processing engine 12, the image memory 46, the UI type device 48, the external I/F 50, the communication I/F 52, the photoelectric conversion element driver 54, and the control device 36 are controlled by the system controller 44.

The image processing engine 12 operates under the control of the system controller 44. The image processing engine 12 includes a processor 62, an NVM 64, and a RAM 66. Here, the processor 62 is an example of a "processor" according to the present disclosed technology.

The processor 62, the NVM 64, and the RAM 66 are connected via a bus 68, and the bus 68 is connected to the input/output interface 70. In the example shown in FIG. 3, one bus is shown as the bus 68 for convenience of illustration, but a plurality of buses may be used. The bus 68 may be a serial bus or may be a parallel bus including a data bus, an address bus, a control bus, and the like.

The processor 62 includes a CPU and a GPU, and the GPU is operated under the control of the CPU and is mainly responsible for executing image processing. The processor 62 may be one or more CPUs integrated with a GPU function or may be one or more CPUs not integrated with the GPU function. Further, the processor 62 may include a multi-core CPU or a TPU.

The NVM 64 is a non-temporary storage medium and stores various parameters and various types of programs, which are different from the various parameters and various programs stored in the NVM of the system controller 44. For example, the NVM 64 is an EEPROM. However, this is only an example, and an HDD and/or SSD or the like may be applied as the NVM 64 instead of or together with the EEPROM. Further, the RAM 66 temporarily stores various types of information and is used as a work memory.

The processor 62 reads a necessary program from the NVM 64 and executes the read program on the RAM 66. The processor 62 performs various types of image processing according to a program executed on the RAM 66.

The photoelectric conversion element driver 54 is connected to the photoelectric conversion elements 72. The photoelectric conversion element driver 54 supplies an imaging timing signal, which defines the timing of the imaging performed by the photoelectric conversion elements 72, to the photoelectric conversion elements 72 according to an instruction from the processor 62. The photoelectric conversion elements 72 perform reset, exposure, and output of an electric signal according to the imaging timing signal supplied from the photoelectric conversion element driver 54. Examples of the imaging timing signal include a vertical synchronization signal, and a horizontal synchronization signal.

In a case where the interchangeable lens 18 is attached to the imaging apparatus main body 16, the subject light incident on the imaging lens 40 is formed on the light-receiving surface 72A by the imaging lens 40. Under the control of the photoelectric conversion element driver 54, the photoelectric conversion elements 72 photoelectrically convert the subject light, which is received from the light-receiving surface 72A and output the electric signal corresponding to the amount of light of the subject light to the A/D converter 74 as analog image data indicating the subject light. Specifically, the A/D converter 74 reads the analog image data from the photoelectric conversion elements 72 in units of one frame and for each horizontal line by using an exposure sequential reading method.

The A/D converter 74 generates a processing target image 75A by digitizing analog image data. The processing target image 75A is obtained by being captured by the imaging apparatus 10.

The processing target image 75A includes the captured image 75A1 and the phase difference image 75A2. The captured image 75A1 is obtained by imaging the subject by the general imaging system pixel group 72AG1 (see FIG. 2). The captured image 75A1 is an image in which the R pixel, the G pixel, and the B pixel are arranged in a mosaic shape as an electronic image. The phase difference image 75A2 is an image obtained by imaging the subject by the distance measurement system pixel group 72AG2 (see FIG. 2) and is used for the distance measurement. That is, the phase difference image 75A2 is an image in which the content of the captured image 75A1 (for example, information related to the subject captured in the captured image 75A1) is represented with another representation method (for example, a representation method in which the phase difference can be detected).

The captured image 75A1 is an example of a "first image" and a "captured image" according to the present disclosed technology, and the phase difference image 75A2 is an example of a "third image" according to the present disclosed technology.

In the present first embodiment, as an example, the processor 62 of the image processing engine 12 acquires the processing target image 75A from the A/D converter 74 and performs various types of the image processing on the acquired processing target image 75A.

A processed image 75B is stored in the image memory 46. The processed image 75B is an image obtained by performing various types of image processing on the processing target image 75A by the processor 62.

The UI type device 48 includes a display 28, and the processor 62 displays various types of information on the display 28. Further, the UI type device 48 includes a reception device 76. The reception device 76 includes a touch panel 30 and a hard key unit 78. The hard key unit 78 is a plurality of hard keys including an instruction key 26 (see FIG. 1). The processor 62 operates according to various types of instructions received by using the touch panel 30. Here, although the hard key unit 78 is included in the UI type device 48, the present disclosed technology is not limited to this, for example, the hard key unit 78 may be connected to the external I/F 50.

The external I/F 50 controls the exchange of various types of information between the imaging apparatus 10 and an apparatus existing outside the imaging apparatus 10 (hereinafter, also referred to as an "external apparatus"). Examples of the external I/F 50 include a USB interface. The external apparatus (not shown) such as a smart device, a personal computer, a server, a USB memory, a memory card, and/or a printer is directly or indirectly connected to the USB interface.

The communication I/F 52 is connected to a network (not shown). The communication I/F 52 controls the exchange of information between a communication device (not shown) such as a server on the network and the system controller 44. For example, the communication I/F 52 transmits information in response to a request from the system controller 44 to the communication device via the network. Further, the communication I/F 52 receives the information transmitted from the communication device and outputs the received information to the system controller 44 via the input/output interface 70.

Figure 4:
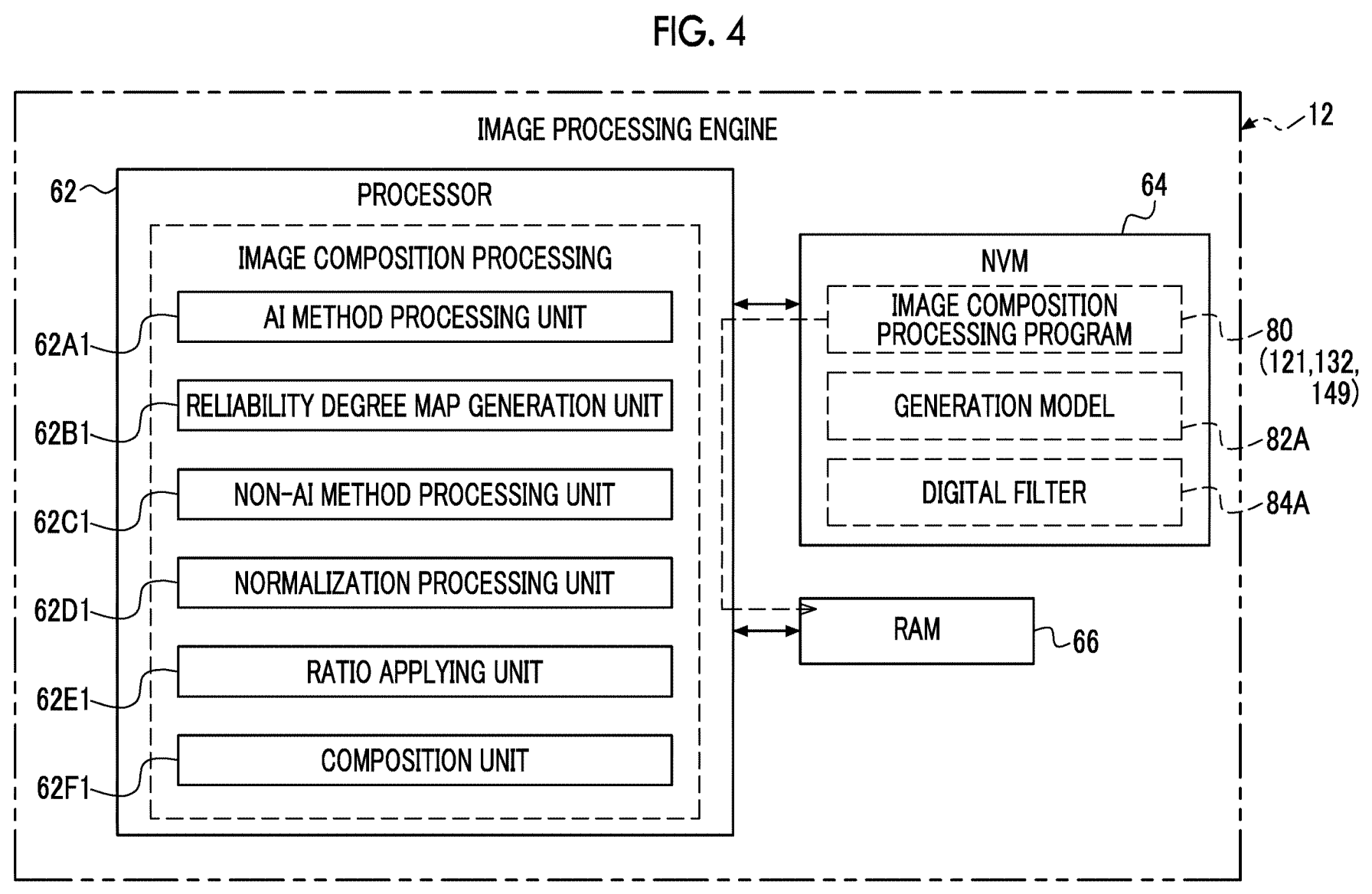

As an example shown in FIG. 4, the image composition processing program 80 is stored in the NVM 64 of the imaging apparatus 10. The image composition processing program 80 is an example of a "program" according to the present disclosed technology.

The generation model 82A is stored in the NVM 64 of the imaging apparatus 10. An example of the generation model 82A is a trained generation network. Examples of the generation network include GAN, VAE, and the like. The processor 62 performs AI method processing on the processing target image 75A (see FIG. 3). An example of the AI method processing includes processing that uses the generation model 82A. That is, an example of the AI method processing includes processing that uses a neural network. In contrast to this, the non-AI method processing refers to processing that does not use a neural network. Hereinafter, for convenience of explanation, the processing, which uses the generation model 82A, will be described as the processing that is actively performed mainly by the generation model 82A. That is, for convenience of explanation, the generation model 82A will be described assuming that it is a function of performing processing on the input information and outputting the processing result.

A digital filter 84A is stored in the NVM 64 of the imaging apparatus 10. An example of the digital filter 84A includes an FIR filter. The FIR filter is only an example, and may be another digital filter such as an IIR filter.

The processor 62 reads the image composition processing program 80 from the NVM 64 and executes the read image composition processing program 80 on the RAM 66. The processor 62 performs the image composition processing (see FIGS. 9A and 9B) according to the image composition processing program 80 executed on the RAM 66. The image composition processing is realized by the processor 62 operating as an AI method processing unit 62A1, a reliability degree map generation unit 62B1, a non-AI method processing unit 62C1, a normalization processing unit 62D1, a ratio applying unit 62E1, and a composition unit 62F1 in accordance with the image composition processing program 80. The generation model 82A is used by the AI method processing unit 62A1, and the digital filter 84A is used by the non-AI method processing unit 62C1.

Figure 5:
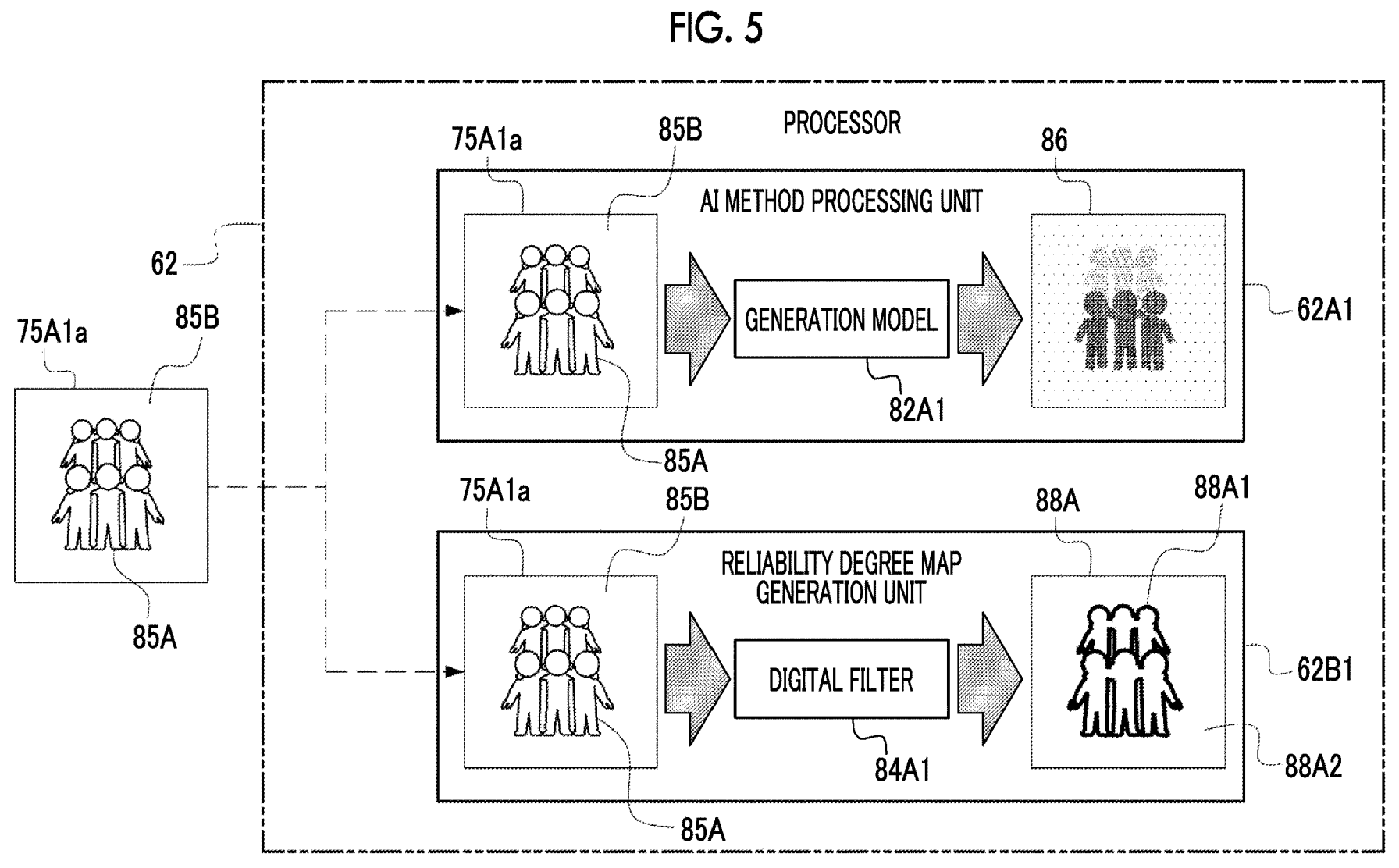

As an example shown in FIG. 5, a captured image 75A1a is input to the AI method processing unit 62A1 and the reliability degree map generation unit 62B1. The captured image 75A1a is an example of the captured image 75A1 shown in FIG. 3. The captured image 75A1a includes a person region 85A and a background region 85B. The person region 85A is an image region where a person is captured. The background region 85B is an image region where a background is captured. A background that is captured in the background region 85B is, for example, a wall surface in a state of being erected in the vertical direction.

The AI method processing unit 62A1 performs distance image generation processing on the captured image 75A1a. The distance image generation processing is the AI method processing. In the example shown in FIG. 5, processing of using a generation model 82A1 is shown as an example of the distance image generation processing. The generation model 82A1 is an example of the generation model 82A shown in FIG. 4. The distance image generation processing performed by the AI method processing unit 62A1 is an example of the "first AI processing" and the "distance image generation processing" according to the present disclosed technology.

The generation model 82A1 is a generation network in which a training of converting a visible light image into a distance image was already performed. In the present first embodiment, the distance image refers to an image showing a distribution of distances with respect to a subject shown in the visible light image. In the distance image, the distribution of distances is represented in a unit of a pixel. Further, in the distance image, the distribution of distances is represented by chromatic colors according to lengths of the distances from an imaging position to the subject. For example, the distance from the imaging position to the subject is represented by color on a long wavelength side as the distance increases. Accordingly, the distance from the imaging position to the subject can be specified in a unit of a pixel based on the color in the distance image. Note that, a method of representing the distribution of distances in chromatic colors is only an example, and as for the distribution of distances, for example, the distance from the imaging position to the subject may be represented in shades of achromatic color.

The AI method processing unit 62A1 generates a first distance image 86 by performing processing, which uses the generation model 82A1, on the captured image 75A1a. That is, the generation model 82A1 generates and outputs the first distance image 86 based on the input captured image 75A1a. The first distance image 86 is an image showing the distribution of distances from the imaging position to the subject. The distance from the imaging position to the subject refers to, for example, an image showing the distribution of distances from positions of the light-receiving surface 72A (see FIGS. 2 and 3) to the subject (for example, a person who is captured in the person region 85A and a background that is captured in the background region 85B). The distribution of distances from the positions of the light-receiving surface 72A to the subject is represented, for example, in a unit of a pixel in the captured image 75A1a. The first distance image 86 is an example of a "second image" according to the present disclosed technology.

By the way, the processor 62 can perform distance measurement with respect to an edge region (for example, a portion having a pattern and/or a contour that can be focused) captured in the captured image 75A1a with higher accuracy than distance measurement with respect to a non-edge region (for example, a region other than the edge region) by using the phase difference image 75A2 shown in FIG. 3. Therefore, the presence or absence of the edge region is an important determination material in determining whether or not the result of the distance measurement that uses the phase difference image 75A2 is reliable. In other words, it is possible to determine that it is better to rely on the result of the distance measurement that uses the phase difference image 75A2 for a position where the edge region is present in the captured image 75A1a and it is better not to rely on the result of the distance measurement that uses the phase difference image 75A2 for a position of the non-edge region in the captured image 75A1a.

Therefore, the reliability degree map generation unit 62B1 generates a reliability degree map 88A that shows a distribution, which is in the captured image 75A1a, of reliability degrees with respect to the captured image 75A1a by performing the non-AI method processing. The reliability degree indicates a reliable degree with respect to the captured image 75A1a. Further, in the present first embodiment, the reliability degree is a result of the non-AI method processing performed on the captured image 75A1a. The reliability degree is, for example, a value defined within a numerical value of 0.0 or more and 1.0 or less, and the larger the reliability degree, the more reliable the result of the distance measurement that uses the phase difference image 75A2. For example, the more edge regions (that is, an edge region that contributes to the distance measurement that uses the phase difference image 75A2) are captured in the captured image 75A1a, the greater the value of the reliability degree. The reliability degree, which indicates the reliable degree with respect to the captured image 75A1a, is an example of a "first reliability degree that indicates the reliable degree with respect to the first image" according to the present disclosed technology.

The reliability degree map generation unit 62B1 generates the reliability degree map 88A by performing processing, which uses the digital filter 84A1 as the non-AI method processing, on the captured image 75A1a. The digital filter 84A1 is an example of the digital filter 84A shown in FIG. 4. The digital filter 84A1 includes a high-pass filter that detects, as the edge region 88A1, a high-frequency component indicating a pattern and/or a contour that can realize highly accurate distance measurement that uses the phase difference image 75A2. The edge region 88A1 is an edge region in the captured image 75A1a (that is, an edge region detected by the digital filter 84A from the captured image 75A1a). The reliability degree map 88A includes the edge region 88A1 (that is, an element by which the result of the distance measurement that uses the phase difference image 75A2 is reliable) and a non-edge region 88A2 that is an image region other than the edge region 88A1. For example, the edge region 88A1 is an image region where a reliability degree with respect to the captured image 75A1a is "1.0", and the non-edge region 88A2 is an image region where a reliability degree with respect to the captured image 75A1a is "0.0". That is, the edge region 88A1 is an image region where it is better to rely on the result of the distance measurement that uses the phase difference image 75A2, and the non-edge region 88A2 is an image region where it is better not to rely on the result of the distance measurement that uses the phase difference image 75A2. The edge region 88A1 and the non-edge region 88A2 are examples of an "indicator" and "information capable of being mapped" according to the present disclosed technology.

Figure 6:
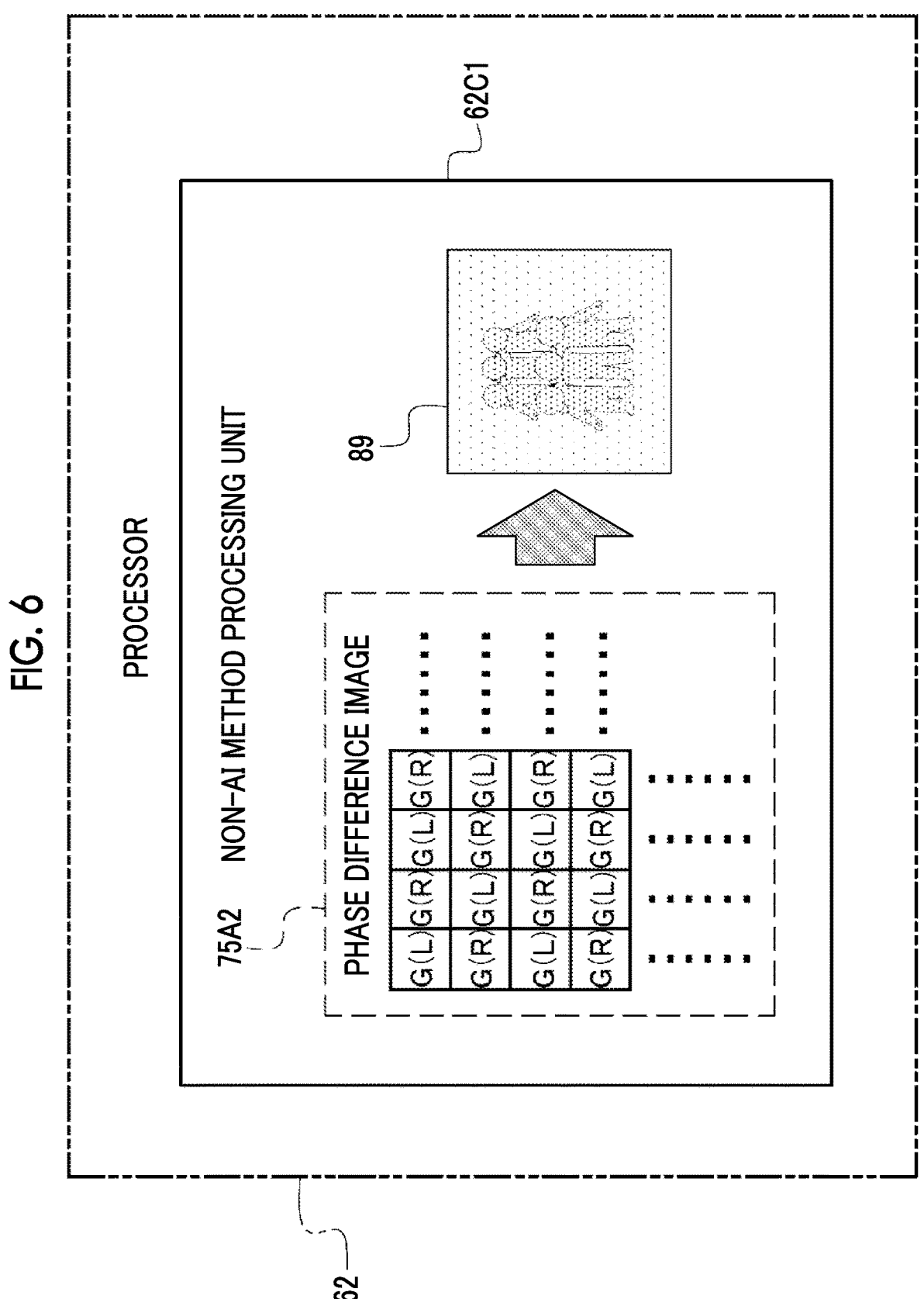
FIG. 6 is a conceptual diagram showing an example of the content of processing of a non-AI method processing unit according to the first embodiment.

As an example shown in FIG. 6, the non-AI method processing unit 62C1 generates a second distance image 89 from the phase difference image 75A2. The second distance image 89 is an image that shows the distribution of distances with respect to the subject. In other words, the second distance image 89 is an image that shows the distribution of results obtained by performing the distance measurement (that is, the distance measurement that uses the phase difference image 75A2) on the subject (for example, the person captured in the person region 85A shown in FIG. 5 and the background captured in the background region 85B shown in FIG. 5). The second distance image 89 is an example of a "fourth image obtained without performing the first AI processing on the first image" according to the present disclosed technology. Since a method of generating the second distance image 89 from the phase difference image 75A2 is known, the description thereof will be omitted here.

By the way, in the present first embodiment, the first distance image 86 that is generated based on the captured image 75A1a and the second distance image 89 that is generated based on the phase difference image 75A2 have different dimensions from each other. In a case where the first distance image 86 and the second distance image 89 are combined, it is preferable to align one of dimensions of the first distance image 86 and the second distance image 89 with the other dimensions, prior to composition of the first distance image 86 and the second distance image 89. This is because in a case where the first distance image 86 and the second distance image 89 are combined in a state with the dimensions aligned, the reliability of the image after the composition is higher as compared with the case where the first distance image 86 and the second distance image 89 are combined without aligning the dimensions.

Figure 7:
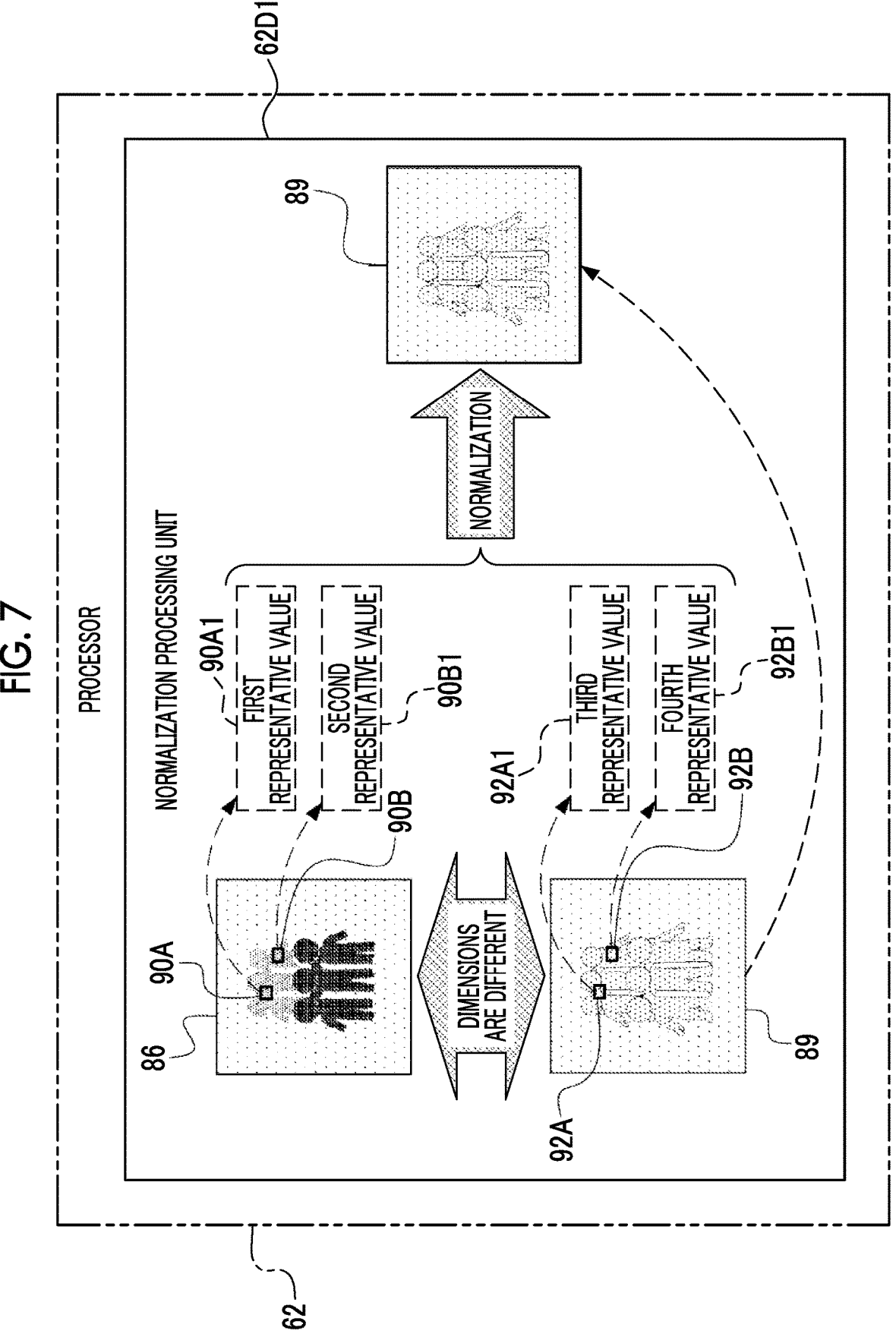
FIG. 7 is a conceptual diagram showing an example of the content of processing of a normalization processing unit according to the first embodiment.

Therefore, as an example shown in FIG. 7, the normalization processing unit 62D1 performs processing of aligning the dimension of the second distance image 89 with the dimension of the first distance image 86. Here, although the processing of aligning the dimension of the second distance image 89 with the dimension of the first distance image 86 is exemplified, this is only an example, and the dimension of the first distance image 86 may be aligned with the dimension of the second distance image 89.

An example of the processing of aligning the dimension of the second distance image 89 with the dimension of the first distance image 86 includes the normalization processing. The normalization processing is processing of normalizing the second distance image 89 based on a first representative value 90A1, a second representative value 90B1, a third representative value 92A1, and a fourth representative value 92B1.

The first representative value 90A1 is a value corresponding to an image region 90A in the first distance image 86. The second representative value 90B1 is a value corresponding to an image region 90B in the first distance image 86. The third representative value 92A1 is a value corresponding to an image region 92A in the second distance image 89. The fourth representative value 92B1 is a value corresponding to an image region 92B in the second distance image 89.

The image region 90A in the first distance image 86 has a correspondence relationship with the image region 92A in the second distance image 89. That is, a position of the image region 90A in the first distance image 86 coincides with a position of the image region 92A in the second distance image 89. Further, between the first distance image 86 and the second distance image 89, tendencies (that is, tendencies of distances from the imaging position to the subject) of colors of the image region 90A and the image region 92A are similar to each other to a degree exceeding a default similarity degree. An example of the default similarity degree includes a lower limit value of the similarity degree that has been confirmed in advance that no problem occurs in normalizing the second distance image 89. In the present first embodiment, as the image region 90A and the image region 92A, the tendencies of colors between the first distance image 86 and the second distance image 89 exceeds the default similarity degree, and the image regions that are similar with the highest similarity degree are applied. Further, here, although the image regions that are similar with the highest similarity degree are exemplified, image regions that are similar with a second or subsequent high similarity degree between the first distance image 86 and the second distance image 89 may be used as long as the similarity degree exceeds the default similarity degree.

The image region 90B in the first distance image 86 has a correspondence relationship with the image region 92B in the second distance image 89. That is, a position of the image region 90B in the first distance image 86 coincides with a position of the image region 92B in the second distance image 89. Further, between the first distance image

86 and the second distance image 89, tendencies (that is, tendencies of distances from the imaging position to the subject) of colors of the image region 90B and the image region 92B are similar to each other to a degree exceeding a default similarity degree. In the present first embodiment, as the image region 90B and the image region 92B, the tendencies of colors between the first distance image 86 and the second distance image 89 exceeds the default similarity degree, and the image regions that are similar with the highest similarity degree are applied. Further, here, although the image regions that are similar with the highest similarity degree are exemplified, image regions that are similar with a second or subsequent high similarity degree between the first distance image 86 and the second distance image 89 may be used as long as the similarity degree exceeds the default similarity degree.

An example of the first representative value 90A1 includes a median value of pixel values of a plurality of pixels (for example, all pixels within the image region 90A, or all pixels within a designated partial region in the image region 90A) constituting the image region 90A. An example of the second representative value 90B1 includes a median value of pixel values of a plurality of pixels (for example, all pixels within the image region 90B, or all pixels within a designated partial region in the image region 90B) constituting the image region 90B. An example of the third representative value 92A1 includes a median value of pixel values of a plurality of pixels (for example, all pixels within the image region 92A, or all pixels within a designated partial region in the image region 92A) constituting the image region 92A. An example of the fourth representative value 92B1 includes a median value of pixel values of a plurality of pixels (for example, all pixels within the image region 92B, or all pixels within a designated partial region in the image region 92B) constituting the image region 92B. Further, here, although the median value is exemplified, the median value is only an example, and a statistical value such as an average value, the most frequent value, the maximum value, or the minimum value may be applied instead of the median value, of a pixel value of a representative pixel (for example, a center pixel) of each of the image regions 90A, 90B, 92A and 92B may be applied.

Here, "1_B1(x, y)" is defined by using the following formula (1) in a case where the pixel value in the second distance image 89 is set to "1_B(x, y)", the first representative value 90A1 is set to "1_A1", the second representative value 90B1 is set to "1_A2", the third representative value 92A1 is set to "1_B1", the fourth representative value 92B1 is set to "1_B2", and the normalized pixel value is set to "1_B1(x, y)". The normalization processing unit 62D1 normalizes the second distance image 89 by converting a pixel value (that is, "1_B(x, y)") of each pixel in the second distance image 89 into "1_B1(x, y)" by using the formula (1).

$$1\_B1(x,y)\{1\_B(x,y)-1\_B1\}*\{(1\_A2-1\_A1)/(1\_B2-1\_B1)\}+1\_A1 \qquad (1)$$

In the example shown in FIG. 7, the image regions 90A and 90B are examples of "a plurality of third image regions" according to the present disclosed technology, and the image regions 92A and 92B are examples of "a plurality of fourth image regions" according to the present disclosed technology. Further, in the example shown in FIG. 7, the first representative value 90A1 and the second representative value 90B1 are examples of "a plurality of first representative values" according to the present disclosed technology, and the third representative value 92A1 and the fourth representative value 92B1 are examples of "a plurality of second representative values" according to the present disclosed technology. The default similarity degree is an example of a "first similarity degree" and a "second similarity degree" according to the present disclosed technology.

Figure 8:
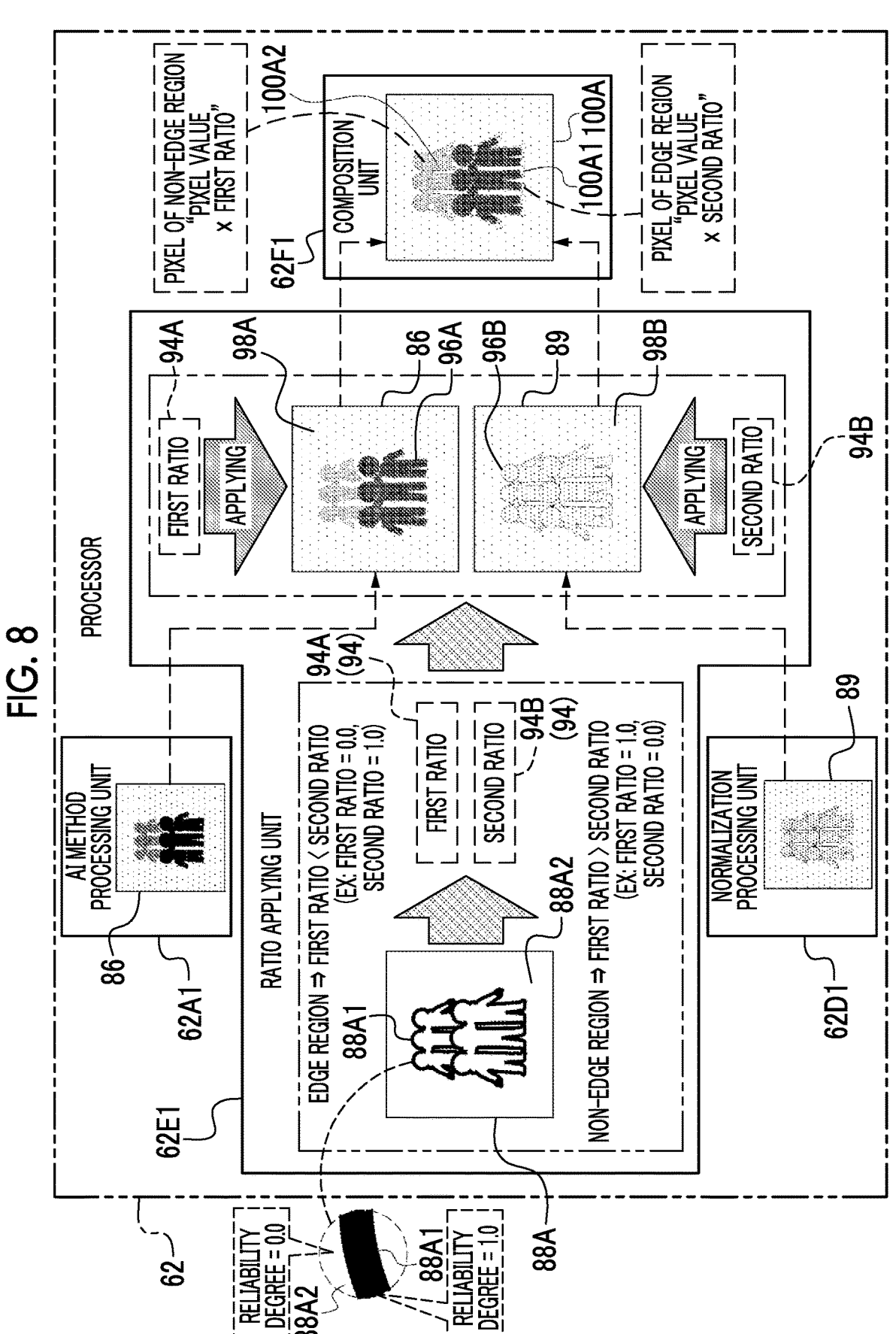
FIG. 8 is a conceptual diagram showing an example of the content of processing of a ratio applying unit and a composition unit according to the first embodiment.

As an example shown in FIG. 8, the ratio applying unit 62E1 derives a ratio 94 based on the reliability degree map 88A that is generated by the reliability degree map generation unit 62B1. The ratio 94 is a ratio used in a case where the first distance image 86, which is generated by the AI method processing unit 62A1, and the second distance image 89, which is normalized by the normalization processing unit 62D1, are combined at a unit of a pixel. That is, the ratio 94 is a value that determines to what extent the first distance image 86 and the second distance image 89 are combined with each other at a unit of a pixel.

The ratio 94 is roughly classified into a first ratio 94A and a second ratio 94B. The first ratio 94A is used for the first distance image 86 that is generated by the AI method processing unit 62A1, and the second ratio 94B is used for the second distance image 89 that is normalized by the normalization processing unit 62D1. The first ratio 94A and the second ratio 94B are derived for the edge region 88A1 and the non-edge region 88A2 in the reliability degree map 88A. The first ratio 94A is different between the edge region 88A1 and the non-edge region 88A2, and the second ratio 94B is also different between the edge region 88A1 and the non-edge region 88A2.

The second ratio 94B, which is derived for the edge region 88A1, is larger than the first ratio 94A, which is derived for the edge region 88A1. This means that in a case where the edge region 96A in the first distance image 86 and the edge region 96B in the second distance image 89 are combined, the edge region 96B is represented more dominantly than the edge region 96A. Here, the edge region 96A refers to an image region corresponding to a position of the edge region 88A1 in the reliability degree map 88A among all the image regions in the first distance image 86. Further, here, the edge region 96B refers to an image region corresponding to a position of the edge region 88A1 in the reliability degree map 88A among all the image regions in the second distance image 89.

The first ratio 94A and the second ratio 94B for the edge region 88A1 are derived according to a content of the reliability degree map 88A. For example, in the present first embodiment, the first ratio 94A and the second ratio 94B for the edge region 88A1 are derived according to the edge region 88A1 specified from the reliability degree map 88A. In the reliability degree map 88A, the edge region 88A1 is an image region where the reliability degree is "1.0". This means that the edge region 96B (that is, the image region corresponding to a position of the edge region 88A1 in the reliability degree map 88A among all the image regions in the second distance image 89) in the second distance image 89 is more reliable than the edge region 96A (that is, the image region corresponding to a position of the edge region 88A1 in the reliability degree map 88A among all the image regions in the first distance image 86) in the first distance image 86. Therefore, in the example shown in FIG. 8, "0.0" is exemplified as the first ratio 94A derived for the edge region 88A1, and "1.0" is exemplified as the second ratio 94B derived for the edge region 88A1.

On the other hand, the first ratio 94A, which is derived for the non-edge region 88A2, is larger than the second ratio 94B, which is derived for the non-edge region 88A2. This means that in a case where the non-edge region 98A in the first distance image 86 and the non-edge region 98B in the second distance image 89 are combined, the non-edge region 98A is represented more dominantly than the non-edge region 98B. Here, the non-edge region 98A refers to an image region corresponding to a position of the non-edge region 88A2 in the reliability degree map 88A among all the image regions in the first distance image 86. Further, here, the non-edge region 98B refers to an image region corresponding to a position of the non-edge region 88A2 in the reliability degree map 88A among all the image regions in the second distance image 89.

The first ratio 94A and the second ratio 94B for the non-edge region 88A2 are derived according to a content of the reliability degree map 88A. For example, in the present first embodiment, the first ratio 94A and the second ratio 94B for the non-edge region 88A2 are derived according to the non-edge region 88A2 specified from the reliability degree map 88A. In the reliability degree map 88A, the non-edge region 88A2 is an image region where the reliability degree is "0.0". This means that the non-edge region 98A in the first distance image 86 is more reliable than the non-edge region 98B in the second distance image 89. Therefore, in the example shown in FIG. 8, "1.0" is exemplified as the first ratio 94A derived for the non-edge region 88A2, and "0.0" is exemplified as the second ratio 94B derived for the non-edge region 88A2.

The ratio applying unit 62E1 applies the first ratio 94A (here, "0.0" as an example) that is derived for the edge region 88A1 to the edge region 96A in the first distance image 86. Further, the ratio applying unit 62E1 applies the second ratio 94B (here, "1.0" as an example) that is derived for the edge region 88A1 to the edge region 96B in the second distance image 89.

The ratio applying unit 62E1 applies the first ratio 94A (here, "1.0" as an example) that is derived for the non-edge region 88A2 to the non-edge region 98A in the first distance image 86. Further, the ratio applying unit 62E1 applies the second ratio 94B (here, "0.0" as an example) that is derived for the non-edge region 88A2 to the non-edge region 98B in the second distance image 89.

The composition unit 62F1 generates a composite image 100A by combining the first distance image 86 and the second distance image 89 according to the edge region 88A1 and the non-edge region 88A2 constituting the reliability degree map 88A. For example, the composition unit 62F1 generates the composite image 100A by combining the first distance image 86 and the second distance image 89 according to the ratio 94 obtained in accordance with the reliability degree (for example, the reliability degree of the edge region 88A1 and the reliability degree of the non-edge region 88A2) that is derived based on the edge region 88A1 and the non-edge region 88A2 in the reliability degree map 88A. The composition of the first distance image 86 and the second distance image 89 is a result of a product-sum operation (for example, a product-sum operation of pixel values for the same pixel positions between the first distance image 86 and the second distance image 89) of the first distance image 86 and the second distance image 89.

The composition of the first distance image 86 and the second distance image 89 is realized by performing the composition of the edge region 96A and the edge region 96B in the second distance image 89 and performing the composition of the non-edge region 98A and the non-edge region 98B in the second distance image 89. In this case, for example, the composition unit 62F1 combines the edge region 96A in the first distance image 86 and the edge region 96B in the second distance image 89 according to the first ratio 94A and the second ratio 94B that are derived by the ratio applying unit 62E1 for the edge region 88A1. Further, the composition unit 62F1 combines the non-edge region 98A in the first distance image 86 and the non-edge region 98B in the second distance image 89 according to the first ratio 94A and the second ratio 94B that are derived by the ratio applying unit 62E1 for the non-edge region 88A2.

The second ratio 94B for the edge region 88A1 is larger than the first ratio 94A for the edge region 88A1. In a case where the first distance image 86 and the second distance image 89 are combined, the second ratio 94B for the edge region 88A1 is used for the edge region 96B in the second distance image 89 and the first ratio 94A for the edge region 88A1 is used for the edge region 96A in first distance image 86. Therefore, in a case where the first distance image 86 and the second distance image 89 are combined, the edge region 96B in the second distance image 89 is combined at a larger ratio than the edge region 96A in the first distance image 86.

In the example shown in FIG. 8, a pixel value, which is obtained by multiplying the pixel value of the edge region 96A by the first ratio 94A that is applied to the edge region 96A in the first distance image 86, and a pixel value, which is obtained by multiplying the pixel value of the edge region 96B by the second ratio 94B that is applied to the edge region 96B in the second distance image 89, are combined. In the present first embodiment, the second ratio 94B that is applied to the edge region 96B is "1.0", and the first ratio 94A that is applied to the edge region 96A is "0.0". In this case, the pixel value of the edge region 96A is multiplied by "0.0" as the first ratio 94A, and the pixel value of the edge region 96B is multiplied by "1.0" as the second ratio 94B. Therefore, the edge region 96B is used as an edge region 100A1 in the composite image 100A (that is, an image region corresponding to the positions of the edge regions 96A and 96B among all the image regions in the composite image 100A).

The first ratio 94A for the non-edge region 88A2 is larger than the second ratio 94B for the non-edge region 88A2. In a case where the first distance image 86 and the second distance image 89 are combined, the first ratio 94A for the non-edge region 88A2 is used for the non-edge region 98A in the first distance image 86, and the second ratio 94B for the non-edge region 88A2 is used for the non-edge region 98B in the second distance image 89. Therefore, in a case where the first distance image 86 and the second distance image 89 are combined, the non-edge region 98A in the first distance image 86 is combined at a larger ratio than the non-edge region 98B in the second distance image 89.

In the example shown in FIG. 8, a pixel value, which is obtained by multiplying the pixel value of the non-edge region 98A by the first ratio 94A that is applied to the non-edge region 98A in the first distance image 86, and a pixel value, which is obtained by multiplying the pixel value of the non-edge region 98B by the second ratio 94B that is applied to the non-edge region 98B in the second distance image 89, are combined. In the present first embodiment, the second ratio 94B that is applied to the non-edge region 98B is "0.0", and the first ratio 94A that is applied to the non-edge region 98A is "1.0". In this case, the pixel value of the non-edge region 98A is multiplied by "1.0" as the first ratio 94A, and the pixel value of the non-edge region 98B is multiplied by "0.0" as the second ratio 94B. Therefore, the non-edge region 98A is used as a non-edge region 100A2 in the composite image 100A (that is, an image region corresponding to the positions of the non-edge regions 98A and 98B among all the image regions in the composite image 100A).

The edge region 96B is an example of a "first edge corresponding region" according to the present disclosed technology. The edge region 96A is an example of a "second edge corresponding region" according to the present disclosed technology. The non-edge region 98A is an example of a "first non-edge corresponding region" according to the present disclosed technology. The non-edge region 98B is an example of a "second non-edge corresponding region" according to the present disclosed technology.

The composition unit 62F1 performs various types of image processing on the composite image 100A (for example, known image processing such as an offset correction, a white balance correction, demosaic processing, a color correction, a gamma correction, a color space conversion, brightness processing, color difference processing, and resizing processing). The composition unit 62F1 outputs an image obtained by performing various types of image processing on the composite image 100A to a default output destination (for example, an image memory 46 shown in FIG. 3) as the processed image 75B (see FIG. 3).

Figure 9A:
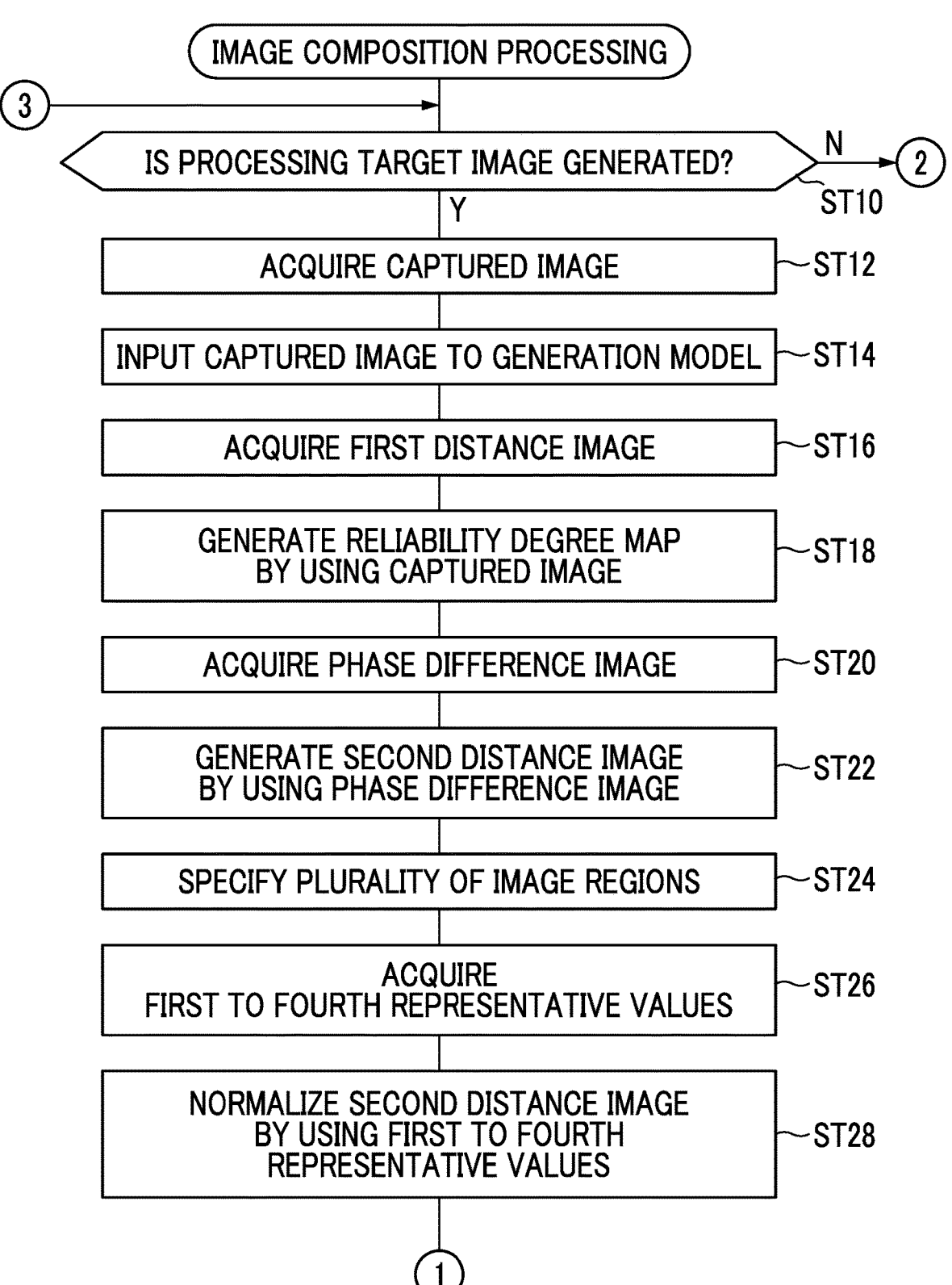
FIG. 9A is a flowchart showing an example of a flow of image composition processing according to the first embodiment.
Figure 9B:
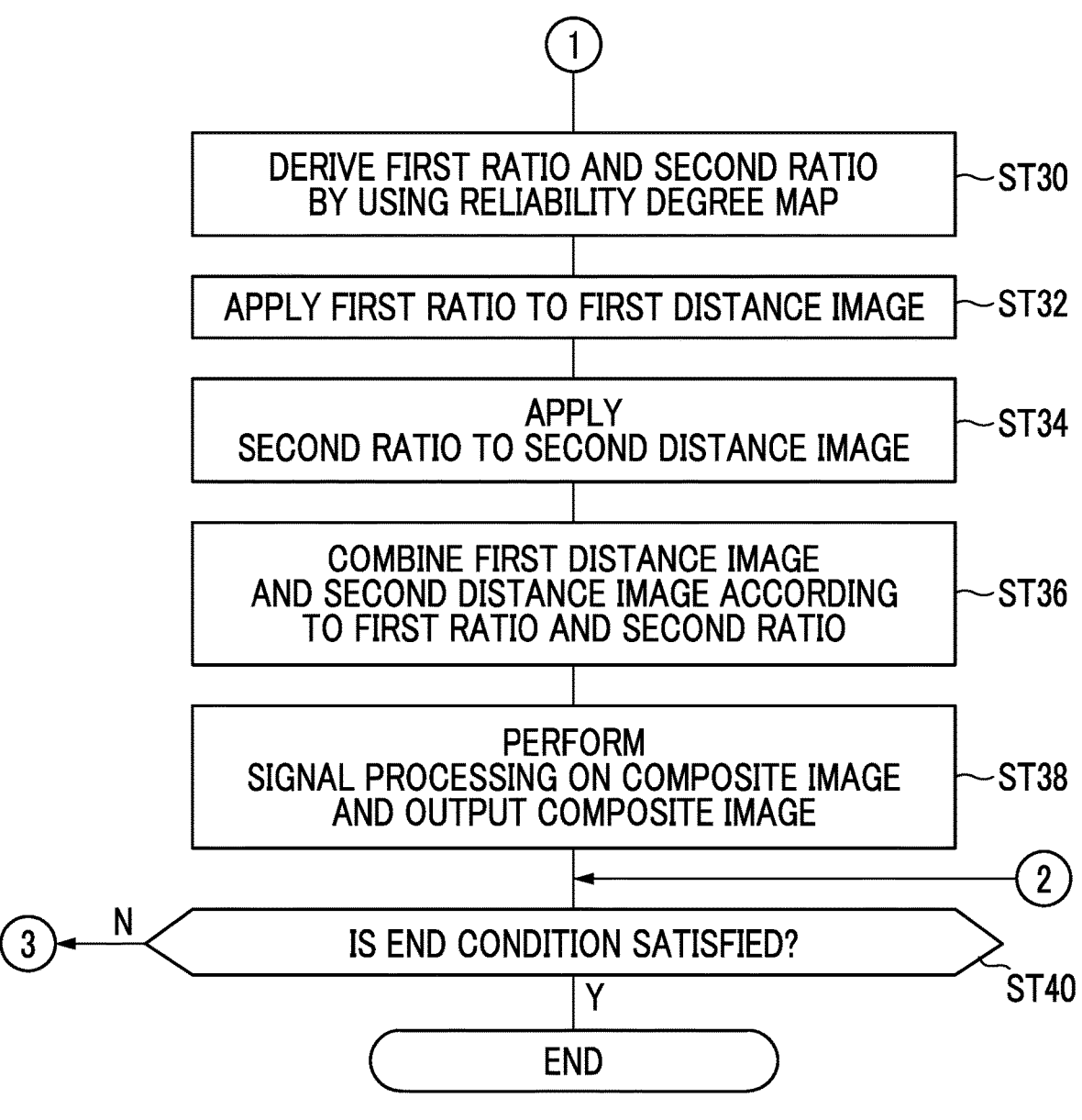
FIG. 9B is a continuation of the flowchart shown in FIG. 9A.

Next, the operation of the imaging apparatus 10 will be described with reference to FIGS. 9A and 9B. FIGS. 9A and 9B show an example of a flow of the image composition processing executed by the processor 62. The flow of the image composition processing shown in FIGS. 9A and 9B is an example of an "image processing method" according to the present disclosed technology.

In the image composition processing shown in FIG. 9A, first, in step ST10, the AI method processing unit 62A1 determines whether or not the processing target image 75A is generated by the image sensor 20 (see FIGS. 1 to 3). In a case where the processing target image 75A is not generated by the image sensor 20 in step ST10, the determination is set as negative, and the image composition processing shifts to step ST40 shown in FIG. 9B. In a case where the processing target image 75A is generated by the image sensor 20 in step ST10, the determination is set as positive, and the image composition processing shifts to step ST12.

In step ST12, the AI method processing unit 62A1 and the reliability degree map generation unit 62B1 acquire the captured image 75A1$a$ (see FIG. 5) from the processing target image 75A. After the processing in step ST12 is executed, the image composition processing shifts to step ST14.

In step ST14, the AI method processing unit 62A1 inputs the captured image 75A1$a$ that is acquired in step ST12 into the generation model 82A1 (see FIG. 5). After the processing in step ST14 is executed, the image composition processing shifts to step ST16.

In step ST16, the AI method processing unit 62A1 acquires the first distance image 86 (see FIG. 5) output from the generation model 82A1 by inputting the captured image 75A1$a$ to the generation model 82A1 in step ST14. After the processing in step ST16 is executed, the image composition processing shifts to step ST18.

In step ST18, the reliability degree map generation unit 62B1 generates the reliability degree map 88A by using the captured image 75A1$a$ that is acquired in step ST12 (see FIG. 5). After the processing in step ST18 is executed, the image composition processing shifts to step ST20.

In step ST20, the non-AI method processing unit 62C1 acquires the phase difference image 75A2 (see FIG. 6) from the processing target image 75A. After the processing in step ST20 is executed, the image composition processing shifts to step ST22.

In step ST22, the non-AI method processing unit 62C1 generates the second distance image 89 (see FIG. 6) by using the phase difference image 75A2 that is acquired in step ST20. After the processing in step ST22 is executed, the image composition processing shifts to step ST24.

In step ST24, the normalization processing unit 62D1 specifies the image regions 90A and 90B (see FIG. 7) from the first distance image 86, and specifies the image regions 92A and 92B (see FIG. 7) from the second distance image 89. After the processing in step ST24 is executed, the image composition processing shifts to step ST26.

In step ST26, the normalization processing unit 62D1 acquires the first representative value 90A1 (see FIG. 7) from the image region 90A, acquires the second representative value 90B1 (see FIG. 7) from the image region 90B, acquires the third representative value 92A1 (see FIG. 7) from the image region 92A, and acquires a fourth representative value 92B1 from the image region 92B. After the processing in step ST26 is executed, the image composition processing shifts to step ST28.

In step ST28, the normalization processing unit 62D1 normalizes the second distance image 89 by using the first representative value 90A1, the second representative value 90B1, the third representative value 92A1, and the fourth representative value 92B1 acquired in step ST26. (See FIG. 7). After the processing in step ST28 is executed, the image composition processing shifts to step ST30 shown in FIG. 9B.

In step ST30 shown in FIG. 9B, the ratio applying unit 62E1 derives the first ratio 94A and the second ratio 94B by using the reliability degree map 88A that is generated in step ST18 (see FIG. 8). After the processing in step ST30 is executed, the image composition processing shifts to step ST32.

In step ST32, the ratio applying unit 62E1 applies the first ratio 94A, which is derived in step ST30, to the first distance image 86 (see FIG. 8). After the processing in step ST32 is executed, the image composition processing shifts to step ST34.

In step ST34, the ratio applying unit 62E1 applies the second ratio 94B, which is derived in step ST30, to the second distance image 89 (see FIG. 8). After the processing in step ST34 is executed, the image composition processing shifts to step ST36.

In step ST36, the composition unit 62F1 generates the composite image 100A by combining the first distance image 86 and the second distance image 89 (see FIG. 8) according to the first ratio 94A that is applied to the first distance image 86 and the second ratio 94B that is applied to the second distance image 89. After the processing in step ST36 is executed, the image composition processing shifts to step ST38.

In step ST38, the composition unit 62F1 performs various types of image processing on the composite image 100A. The composition unit 62F1 outputs an image obtained by performing various types of image processing on the composite image 100A to a default output destination as the processed image 75B. After the processing in step ST38 is executed, the image composition processing shifts to step ST40.

In step ST40, the composition unit 62F1 determines whether or not the condition for ending the image composition processing (hereinafter, referred to as an "end condition") is satisfied. Examples of the end condition include a condition that the reception device 76 receives an instruction of ending the image composition processing. In step ST40, in a case where the end condition is not satisfied, the determination is set as negative, and the image composition processing shifts to step ST10. In step ST40, in a case where the end condition is satisfied, the determination is set as positive, and the image composition processing is ended.

As described above, in the present first embodiment, the first distance image 86 is obtained by performing processing, which uses the generation model 82A1, on the captured image 75A1*a*, and the second distance image 89 is obtained by performing processing, which uses the phase difference image 75A2. The distance measurement, which uses the phase difference image 75A2, is performed with higher accuracy on the edge region that is captured in the captured image 75A1*a* than in the non-edge region that is captured in the captured image 75A1*a*. That is, the accuracy of a distance, which is specified from a pixel included in the edge region 96B (see FIG. 8) in the second distance image 89 that is obtained from the phase difference image 75A2, is higher than the accuracy of a distance, which is specified from a pixel included in the non-edge region 98B (see FIG. 8) in the second distance image 89.

On the other hand, the generation model 82A1 may erroneously determine that the edge region included in the captured image 75A1*a* is a noise component or may erroneously determine that the noise component is the edge region. Such erroneous determinations can be reduced by increasing the amount of training for the generation model 82A1 or increasing the number of interlayers of the generation model 82A1, but lead to an increase in cost. The generation model 82A1 can generate the non-edge region 98A (see FIG. 8) in the first distance image 86 with higher accuracy than the edge region 96A (see FIG. 8) without incurring such a cost. Further, the accuracy of the non-edge region 98A in the first distance image 86 is higher than the accuracy of the non-edge region 98B in the second distance image 89.

Therefore, in the imaging apparatus 10, the first distance image 86 and the second distance image 89 are combined according to the edge region 88A1 and the non-edge region 88A2 in the reliability degree map 88A. Accordingly, it is possible to obtain the composite image 100A that utilizes the characteristics of the first distance image 86 and the second distance image 89 that are the composition targets. That is, the advantage of the first distance image 86 (that is, the non-edge region 98A) can compensate for the disadvantage of the second distance image 89 (that is, the non-edge region 98B), and the advantage of the second distance image 89 (that is, the edge region 96B) can compensate for the disadvantage of the first distance image 86 (that is, the edge region 96A). As a result, it is possible to obtain the composite image 100A with higher accuracy as the distance image than the first distance image 86 or the second distance image 89.

In the present first embodiment, the subject that is captured in the captured image 75A1*a* is represented by the phase difference image 75A2, and the second distance image 89 is generated from the phase difference image 75A2. Further, the first distance image 86 is generated from the captured image 75A1*a*. That is, two distance images, that is, the first distance image 86 and the second distance image 89 are generated for the same subject by different methods. Therefore, it is possible to obtain the composite image 100A in which a characteristic (for example, advantage of high accuracy of distance with respect to the non-edge region) of a method of generating the first distance image 86 and a characteristic (for example, advantage of high accuracy of distance with respect to the edge region) of a method of generating the second distance image 89 are used.

In the present first embodiment, the first distance image 86 and the second distance image 89 are combined at the ratio 94 in accordance with the reliability degree that is derived based on the edge region 88A1 and the non-edge region 88A2. Therefore, it is possible to obtain the composite image 100A with higher accuracy as the distance image as compared with the case where the first distance image 86 and the second distance image 89 are combined at a ratio defined without considering the reliability degree that is derived based on the edge region 88A1 and the non-edge region 88A2.

In the present first embodiment, the reliability degree map 88A is generated by performing the non-AI method processing on the captured image 75A1*a*. Therefore, the reliability degree map 88A can be obtained with a simple configuration as compared with the case where the reliability degree map 88A is generated by using the AI method.

In the present first embodiment, the composition of the first distance image 86 and the second distance image 89 is realized by using the product-sum operation of the first distance image 86 and the second distance image 89. Therefore, the first distance image 86 and the second distance image 89 can be easily combined.

In the present first embodiment, the edge region and the non-edge region in the captured image 75A1*a* are represented as the reliability degree map 88A. That is, the edge region in the captured image 75A1*a* is represented as the edge region 88A1 in the reliability degree map 88A, and the non-edge region in the captured image 75A1*a* is represented as the non-edge region 88A2 in the reliability degree map 88A. Therefore, it is possible to easily distinguish between a region having a high reliability degree (that is, the edge region in the captured image 75A1*a*) and a region having a low reliability degree (that is, the non-edge region in the captured image 75A1*a*) as compared with the case where the edge region and the non-edge region in the captured image 75A1*a* are not mapped.

In the present first embodiment, the first distance image 86 and the second distance image 89 are combined after aligning the dimension of the second distance image 89 with the dimension of the first distance image 86. Therefore, it is possible to obtain the composite image 100A with higher accuracy as the distance image as compared with the case where the first distance image 86 and the second distance image 89 are combined in a state in which the dimension of the first distance image 86 and the dimension of the second distance image 89 are different from each other.

In the present first embodiment, the image region 90A in the first distance image 86 and the image region 92A in the second distance image 89 are similar to each other to a degree exceeding the default similarity degree, and the image region 90B in the first distance image 86 and the image region 92B in the second distance image 89 are similar to each other to a degree exceeding the default similarity degree. Thereafter, the second distance image 89 is normalized based on the first representative value 90A1 obtained from the image region 90A, the second representative value 90B1 obtained from the image region 90B, the third representative value 92A1 obtained from the image region 92A, and the fourth representative value 92B1 obtained from the image region 92B. Accordingly, the dimension of the first distance image 86 and the dimension of the second distance image 89 can be aligned with high accuracy.

In the first embodiment described above, although an example of the embodiment in which the first distance image 86 and the second distance image 89 are combined according to the ratio 94 corresponding to the reliability degree of the edge region 88A1 and the ratio 94 corresponding to the reliability degree of the non-edge region 88A2 has been described, the present disclosed technology is not limited to this. For example, one reliability degree may be assigned to the captured image 75A1a, and the first distance image 86 and the second distance image 89 may be combined at a ratio corresponding to one reliability degree. An example of one reliability degree that is assigned to the captured image 75A1a includes one reliability degree (for example, the reliability degree indicating a person-likeness with respect to the person region 85A) that is obtained by performing the AI method or the non-AI method processing (for example, processing of detecting a person as a subject by using the AI method or the non-AI method) on the captured image 75A1a. Thereafter, one ratio in accordance with one reliability degree is derived, and the first distance image 86 and the second distance image 89 are combined at the one derived ratio. In this case, the first distance image 86 and the second distance image 89 can be combined with a light processing load as compared with the case where processing of acquiring a plurality of reliability degrees, processing of deriving a plurality of ratios from the plurality of reliability degrees, and processing of combining the first distance image 86 and the second distance image 89 by using the plurality of ratios are performed.

Here, although a modification example in which the first distance image 86 and the second distance image 89 are combined at one ratio that is derived from one reliability degree assigned to the captured image 75A1a has been described, the present disclosed technology is not limited to this. For example, the first distance image 86 and the second distance image 89 may be combined at one ratio that is derived from one reliability degree assigned to the phase difference image 75A2. An example of one reliability degree that is assigned to the phase difference image 75A2 includes one reliability degree (for example, the reliability degree indicating a likeness of being in focus) that is obtained by performing the AI method or the non-AI method processing (for example, processing of determining whether or not a person is in focus as the subject by using the AI method or the non-AT method) on the phase difference image 75A2. In this case as well, one ratio in accordance with one reliability degree is derived, and the first distance image 86 and the second distance image 89 are combined at the one derived ratio. Accordingly, the first distance image 86 and the second distance image 89 can be combined with a light processing load as compared with the case where processing of acquiring a plurality of reliability degrees, processing of deriving a plurality of ratios from the plurality of reliability degrees, and processing of combining the first distance image 86 and the second distance image 89 by using the plurality of ratios are performed.

In the first embodiment described above, although an example of the embodiment in which the second distance image 89, which is generated by performing the non-AI method processing (that is, processing that is performed by the non-AI method processing unit 62C1) that plays the same role as the AI method processing (that is, processing that uses the generation model 82A1) that is performed by the AI method processing unit 62A1, is combined with the first distance image 86 has been described, the present disclosed technology is not limited to this. For example, the image that is combined with the first distance image 86 may be an image on which the non-AI method processing that plays the same role as the AI method processing that is performed by the AI method processing unit 62A1 is not performed.

An example of the image on which the non-AI method processing that plays the same role as the AI method processing that is performed by the AI method processing unit 62A1 is not performed includes a focus position specific image. The focus position specific image is an image that includes a mark (for example, a frame) in which a region in focus (hereinafter, referred to as a "focus region") can be specified. For example, the focus region may be specified by performing the AI method or the non-AI method processing on the captured image 75A1a or the phase difference image 75A2. The first distance image 86 and the focus position specific image (for example, a normalized focus position specific image) are combined at a specific ratio (for example, one ratio in accordance with one reliability degree assigned to the captured image 75A1a). Accordingly, it is possible to obtain an image obtained by combining the first distance image 86 and an image different from the distance image (here, as an example, the focus position specific image).

Here, although the focus position specific image is exemplified as an image to be combined with the first distance image 86, this is only an example, and the image to be combined with the first distance image 86 may be an image having a different type from the first distance image 86. Examples of the image having a different type from the first distance image 86 include the captured image 75A1a. Further, as another example of the image having a different type from the first distance image 86 includes an image obtained by adjusting various types of image quality parameters such as color, a dynamic range, brightness, and/or a contrast of the captured image 75A1a. The focus position specific image and the image having a different type from the first distance image 86 is an example of a "fourth image" and an "image on which the non-AI method processing that plays the same role as the first AI processing is not performed" according to the present disclosed technology.

In the first embodiment described above, although an example of the embodiment in which the first distance image 86 is generated by the AI method processing unit 62A1 has been described, the present disclosed technology is not limited to this, and an image having a different type from the distance image may be generated by the AI method processing unit 62A1.

In the first embodiment described above, although an example of the embodiment in which the second distance image 89 is generated by the non-AI method processing unit 62C1 has been described, the present disclosed technology is not limited to this, and an image having a different type from the distance image may be generated by the non-AI method processing unit 62C1.

In the first embodiment described above, although an example of the embodiment in which the first distance image 86 and the second distance image 89 are combined according to the edge region and the non-edge region in the captured image 75A1a has been described, the present disclosed technology is not limited to this. For example, the first distance image 86 and the second distance image 89 may be combined according to an indicator (for example, a phase difference) of the phase difference image 75A2. For example, the first distance image 86 and the second distance image 89 may be combined at a ratio that is defined according to the indicator (for example, the phase difference) of the phase difference image 75A2.

Further, the first distance image 86 and the second distance image 89 may be combined according to an indicator (for example, the edge region and the non-edge region) of the captured image 75A1a and to the indicator (for example, the phase difference) of the phase difference image 75A2.

For example, the first distance image 86 and the second distance image 89 may be combined at a ratio that is defined according to the indicator (for example, the edge region and the non-edge region) of the captured image 75A1a and to the indicator (for example, the phase difference) of the phase difference image 75A2.

In the first embodiment described above, although an example of the embodiment in which the second distance image 89 is normalized has been described, the present disclosed technology is not limited to this, and the first distance image 86 may be normalized in the same manner as the second distance image 89 is normalized.

Second Embodiment

Figure 10:
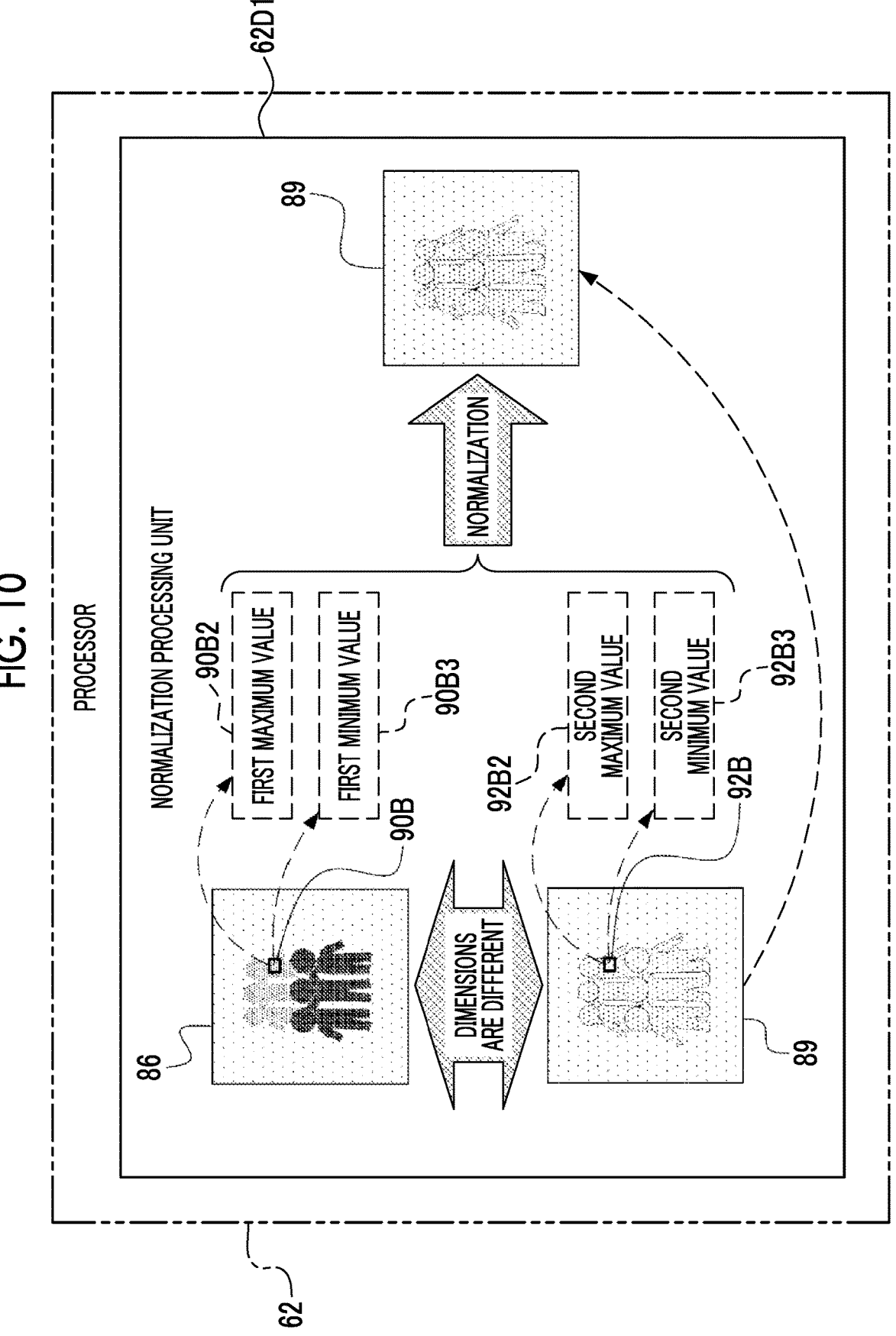
FIG. 10 is a conceptual diagram showing an example of the content of processing of the normalization processing unit according to a second embodiment.

In the first embodiment described above, although the normalization processing unit 62D1 acquires the first representative value 90A1 and the second representative value 90B1 from the image regions 90A and 90B in the first distance image 86, and acquires the third representative value 92A1 and the fourth representative value 92B1 from the image regions 92A and 92B in the second distance image 89, the present disclosed technology is not limited to this. For example, as shown in FIG. 10, the normalization processing unit 62D1 may acquire a first maximum value 90B2 and a first minimum value 90B3 from the image region 90B in the first distance image 86, and acquire a second maximum value 92B2 and a second minimum value 92B3 from the image region 92B in the second distance image 89.

Here, the first maximum value 90B2 is the maximum value among the pixel values of all the pixels constituting the image region 90B. The first minimum value 90B3 is the minimum value among the pixel values of all the pixels constituting the image region 90B. The second maximum value 92B2 is the maximum value among the pixel values of all the pixels constituting the image region 92B. The second minimum value 92B3 is the minimum value among the pixel values of all the pixels constituting the image region 92B.

The image region 90B is an example of a "single fifth image region" according to the present disclosed technology. The image region 92B is an example of a "single sixth image region" according to the present disclosed technology. The first maximum value 90B2 and the first minimum value 90B3 are examples of "a plurality of third representative values" according to the present disclosed technology. The second maximum value 92B2 and the second minimum value 92B3 are examples of "a plurality of fourth representative values" according to the present disclosed technology.

The normalization processing unit 62D1 normalizes the second distance image 89 based on the first maximum value 90B2, the first minimum value 90B3, the second maximum value 92B2, and the second minimum value 92B3.

Here, "1_B1(x, y)" is defined by using the following formula (2) in a case where the pixel value in the second distance image 89 is set to "1_B(x, y)", the first maximum value 90B2 is set to "1_Amax", the first minimum value 90B3 is set to "1_Amin", the second maximum value 92B2 is set to "1_Bmax", the second minimum value 92B3 is set to "1_Bmin", and the normalized pixel value is set to "1_B1(x, y)". The normalization processing unit 62D1 normalizes the second distance image 89 by converting a pixel value (that is, "1_B(x, y)") of each pixel in the second distance image 89 into "1_B1(x, y)" by using the formula (2).

$$1\_B1(x,y)=\{1\_B(x,y)-1\_Bmin\}*\{(1\_Amax-1\_Amin)/(1\_Bmax-1\_Bmin)\}+1\_Amin \qquad (2)$$

As described above, in the second embodiment, the second distance image 89 is normalized based on the first maximum value 90B2 and the first minimum value 90B3 obtained from the image region 90B, and the second maximum value 92B2 and the second minimum value 92B3 obtained from the image region 92B. Accordingly, since it is not necessary to specify a plurality of image regions from one distance image as in the example shown in FIG. 7, a processing load required for normalizing the second distance image 89 can be reduced by the amount that it is not necessary to specify the plurality of image regions.

In the second embodiment described above, although an example of the embodiment in which the normalization processing unit 62D1 may acquire a first maximum value 90B2 and a first minimum value 90B3 from the image region 90B in the first distance image 86, and acquire a second maximum value 92B2 and a second minimum value 92B3 from the image region 92B in the second distance image 89 has been described, this is only an example. For example, the normalization processing unit 62D1 may acquire the maximum value and the minimum value among the pixel values of all the pixels constituting the image region 90A (see FIG. 7) in the first distance image 86, and acquire the maximum value and the minimum value among the pixel values of all the pixels constituting the image region 92A (see FIG. 7) in the second distance image 89.

That is, the first distance image 86 or the second distance image 89 may be normalized based on the maximum value and the minimum value obtained from a single image region in the first distance image 86 and the maximum and minimum values obtained from a single image region in the second distance image 89. The single image region in the first distance image 86 and the single image region in the second distance image 89 are similar to each other to a degree exceeding the default similarity degree similar to a relationship between the image region 90A and the image region 92A shown in FIG. 7, and are image regions having a relationship that the positions of the first distance image 86 and the second distance image 89 correspond to each other.

In the second embodiment described above, although the first maximum value 90B2 and the first minimum value 90B3 are exemplified, this is only an example, and other values may be used instead of first maximum value 90B2 and first minimum value 90B3. For example, the next largest pixel value after the maximum value among the pixel values of all the pixels constituting the image region 90B and the next smallest pixel value after the minimum value among the pixel values of all the pixels constituting the image region 90B may be used instead of the first maximum value 90B2 and the first minimum value 90B3. Further, the maximum value or the minimum value among the pixel values of all the pixels constituting the image region 90B and the median value among the pixel values of all the pixels constituting the image region 90B may be used instead of the first maximum value 90B2 and the first minimum value 90B3. Further, similarly to the first maximum value 90B2 and the first minimum value 90B3, the second maximum value 92B2 and the second minimum value 92B3 may be replaced with other values.

Third Embodiment

In the first embodiment described above, although an example of the embodiment in which the reliability degree is derived by performing the non-AI method processing (that is, the processing that uses the digital filter 84A1) on the captured image 75A1a, the present disclosed technology is not limited to this. For example, the reliability degree may be derived by performing the AI method processing on the captured image 75A1a.

Figure 11:
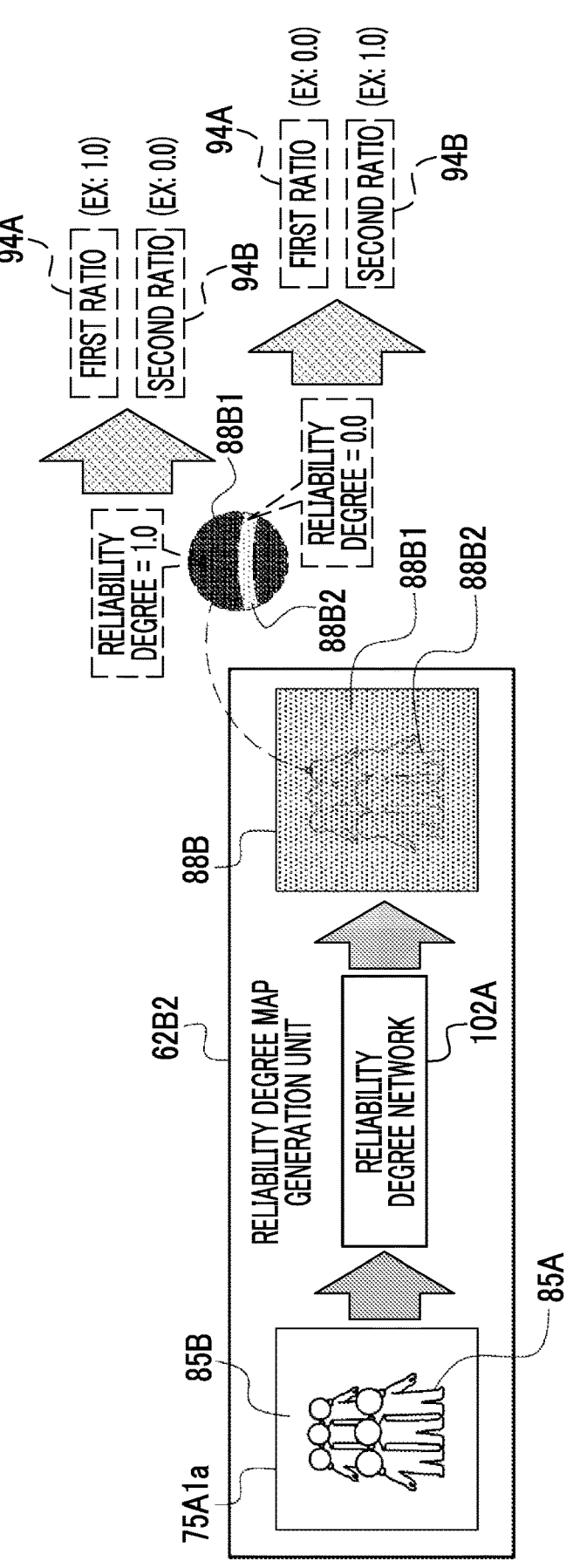
FIG. 11 is a conceptual diagram showing an example of the content of processing of the reliability degree map generation unit according to a third embodiment.

In this case, for example, as an example shown in FIG. 11, a reliability degree map generation unit 62B2 is used instead of the reliability degree map generation unit 62B1 described in the first embodiment. The reliability degree map generation unit 62B2 generates a reliability degree map 88B by performing processing, which uses a trained reliability degree network 102A, on the captured image 75A1a. The reliability degree network 102A is an example of a "trained model" and a "neural network" according to the present disclosed technology.

The reliability degree network 102A is a neural network that detects the non-edge region from the input captured image 75A1a and applies a higher reliability degree (for example, a degree of indicating a likeness of the non-edge region) to the non-edge region than the edge region. The reliability degree network 102A is, for example, a trained mathematical model that includes a convolutional neural network capable of detecting an object.

The reliability degree network 102A generates and outputs the reliability degree map 88B corresponding to the captured image 75A1a, based on the input captured image 75A1a. The reliability degree map 88B is, for example, a map that is generated based on a feature amount map obtained from an interlayer of the convolutional neural network. The reliability degree map 88B includes a non-edge region 88B1 and an edge region 88B2. The non-edge region 88B1 corresponds to a non-edge region in the captured image 75A1a and is an element in which the first distance image 86 described in the first embodiment is reliable. The edge region 88B2 corresponds to an edge region in the captured image 75A1a and is an element in which the second distance image 89 described in the first embodiment is reliable.

In the example shown in FIG. 11, the non-edge region 88B1 is an image region where a reliability degree with respect to the captured image 75A1a is "1.0", and the edge region 88B2 is an image region where a reliability degree with respect to the captured image 75A1a is "0.0". This means that the non-edge region 88B1 seems to be a non-edge region and the edge region 88B2 does not seem to be a non-edge region. In other words, it means that the non-edge region 88B1 is an image region where it is better to rely on the first distance image 86, and the edge region 88B2 is an image region where it is better not to rely on the first distance image 86 (that is, an image region where it is better to rely on the second distance image 89).

Therefore, the first ratio 94A for the non-edge region 88B1 is larger than the second ratio 94B for the non-edge region 88B1. In the example shown in FIG. 11, the first ratio 94A for the non-edge region 88B1 is "1.0", and the second ratio 94B for the non-edge region 88B1 is "0.0". On the other hand, the first ratio 94A for the edge region 88B2 is smaller than the second ratio 94B for the edge region 88B2. In the example shown in FIG. 11, the first ratio 94A for the edge region 88B2 is "0.0", and the second ratio 94B for the edge region 88B2 is "1.0". The first ratio 94A and the second ratio 94B, which are obtained in this way, are used by the ratio applying unit 62E1 and the composition unit 62F1 (see FIG. 8) in the manner described in the first embodiment. Therefore, effects similar to those of the above-described embodiments can be obtained even in a case where the reliability degree map 88B, which is obtained by performing the processing that uses the reliability degree network 102A on the captured image 75A1a, is used.

Further, in the third embodiment described above, although an example of the embodiment in which the reliability degree map 88B is generated by performing the AI method processing on the captured image 75A1a has been described, the reliability degree map 88B may be generated by performing the AI method processing on the first distance image 86.

Figure 12:
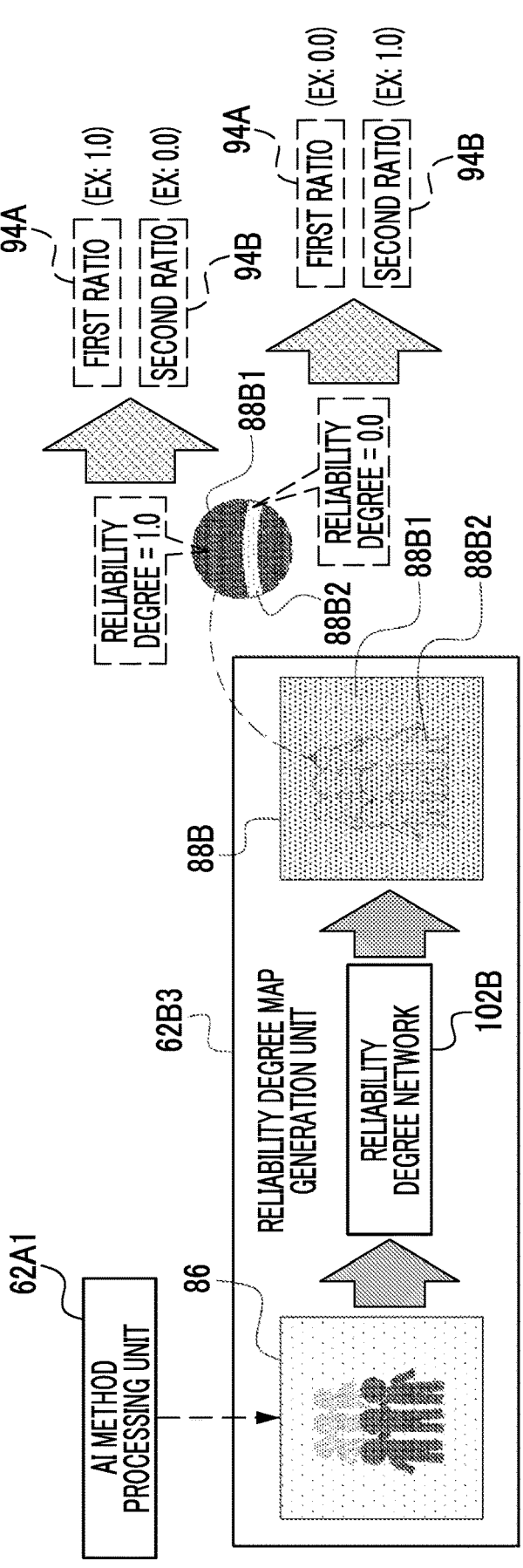
FIG. 12 is a conceptual diagram showing a modification example of the content of processing of the reliability degree map generation unit according to the third embodiment.

In this case, for example, as shown in FIG. 12, a reliability degree map generation unit 62B3 is used instead of the reliability degree map generation unit 62B2 shown in FIG. 11. The reliability degree map generation unit 62B3 performs processing that uses the reliability degree network 102B. The reliability degree network 102B is a neural network that detects the non-edge region from the input distance image and applies a higher reliability degree (for example, a degree of indicating a likeness of the non-edge region) to the non-edge region than the edge region. The reliability degree network 102B is, for example, a trained model that includes a convolutional neural network capable of detecting an object.

The reliability degree map generation unit 62B3 acquires the first distance image 86 from the AI method processing unit 62A1 and inputs the acquired first distance image 86 to the reliability degree network 102B. The reliability degree network 102B generates the reliability degree map 88B corresponding to the first distance image 86, based on the input first distance image 86.

Fourth Embodiment

In the third embodiment described above, although an example of the embodiment in which the reliability degree of each pixel in the captured image 75A1a is derived and mapped has been described, the present disclosed technology is not limited to this. For example, the captured image 75A1a may be divided into a plurality of image regions, and the reliability degree may be derived and mapped for each of the divided and obtained image regions.

Figure 13:
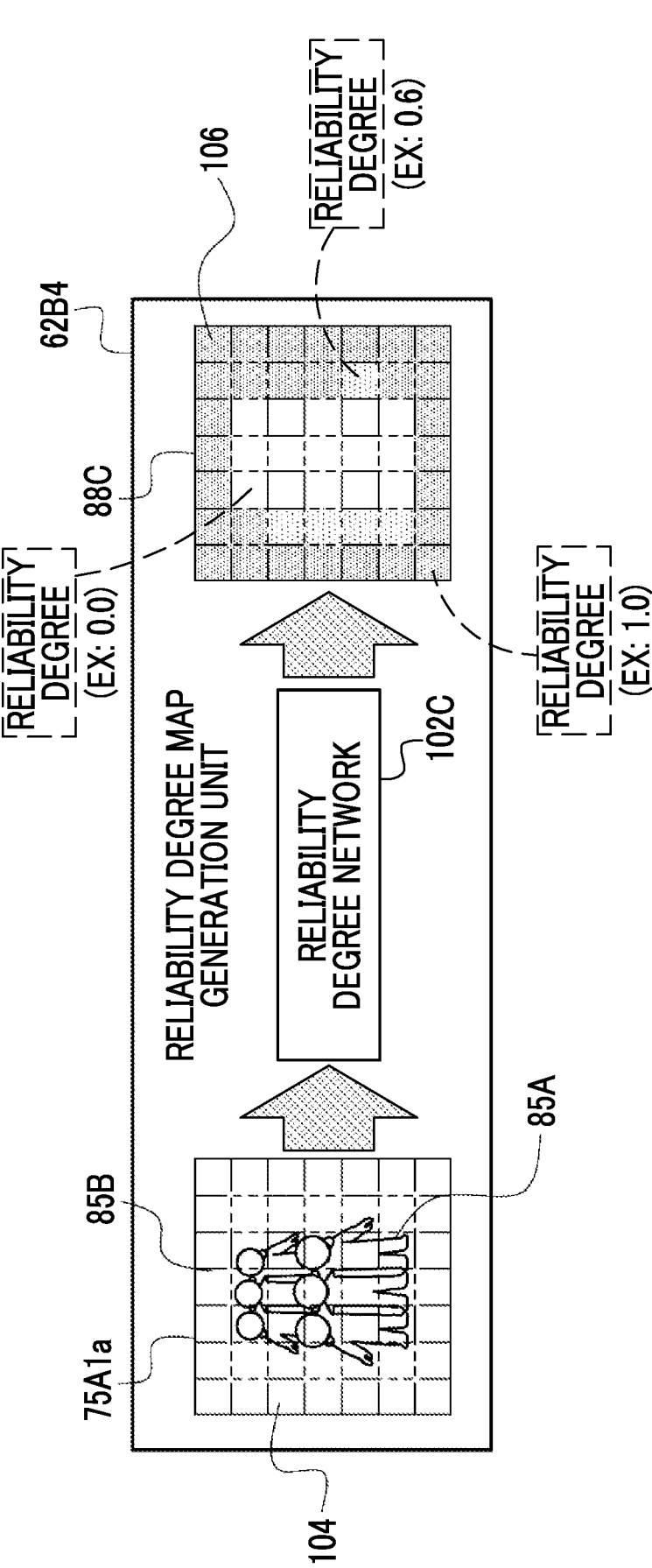
FIG. 13 is a conceptual diagram showing an example of the content of processing of the reliability degree map generation unit according to a fourth embodiment.
Figure 20:
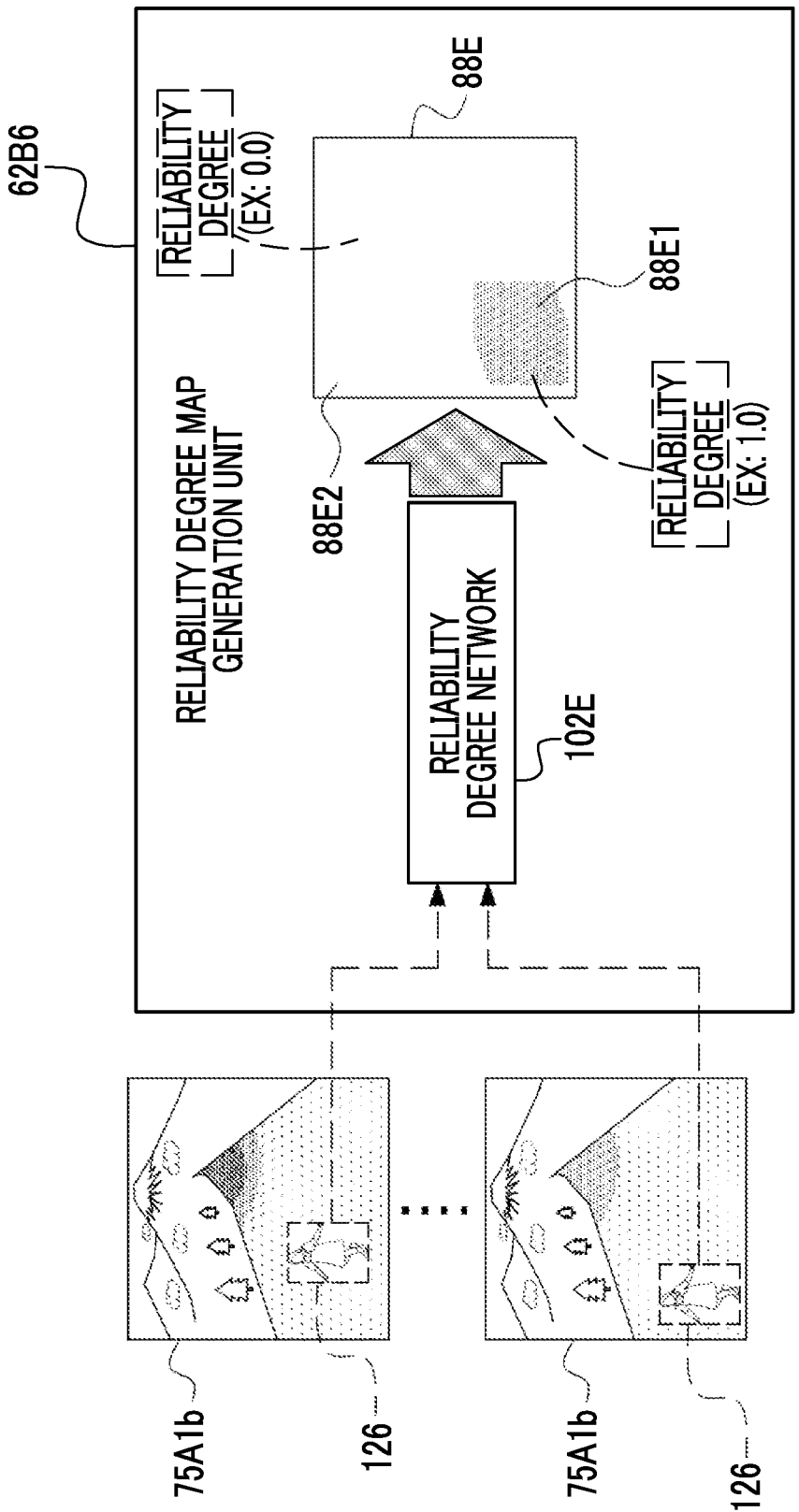
FIG. 20 is a conceptual diagram showing an example of the content of processing of the reliability degree map generation unit according to the sixth embodiment.

In this case, for example, as shown in FIG. 13, a reliability degree map generation unit 62B4 is used instead of the reliability degree map generation unit 62B2 shown in FIG. 11. The reliability degree map generation unit 62B4 performs processing that uses the reliability degree network 102C.

The captured image 75A1a is divided into a plurality of divided regions 104. The plurality of divided regions 104 are image regions that are divided by dividing the captured image 75A1a with a matrix shape. In the example shown in FIG. 13, a rectangular-shaped image region, which consists of a plurality of pixels, is shown as an example of the divided region 104. The plurality of divided regions 104 are an example of "a plurality of first image regions" according to the present disclosed technology.

The reliability degree map generation unit 62B4 inputs the captured image 75A1a to the reliability degree network 102C. The reliability degree network 102C generates the reliability degree map 88C based on the input captured image 75A1a. In the reliability degree network 102C, as compared to the reliability degree network 102A shown in FIG. 11, the difference is that the reliability degree network 102A derives the reliability degree at a unit of a pixel in the captured image 75A1a, whereas the reliability degree network 102C derives the reliability degree for each divided region 104 of the captured image 75A1a.

The reliability degree network 102C derives the reliability degree (that is, the reliability degree that indicates the non-edge region-likeness), which is a reliable degree with respect to the corresponding divided region 104 for each divided region 104, and generates and outputs the reliability degree map 88C by mapping the derived reliability degree. The reliability degree that is derived for each divided region 104 is a "first division reliability degree" according to the present disclosed technology. The reliability degree map 88C is an example of a "first reliability degree" and "a plurality of first division reliability degrees" according to the present disclosed technology.

The reliability degree map 88C is divided into a plurality of divided regions 106. Positions of the plurality of divided regions 106 in the reliability degree map 88C correspond to a plurality of divided regions 104 in the captured image 75A1*a*. The derived reliability degrees are distributed in the reliability degree map 88C. That is, the derived reliability degree for each divided region 106 is assigned to the reliability degree map 88C. In other words, the reliability degree map 88C is a map that represents a correspondence relationship between the derived plurality of reliability degrees and the plurality of divided regions 104 in the captured image 75A1*a*.

Figure 14:
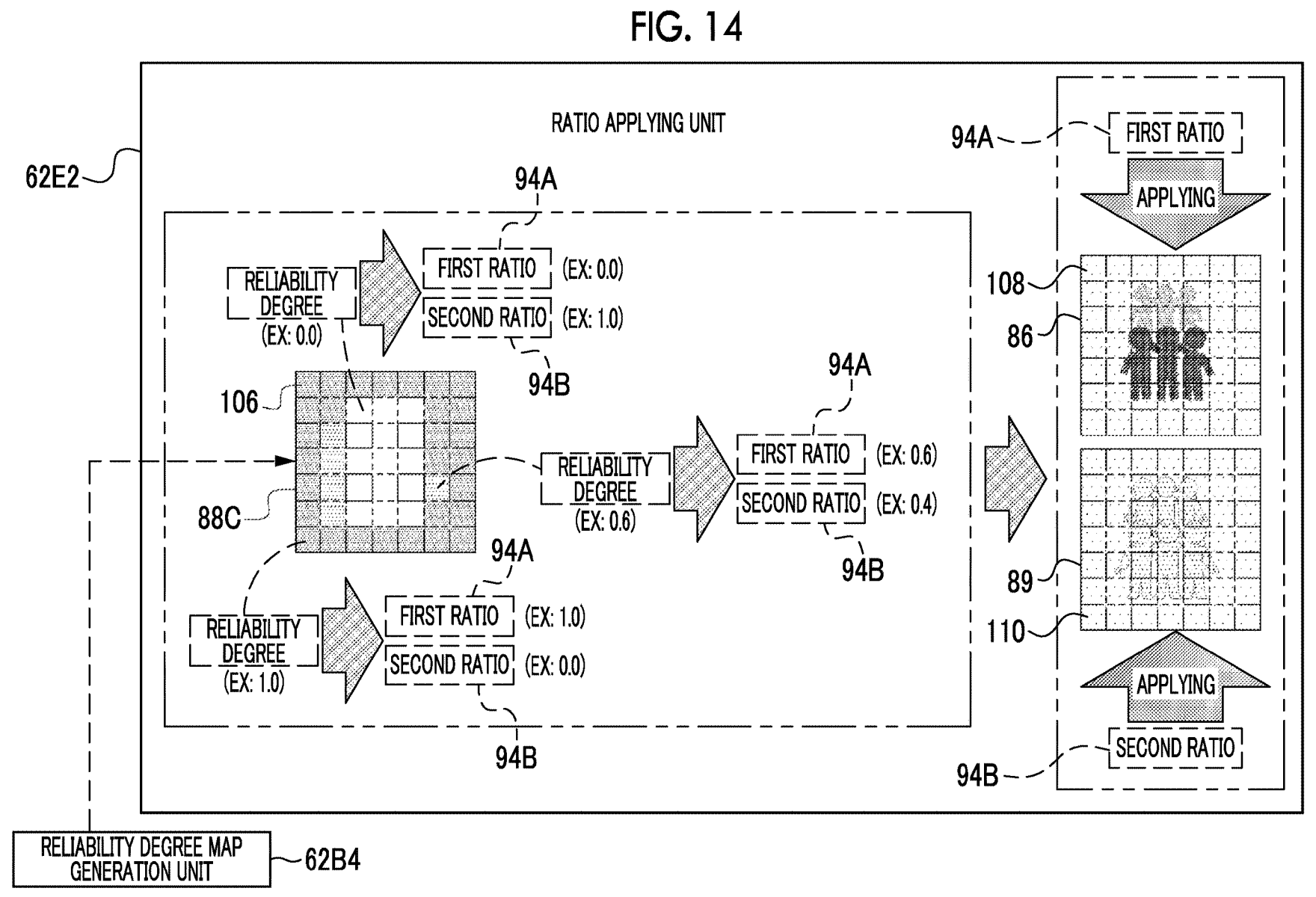

As an example shown in FIG. 14, the ratio applying unit 62E2 derives the first ratio 94A and the second ratio 94B for each divided region 106 in the reliability degree map 88C. In the example shown in FIG. 14, for the divided region 106 of which the reliability degree is "0.0", the first ratio 94A is "0.0" and the second ratio 94B is "1.0". Further, for the divided region 106 of which the reliability degree is "1.0", the first ratio 94A is "1.0" and the second ratio 94B is "0.0". Further, for the divided region 106 of which the reliability degree is "0.6", the first ratio 94A is "0.6" and the second ratio 94B is "0.4".

The first distance image 86 is divided into a plurality of divided regions 108. Positions of the plurality of divided regions 108 in the first distance image 86 correspond to the positions of the plurality of divided regions 106 in the reliability degree map 88C. Further, the second distance image 89 (that is, the normalized second distance image 89) is divided into a plurality of divided regions 110. Positions of the plurality of divided regions 110 in the second distance image 89 correspond to the positions of the plurality of divided regions 106 in the reliability degree map 88C.

The ratio applying unit 62E2 applies the first ratio 94A, which is derived for each divided region 106, to the divided region 108 corresponding to the divided region 106. Further, the ratio applying unit 62E2 applies the second ratio 94B, which is derived for each divided region 106, to the divided region 110 corresponding to the divided region 106.

As an example shown in FIG. 15, the composition unit 62F2 generates a composite image 100B by combining the first distance image 86 and the second distance image 89 according to the first ratio 94A and the second ratio 94B derived by the ratio applying unit 62E2. The composite image 100B is divided into a plurality of divided regions 112. Positions of the plurality of divided regions 112 in the composite image 100B correspond to the positions of the plurality of divided regions 106 (see FIGS. 13 and 14) in the reliability degree map 88C.

A pixel value in the composite image 100B is a result of a product-sum operation (that is, a product-sum operation of pixel values for the same pixel positions between the first distance image 86 and the second distance image 89) of the pixel value in the first distance image 86 and the pixel value in the second distance image 89. That is, the composition unit 62F2 determines the pixel value in the divided region 112 corresponding to the divided regions 108 and 110 by adding the first pixel value in the divided region 108 and the second pixel value in the divided region 110. The first pixel value in the divided region 108 and the second pixel value in the divided region 110 are pixel values for the same pixel position between the first distance image 86 and the second distance image 89. Further, the first pixel value in the divided region 108 is a pixel value obtained by multiplying the pixel value in the divided region 108 and the first ratio 94A applied to the divided region 108. The second pixel value in the divided region 110 is a pixel value obtained by multiplying the pixel value in the divided region 110 and the second ratio 94B applied to the divided region 110.

The divided region 108 corresponding to the divided region 104 of which the reliability degree exceeds a first reference value in the reliability degree map 88C is combined at a higher ratio than the corresponding divided region 110 in the second distance image 89. An example of the first reference value includes "0.5". Further, an example of the divided region 108 corresponding to the divided region 104 of which the reliability degree exceeds the first reference value in the reliability degree map 88C includes the divided region 108 corresponding to a divided region 104 having the reliability degree of "1.0" or "0.6" (see FIG. 14) in the reliability degree map 88C. Further, an example of a ratio higher than the corresponding divided region 110 in the second distance image 89 includes "1.0" or "0.6" (see FIG. 14).

Here, the divided region 108 is an example of an "image region in a second image corresponding to a first image region of which a first division reliability degree exceeds a first reference value in a first reliability degree map" according to the present disclosed technology. Further, the ratio higher than the corresponding divided region 110 in the second distance image 89 is an example of a "ratio higher than a corresponding image region in a fourth image" according to the present disclosed technology.

The second distance image 89 is used as it is without using the first distance image 86 in a partial region of the composite image 100B. The partial region where the second distance image 89 is used as it is, is the divided region 110 (here, as an example, the divided region 110 to which "1.0" is applied as the second ratio 94B) corresponding to the divided region 104 of which the reliability degree is equal to or less than a second reference value (here, as an example, "0.0"), which is less than the first reference value, in the reliability degree map 88C. Here, the partial region in the composite image 100B (that is, the partial region where the second distance image 89 is used as it is) is an example of a "first specific image region" according to the present disclosed technology.

As described above, in the present fourth embodiment, the captured image 75A1*a* is divided into the plurality of divided regions 104, and the reliability degree with respect to the corresponding divided region 104 is derived for each divided region 104. Therefore, it is possible to obtain the composite image 100B with higher accuracy as the distance image as compared with the case where only one reliability degree is assigned to the captured image 75A1*a*.

In the present fourth embodiment, the first distance image 86 and the second distance image 89 are combined according to the reliability degree map 88C in which the reliability degrees that are derived for each divided region 104 are distributed to the plurality of divided regions 104. Therefore, the processing load required for combining the first distance image 86 and the second distance image 89 can be reduced as compared with the case where the first distance image 86 and the second distance image 89 are combined according to a map in which the reliability degrees are distributed in a unit of a pixel. Further, it is possible to obtain the composite image 100B with higher accuracy as the distance image as compared with the case where only one reliability degree is assigned to the captured image 75A1a.

In the present fourth embodiment, the divided region 108 corresponding to the divided region 104 of which the reliability degree exceeds a first reference value in the reliability degree map 88C is combined at a higher ratio than the corresponding divided region 110 in the second distance image 89. Therefore, it is possible to obtain the composite image 100B with higher accuracy as the distance image as compared with the case where the divided region 108 corresponding to the divided region 104 of which the reliability degree exceeds a first reference value in the reliability degree map 88C is combined at a lower ratio than the corresponding divided region 110 in the second distance image 89.

In the present fourth embodiment, the divided region 110 corresponding to the divided region 104 of which the reliability degree is equal to or less than the second reference value in the reliability degree map 88C is used as the partial region in the composite image 100B. Therefore, it is possible to obtain the composite image 100B with higher accuracy as the distance image as compared with the case where a region, which is obtained by combining the divided region 110 corresponding to the divided region 104 of which the reliability degree is equal to or less than the second reference value in the reliability degree map 88C and the divided region 108, is used as the partial region in the composite image 100B.

Fifth Embodiment

In the fourth embodiment described above, although an example of the embodiment in which the reliability degree with respect to the captured image 75A1a is derived by performing the AI method processing on the captured image 75A1a, the present disclosed technology is not limited to this. For example, the reliability degree with respect to the phase difference image 75A2 (that is, the reliable degree with respect to the phase difference image 75A2) may be derived by performing the AI method processing on the phase difference image 75A2. The reliability degree with respect to the phase difference image 75A2 is an example of a "second reliability degree" according to the present disclosed technology.

Figure 16:
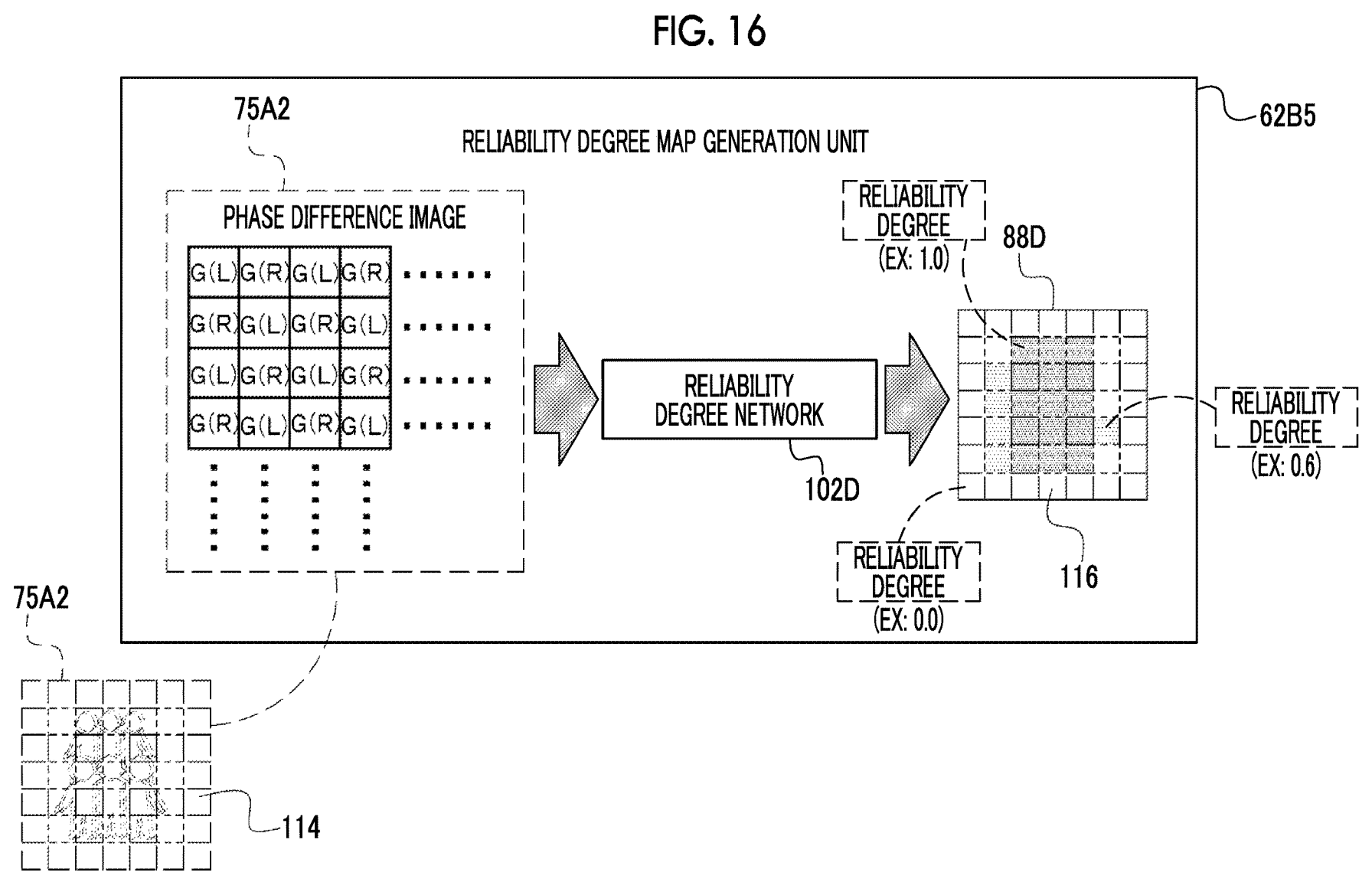

As an example shown in FIG. 16, the phase difference image 75A2 is divided into a plurality of divided regions 114, and the reliability degree is derived and mapped for each divided region 114. The plurality of divided regions 114 are image regions that are divided by dividing the phase difference image 75A2a with a matrix shape. The plurality of divided regions 114 are an example of "a plurality of second image regions" according to the present disclosed technology.

In the present fifth embodiment, a reliability degree map generation unit 62B5 is used instead of the reliability degree map generation unit 62B4 shown in FIG. 13. The reliability degree map generation unit 62B5 performs processing that uses a reliability degree network 102D.

The reliability degree map generation unit 62B5 inputs the phase difference image 75A2 to the reliability degree network 102D. The reliability degree network 102D generates a reliability degree map 88D based on the input phase difference image 75A2. In the reliability degree network 102D, as compared to the reliability degree network 102C shown in FIG. 13, the difference is that the reliability degree network 102C derives the reliability degree for each divided region 104 of the captured image 75A1a, whereas the reliability degree network 102D derives the reliability degree for each divided region 114 of the phase difference image 75A2.

The reliability degree network 102D derives the reliability degree (that is, the reliability degree that indicates the edge region-likeness), which is a reliable degree with respect to the corresponding divided region 114 for each divided region 114, and generates and outputs the reliability degree map 88D by mapping the derived reliability degree. The reliability degree that is derived for each divided region 114 is a "second division reliability degree" according to the present disclosed technology. The reliability degree map 88D is an example of a "second reliability degree" and "a plurality of second division reliability degrees" according to the present disclosed technology.

The reliability degree map 88D is divided into a plurality of divided regions 116. Positions of the plurality of divided regions 116 in the reliability degree map 88D correspond to positions of a plurality of divided regions 114 in the phase difference image 75A2. The derived reliability degrees are distributed in the reliability degree map 88D. That is, the derived reliability degree for each divided region 116 is assigned to the reliability degree map 88D. In other words, the reliability degree map 88D is a map that represents a correspondence relationship between the derived plurality of reliability degrees and the plurality of divided regions 114 in the phase difference image 75A2.

Figure 17:
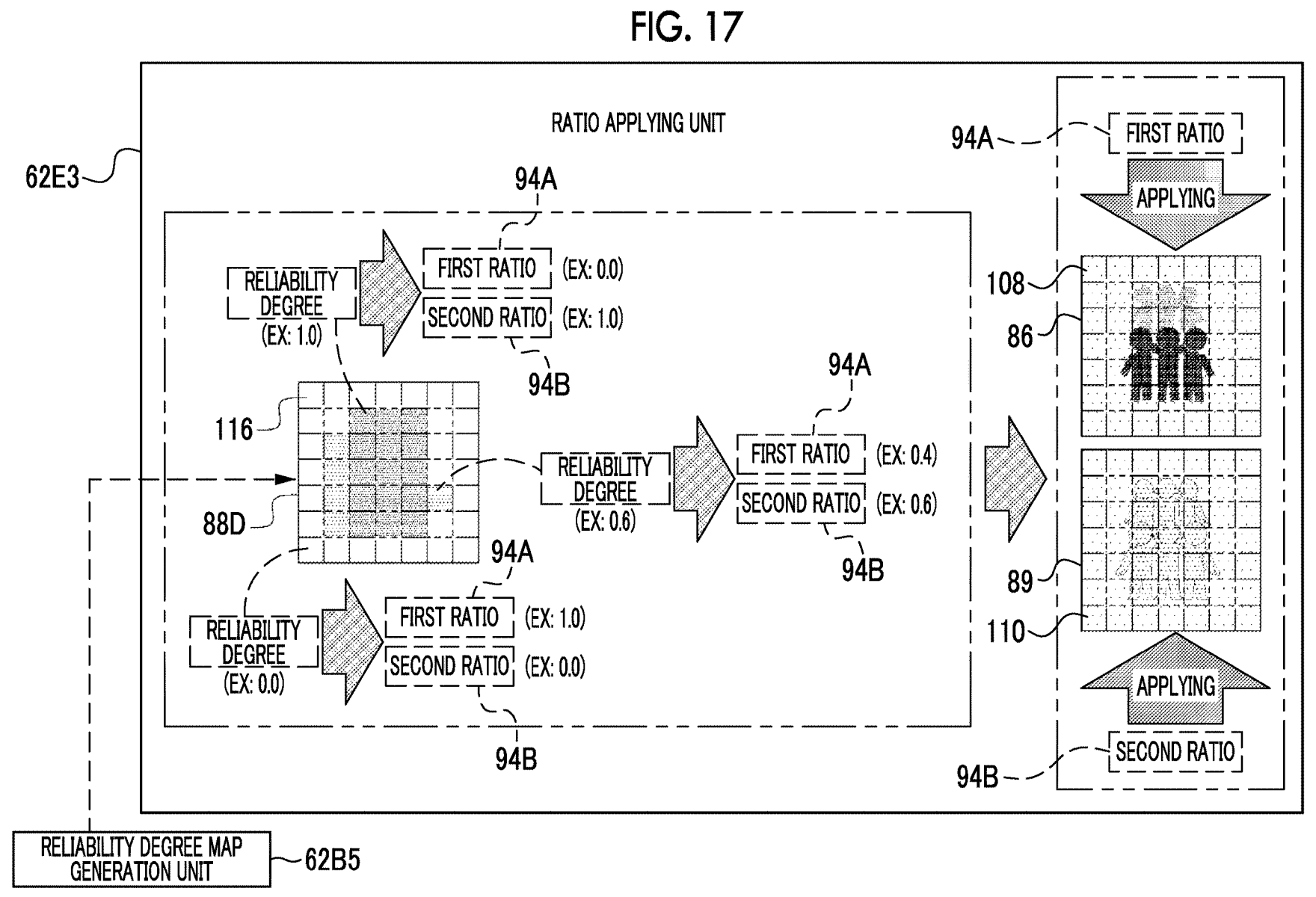

As an example shown in FIG. 17, the ratio applying unit 62E3 derives the first ratio 94A and the second ratio 94B for each divided region 116 in the reliability degree map 88D. In the example shown in FIG. 17, for the divided region 116 of which the reliability degree is "0.0", the first ratio 94A is "1.0" and the second ratio 94B is "0.0". Further, for the divided region 116 of which the reliability degree is "1.0", the first ratio 94A is "0.0" and the second ratio 94B is "1.0". Further, for the divided region 116 of which the reliability degree is "0.6", the first ratio 94A is "0.4" and the second ratio 94B is "0.6".

Positions of the plurality of divided regions 108 in the first distance image 86 correspond to the positions of the plurality of divided regions 116 in the reliability degree map 88D. Further, positions of the plurality of divided regions 110 in the second distance image 89 correspond to the positions of the plurality of divided regions 116 in the reliability degree map 88D.

The ratio applying unit 62E3 applies the first ratio 94A, which is derived for each divided region 116, to the divided region 108 corresponding to the divided region 116. Further, the ratio applying unit 62E3 applies the second ratio 94B, which is derived for each divided region 116, to the divided region 110 corresponding to the divided region 116.

Figure 18:
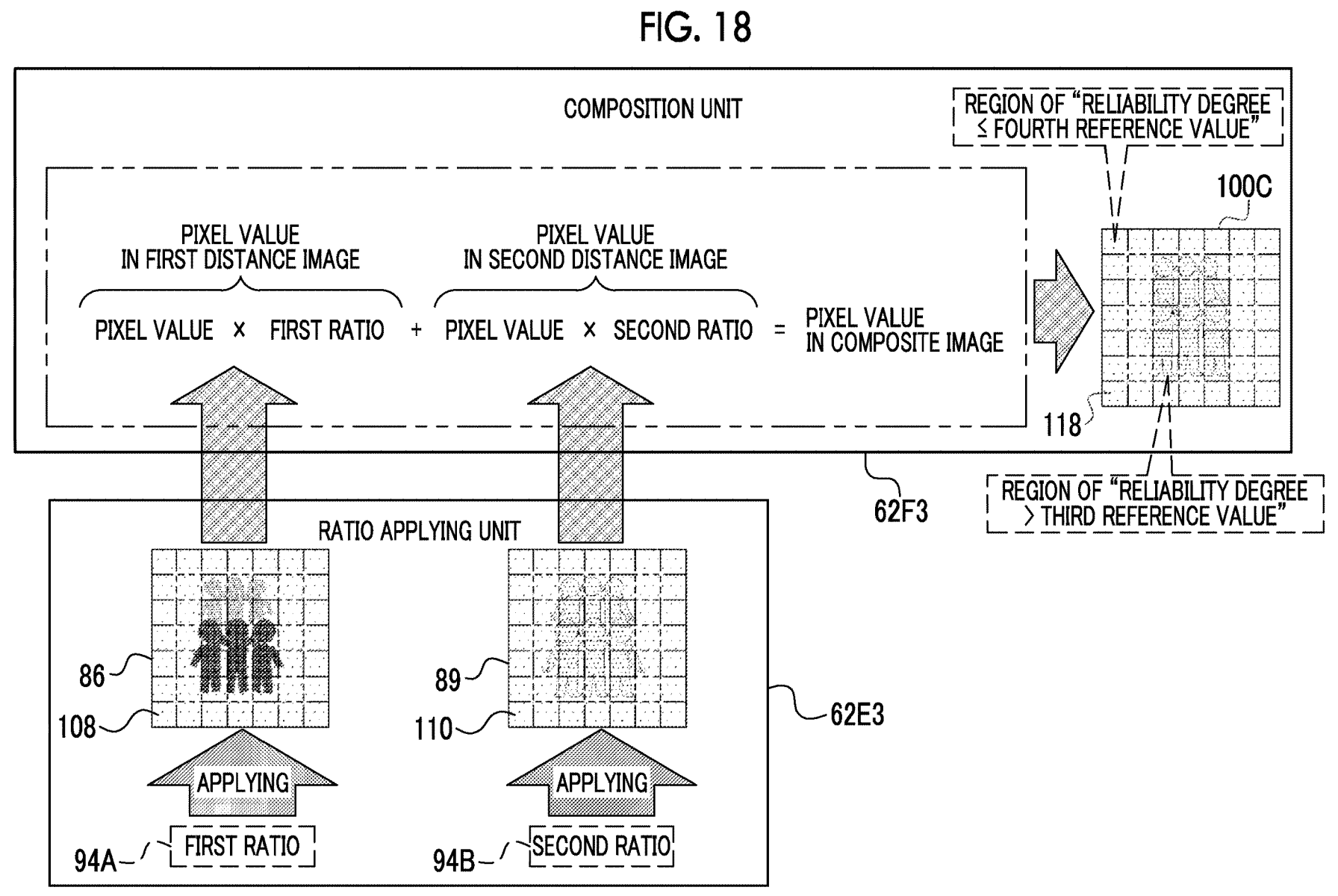

As an example shown in FIG. 18, the composition unit 62F3 generates a composite image 100C by combining the first distance image 86 and the second distance image 89 according to the first ratio 94A and the second ratio 94B derived by the ratio applying unit 62E3. The composite image 100C is divided into a plurality of divided regions 118. Positions of the plurality of divided regions 118 in the composite image 100C correspond to the positions of the plurality of divided regions 116 (see FIGS. 16 and 17) in the reliability degree map 88D.

A pixel value in the composite image 100C is a result of a product-sum operation (that is, a product-sum operation of pixel values for the same pixel positions between the first distance image 86 and the second distance image 89) of the pixel value in the first distance image 86 and the pixel value in the second distance image 89. That is, the composition unit 62F3 determines the pixel value in the divided region 118 corresponding to the divided regions 108 and 110 by adding the first pixel value in the divided region 108 and the second pixel value in the divided region 110. The meaning of the first pixel value in the divided region 108 and the meaning of the second pixel value in the divided region 110 have been described in the fourth embodiment, and thus the description thereof will be omitted here.

The divided region 108 corresponding to the divided region 114 of which the reliability degree exceeds a third reference value in the reliability degree map 88D is combined at a higher ratio than the corresponding divided region 110 in the second distance image 89. An example of the third reference value includes "0.5". Further, an example of the divided region 108 corresponding to the divided region 114 of which the reliability degree exceeds the third reference value in the reliability degree map 88D includes the divided region 108 corresponding to a divided region 114 having the reliability degree of "1.0" or "0.6" (see FIG. 17) in the reliability degree map 88D. Further, an example of a ratio higher than the corresponding divided region 110 in the second distance image 89 includes "1.0" or "0.6" (see FIG. 17).

Here, the divided region 118 is an example of an "image region in a fourth image corresponding to a second image region of which a second division reliability degree exceeds a third reference value in a second reliability degree map" according to the present disclosed technology. Further, the ratio higher than the corresponding divided region 110 in the second distance image 89 is an example of a "ratio higher than a corresponding image region in a second image" according to the present disclosed technology.

The first distance image 86 is used as it is without using the second distance image 89 in a partial region of the composite image 100C. The partial region where the first distance image 86 is used as it is, is the divided region 108 (here, as an example, the divided region 108 to which "0.0" is applied as the first ratio 94A) corresponding to the divided region 104 of which the reliability degree is equal to or less than a fourth reference value (here, as an example, "0.0"), which is less than the third reference value, in the reliability degree map 88D. Here, the partial region in the composite image 100C (that is, the partial region where the first distance image 86 is used as it is) is an example of a "second specific image region" according to the present disclosed technology.

As described above, in the present fifth embodiment, the phase difference image 75A2 is divided into the plurality of divided regions 114, and the reliability degree with respect to the corresponding divided region 114 is derived for each divided region 114. Therefore, it is possible to obtain the composite image 100C with higher accuracy as the distance image as compared with the case where only one reliability degree is assigned to the phase difference image 75A2.

In the present fifth embodiment, the first distance image 86 and the second distance image 89 are combined according to the reliability degree map 88D in which the reliability degrees that are derived for each divided region 114 are distributed to the plurality of divided regions 114. Therefore, the processing load required for combining the first distance image 86 and the second distance image 89 can be reduced as compared with the case where the first distance image 86 and the second distance image 89 are combined according to a map in which the reliability degrees are distributed in a unit of a pixel. Further, it is possible to obtain the composite image 100C with higher accuracy as the distance image as compared with the case where only one reliability degree is assigned to the phase difference image 75A2.

In the present fifth embodiment, the divided region 108 corresponding to the divided region 114 of which the reliability degree exceeds a third reference value in the reliability degree map 88D is combined at a higher ratio than the corresponding divided region 110 in the second distance image 89. Therefore, it is possible to obtain the composite image 100C with higher accuracy as the distance image as compared with the case where the divided region 108 corresponding to the divided region 114 of which the reliability degree exceeds a third reference value in the reliability degree map 88D is combined at a lower ratio than the corresponding divided region 110 in the second distance image 89.

In the present fifth embodiment, the divided region 110 corresponding to the divided region 114 of which the reliability degree is equal to or less than the fourth reference value in the reliability degree map 88D is used as the partial region in the composite image 100C. Therefore, it is possible to obtain the composite image 100C with higher accuracy as the distance image as compared with the case where a region, which is obtained by combining the divided region 110 corresponding to the divided region 114 of which the reliability degree is equal to or less than the fourth reference value in the reliability degree map 88D and the divided region 108, is used as the partial region in the composite image 100C.

Sixth Embodiment

In each of the embodiments described above, an example in which the first distance image 86 and the second distance image 89 are combined has been described, and in the sixth embodiment, an example of the embodiment in which an image, where an effect of the heat wave and the moving body on the image quality is reduced, is generated by performing the composition processing that uses the captured image 75A1, where the heat wave and the moving body are captured, will be described.

As an example shown in FIGS. 19 to 22, the processor 62 operates as an AI method processing unit 62A2, a reliability degree map generation unit 62B6, a non-AI method processing unit 62C2, a normalization processing unit 62D2, a ratio applying unit 62E4, a composition unit 62F4, and a moving body detection unit 122 by executing the image composition processing program 121 (see FIG. 4) on the RAM 66.

Figure 19:
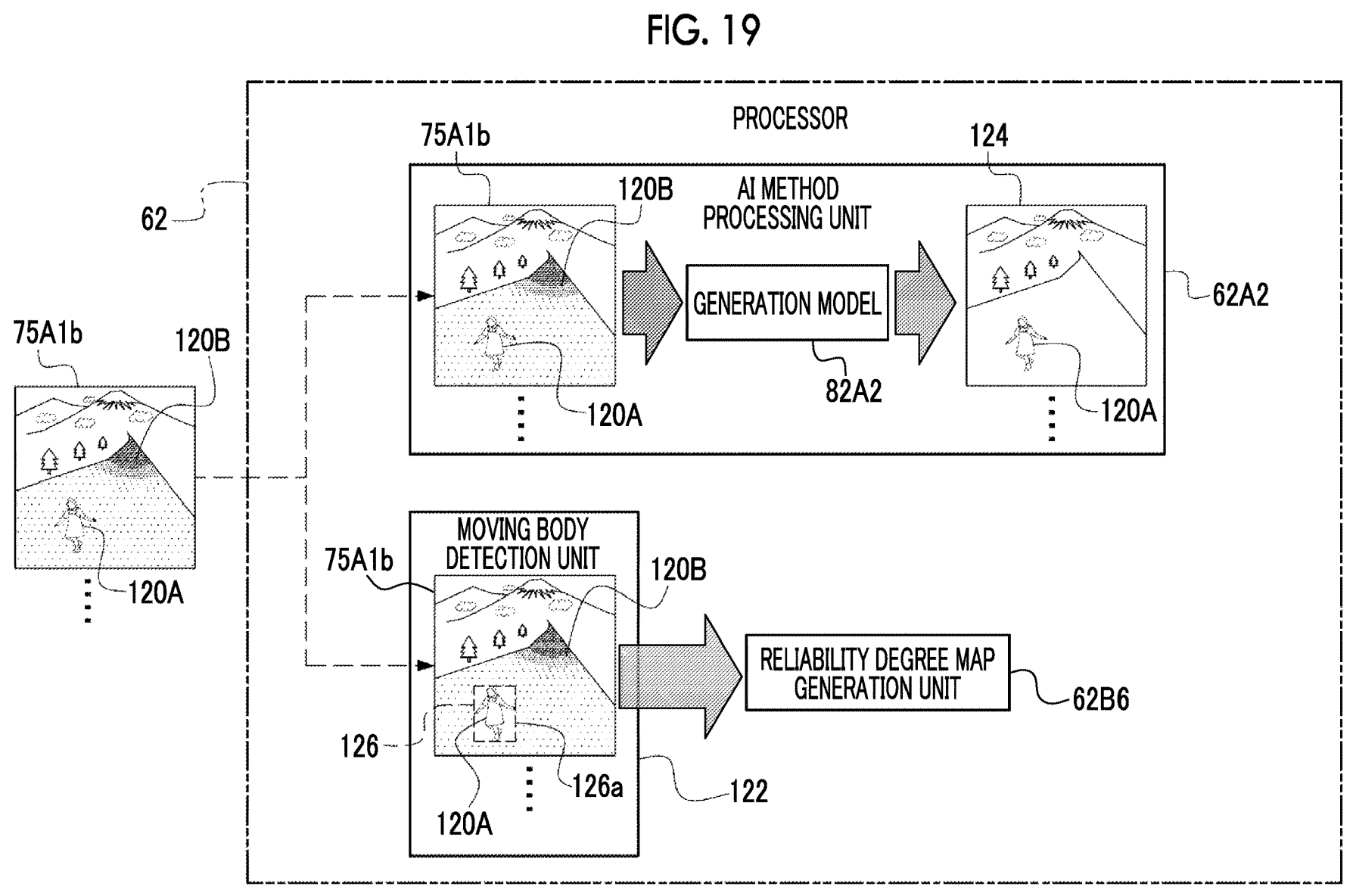

As an example shown in FIG. 19, a plurality of captured images 75A1b, which are obtained by performing continuous shooting, are input to the AI method processing unit 62A2 and the moving body detection unit 122 in a time series. The captured image 75A1b is an example of the captured image 75A1 shown in FIG. 3. The captured image 75A1b includes a moving body region 120A and a heat wave region 120B. The captured image 75A1b is an example of a "first image" and an "image obtained by imaging a subject including an environmental phenomenon and a moving body" according to the present disclosed technology.

The moving body region 120A is an image region where a moving body (in the example shown in FIG. 19, a moving person) is captured. The moving body that is captured in the captured image 75A1b is an example of a "moving body" according to the present disclosed technology. The heat wave region 120B is an image region where the heat wave is captured. The heat wave that is captured in the captured image 75A1*b* is an example of an "environmental phenomenon" according to the present disclosed technology. Here, although the heat wave is exemplified, this is only an example, and rainfall, snowfall, scattering, diffused reflection, a phenomenon in which the color changes due to a light source (for example, a light source that blinks regularly or irregularly), a phenomenon (for example, flicker) in which the brightness changes periodically due to the characteristics of the light source and the shutter of the imaging apparatus 10, or an environmental phenomenon such as a ghost.

The AI method processing unit 62A2 generates an image 124 by performing the AI method processing on the captured image 75A1*b*. The AI method processing with respect to the captured image 75A1*b* refers, for example, processing that uses the generation model 82A2. The generation model 82A2 is an example of the generation model 82A shown in FIG. 4. The AI method processing with respect to the captured image 75A1*b* is an example of "first AI processing" according to the present disclosed technology. The generation model 82A2 is a generation network in which a training of reducing the heat wave that is captured in the image was already performed. The image 124 is an image in which the heat wave that is captured in the captured image 75A1*b* is erased. Here, although an image in which the heat wave that is captured in the captured image 75A1*b* is erased is exemplified as the image 124, this is only an example, and the image 124 may be an image in which the heat wave is not completely erased and remains slightly, and the image 124 may be an image in which reflection of the heat wave is reduced compared to the captured image 75A1*b*.

The moving body detection unit 122 detects the moving body region 120A. A first example of the detection method of the moving body region 120A includes a detection method that uses the non-AI method processing. A second example of the detection method of the moving body region 120A includes a detection method that uses the AI method processing. A third example of the detection method of the moving body region 120A includes a detection method in which the detection method that uses the non-AI method processing and the detection method that uses the AI method processing are combined.

An example of the detection method that uses the non-AI method processing includes a method of detecting the moving body region 120A based on a difference between a plurality of captured images 75A1*b* on a time series. An example of the detection method that uses the AI method processing includes a method of detecting the moving body region 120A by performing the AI method processing (for example, processing that uses the convolutional neural network) on a single captured image 75A1*b* or a plurality of captured images 75A1*b* on a time series. An example of the detection method in which the detection method that uses the non-AI method processing and the detection method that uses the AI method processing are combined includes a method of detecting an image region, where an image region that is detected by using the detection method that uses the non-AI method processing and an image region that is detected by using the detection method that uses the AI method processing overlap, as the moving body region 120A.

As a result of detecting the moving body region 120A, the moving body detection unit 122 generates position specification information 126 that is capable of specifying a position of the moving body region 120A in the captured image 75A1*b* and outputs the position specification information 126 to the reliability degree map generation unit 62B6. The position specification information 126 is, for example, information that includes a plurality of coordinates capable of specifying a position of a rectangular frame 126*a* circumscribing the moving body region 120A in the captured image 75A1*b*. The position specification information 126 is an example of an "indicator" and "information that is capable of specifying whether or not the moving body is captured in a first image" according to the present disclosed technology.

The reliability degree map generation unit 62B6 performs processing that uses a reliability degree network 102E. The reliability degree map generation unit 62B6 generates a reliability degree map 88E based on the plurality of position specification information 126 obtained from the plurality of captured images 75A1*b*. The reliability degree map 88E is a map showing a distribution of the reliability degrees (that is, the reliable degrees) with respect to the moving body region 120A and is formed to have the same size as the captured image 75A1*b*. The reliability degree map 88E includes a first region 88E1 and a second region 88E2. The first region 88E1 is a region (that is, a region corresponding to the moving body region 120A) specified from the plurality of position specification information 126. The second region 88E2 is a remaining region (that is, a region where the moving body region 120A is not present) other than the first region 88E1. In the example shown in FIG. 20, the reliability degree of the first region 88E1 is "1.0", and the reliability degree of the second region 88E2 is "0.0".

In the present sixth embodiment, although an example of the embodiment in which the moving body detection unit 122 detects the moving body region 120A from the captured image 75A1*b*, and the reliability degree map generation unit 62B6 derives the reliability degree based on the detection result obtained by the moving body detection unit 122, this is only an example. For example, the reliability degree network 102E may detect the moving body region 120A from the plurality of captured images 75A1*b* and generate the reliability degree map 88E based on the detection result. In this case, for example, the reliability degree network 102E may be a convolutional neural network that is capable of detecting the moving body region 120A, and the reliability degree map 88E may be generated based on a feature amount map obtained from an interlayer of the reliability degree network 102E.

Figure 21:
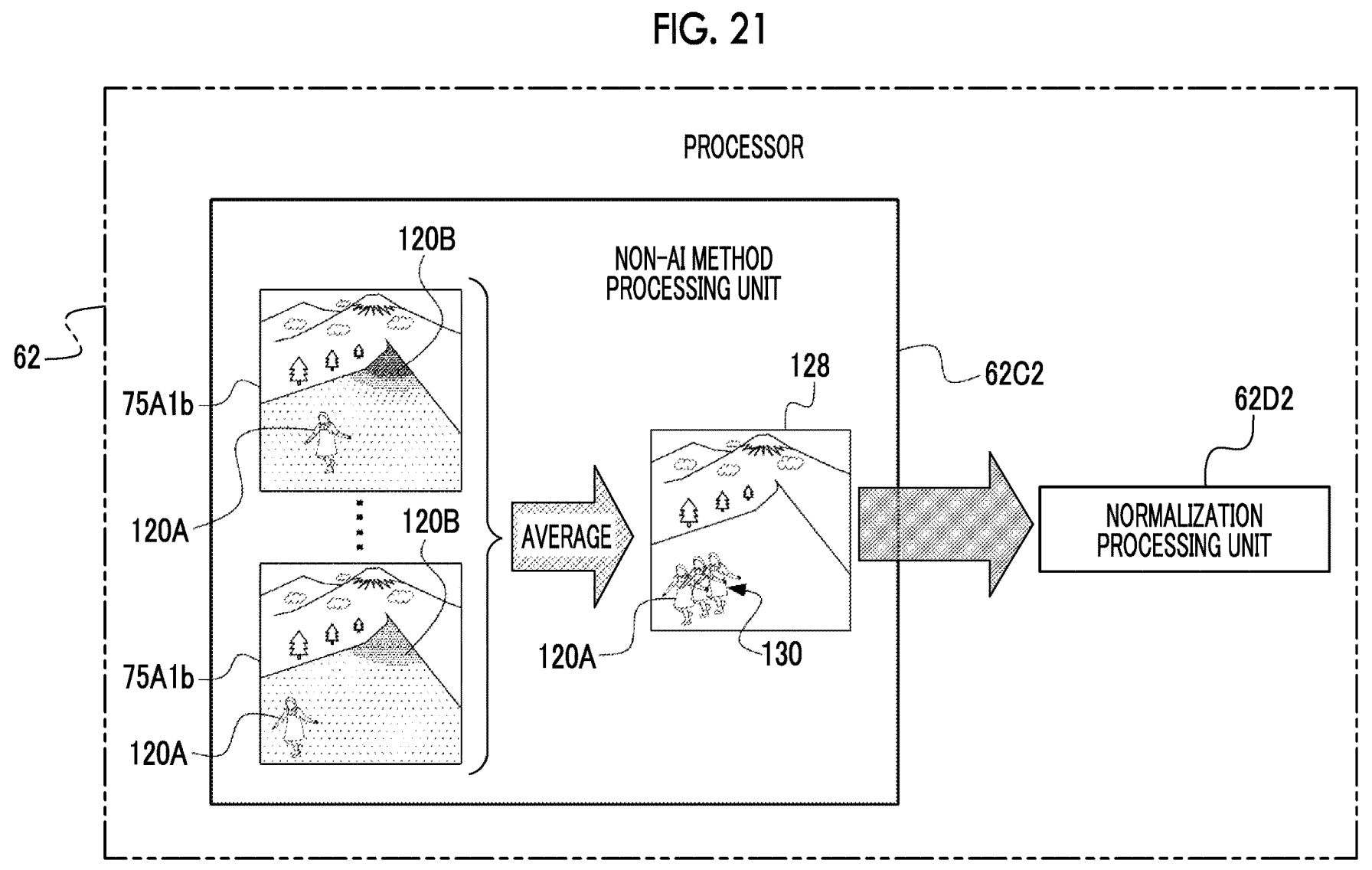

As an example shown in FIG. 21, the non-AI method processing unit 62C2 generates the image 128 by performing the non-AI method processing on the plurality of captured images 75A1*b* on a time series. The image 128 is an example of a "fourth image" and an "image obtained by performing non-AI method processing of reducing the reflection of the environmental phenomenon from a first image" according to the present disclosed technology.

An example of the non-AI method processing for the plurality of captured images 75A1*b* on a time series includes processing of averaging the plurality of captured images 75A1*b* on a time series. The image 128 is an image in which the heat wave that is captured in the captured image 75A1*b* is erased. Here, although an image in which the heat wave that is captured in the captured image 75A1*b* is erased is exemplified as the image 128, this is only an example, and the image 128 may be an image in which the heat wave is not completely erased and remains slightly, and the image 128 may be an image in which reflection of the heat wave is reduced compared to the captured image 75A1*b*.

Further, here, although an example of the embodiment in which the image 128 is generated by averaging the plurality of captured images 75A1*b* on a time series has been described, this is only an example. For example, the image 128 (that is, an image in which the reflection of the heat wave is reduced as compared to the captured image 75A1*b*) may be generated by performing the processing that uses the digital filter on the captured image 75A1*b*.

The non-AI method processing unit 62C2 generates the image 128 as described above and outputs the generated image 128 to the normalization processing unit 62D2. The normalization processing unit 62D2 normalizes the image 128 in the same manner as the normalization processing described in the first or second embodiment. Thereafter, the image 128, which is normalized in this way, is combined with the image 124 (see FIG. 19).

By the way, in a case where the image 128 is generated by performing the non-AI method processing (for example, averaging processing) on the plurality of captured images 75A1*b* on a time series, although the image 128 has less heat wave than the captured image 75A1*b*, an afterimage of the moving body region 120A is generated. Therefore, in a case where the image 128 itself and the image 124 are combined, an afterimage of the moving body region 120A is generated in the combined image.

Therefore, in the present sixth embodiment, an afterimage region 130 where an afterimage of the moving body region 120A is generated in the image 128 is specified based on the reliability degree map 88E in a previous step of combining the image 128 and the image 124, and the moving body region 120A in the image 128 is used for combining the image 128 and the image 124 instead of the specified afterimage region 130.

Figure 22:
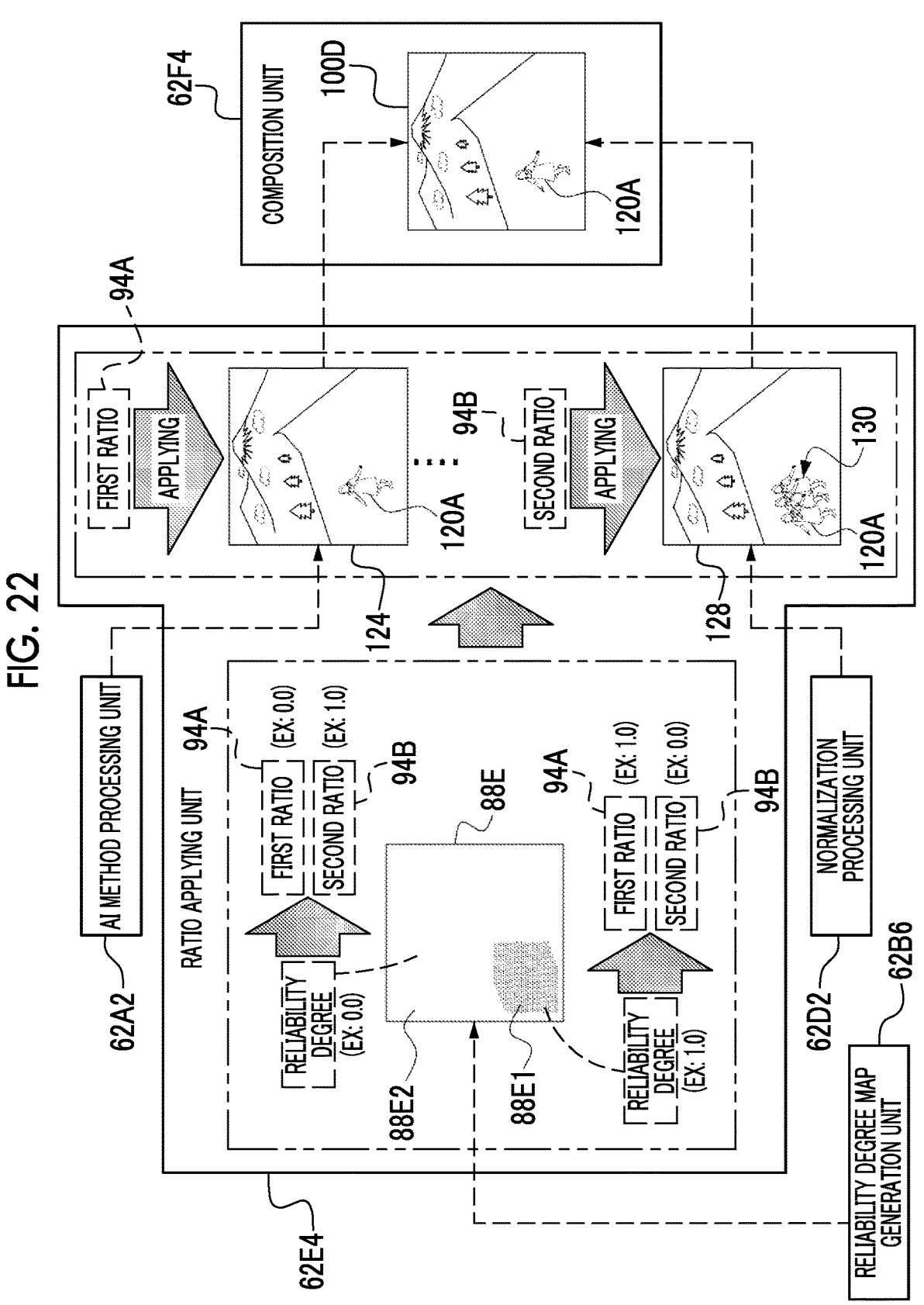
FIG. 22 is a conceptual diagram showing an example of the content of processing of the ratio applying unit and the composition unit according to the sixth embodiment.

In order to realize this, for example, as shown in FIG. 22, the ratio applying unit 62E4 derives a first ratio 94A and a second ratio 94B according to the reliability degree of the first region 88E1 in the reliability degree map 88E and derives the first ratio 94A and the second ratio 94B according to the reliability degree of the second region 88E2 in the reliability degree map 88E.

The reliability degree of the first region 88E1 is "1.0". In this case, in order to use the moving body region 120A in the image 128 instead of the afterimage region 130 for combining the image 128 and the image 124, "1.0" is used as the first ratio 94A derived according to the reliability degree of the first region 88E1, and "0.0" is used as the second ratio 94B derived according to the reliability degree of the first region 88E1.

On the other hand, the reliability degree of the second region 88E2 is "0.0". In this case, the first ratio 94A that is derived according to the reliability degree of the second region 88E2 is "0.0", and the second ratio 94B that is derived according to the reliability degree of the second region 88E2 is "1.0". The first ratio 94A, which is derived according to the reliability degree of the second region 88E2, may be a value larger than 0.0 in a range of 0.0 to 1.0. In this case, as a value of the second ratio 94B, a value obtained by subtracting the value of the first ratio 94A from 1.0 is used.

The ratio applying unit 62E4 applies the first ratio 94A that is derived according to the reliability degree of the first region 88E1 to the image region corresponding to the first region 88E1 among all the image regions in the image 124. Further, the ratio applying unit 62E4 applies the second ratio 94B that is derived according to the reliability degree of the first region 88E1 to the image region corresponding to the first region 88E1 among all the image regions in the image 128.

The ratio applying unit 62E4 applies the first ratio 94A that is derived according to the reliability degree of the second region 88E2 to the image region corresponding to the second region 88E2 among all the image regions in the image 124. Further, the ratio applying unit 62E4 applies the second ratio 94B that is derived according to the reliability degree of the second region 88E2 to the image region corresponding to the second region 88E2 among all the image regions in the image 128.

The composition unit 62F4 generates a composite image 100D by combining the image 124 and the image 128 at the first ratio 94A and the second ratio 94B in the same manner as in each of the embodiments described above. That is, an image region corresponding to the afterimage region 130 among all the image regions in image 124 is combined at a higher ratio (here, as an example, "1.0") than an image region corresponding to the afterimage region 130 among all the image regions in image 128. Further, an image region corresponding to a region other than the afterimage region 130 among all the image regions in image 128 is combined at a higher ratio (here, as an example, "1.0") than an image region corresponding to a region other than the afterimage region 130 among all the image regions in image 124. As a result, it is possible to obtain the composite image 100D with reduced heat wave and less afterimage of the moving body as compared with the case where the image 124 and the image 128 are combined at a predetermined ratio without considering the afterimage region 130 that is captured in the image 128.

Seventh Embodiment

In the present sixth embodiment described above, an example of the embodiment in which the reflection of the heat wave in the image is reduced has been described, and in the present seventh embodiment, an example of the embodiment in which the reflection of haze in the image will be described.

Figure 23:
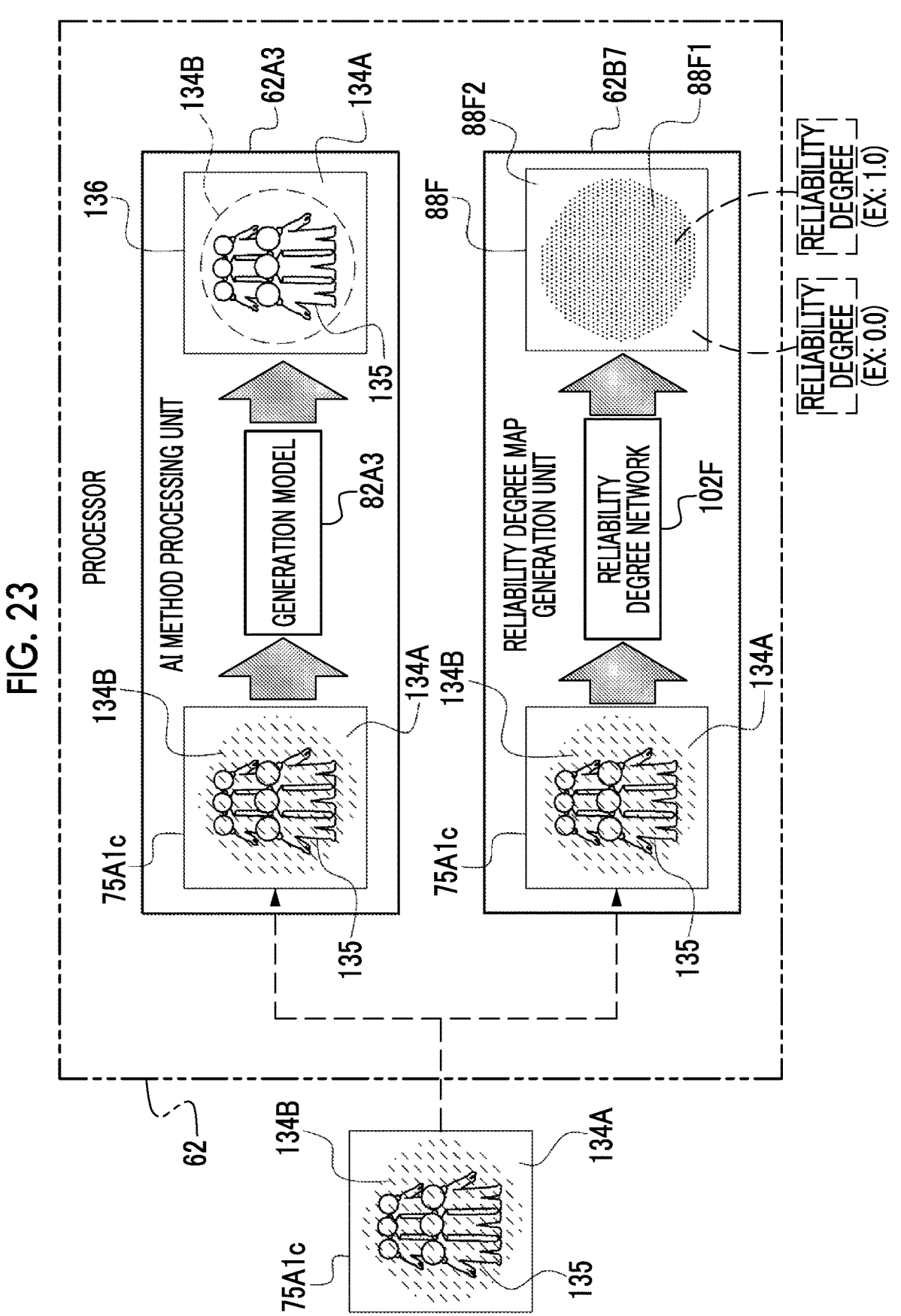
FIG. 23 is a conceptual diagram showing an example of the content of processing of the AI method processing unit and the reliability degree map generation unit according to a seventh embodiment.
Figure 24:
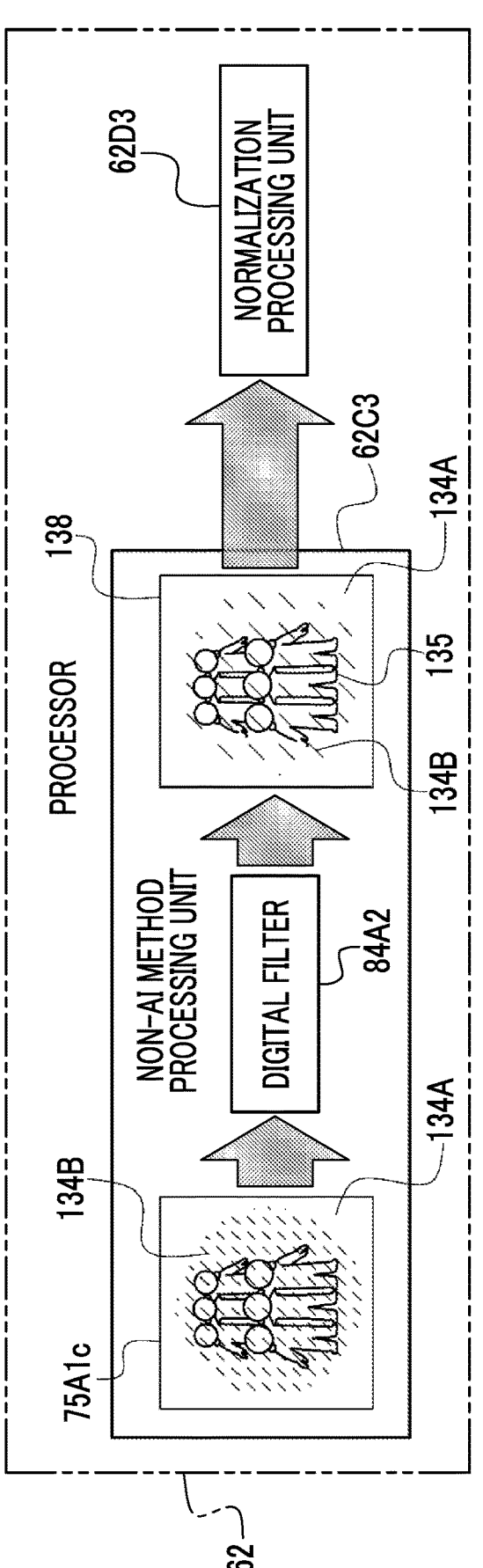
FIG. 24 is a conceptual diagram showing an example of the content of processing of the non-AI method processing unit according to the seventh embodiment.
Figure 25:
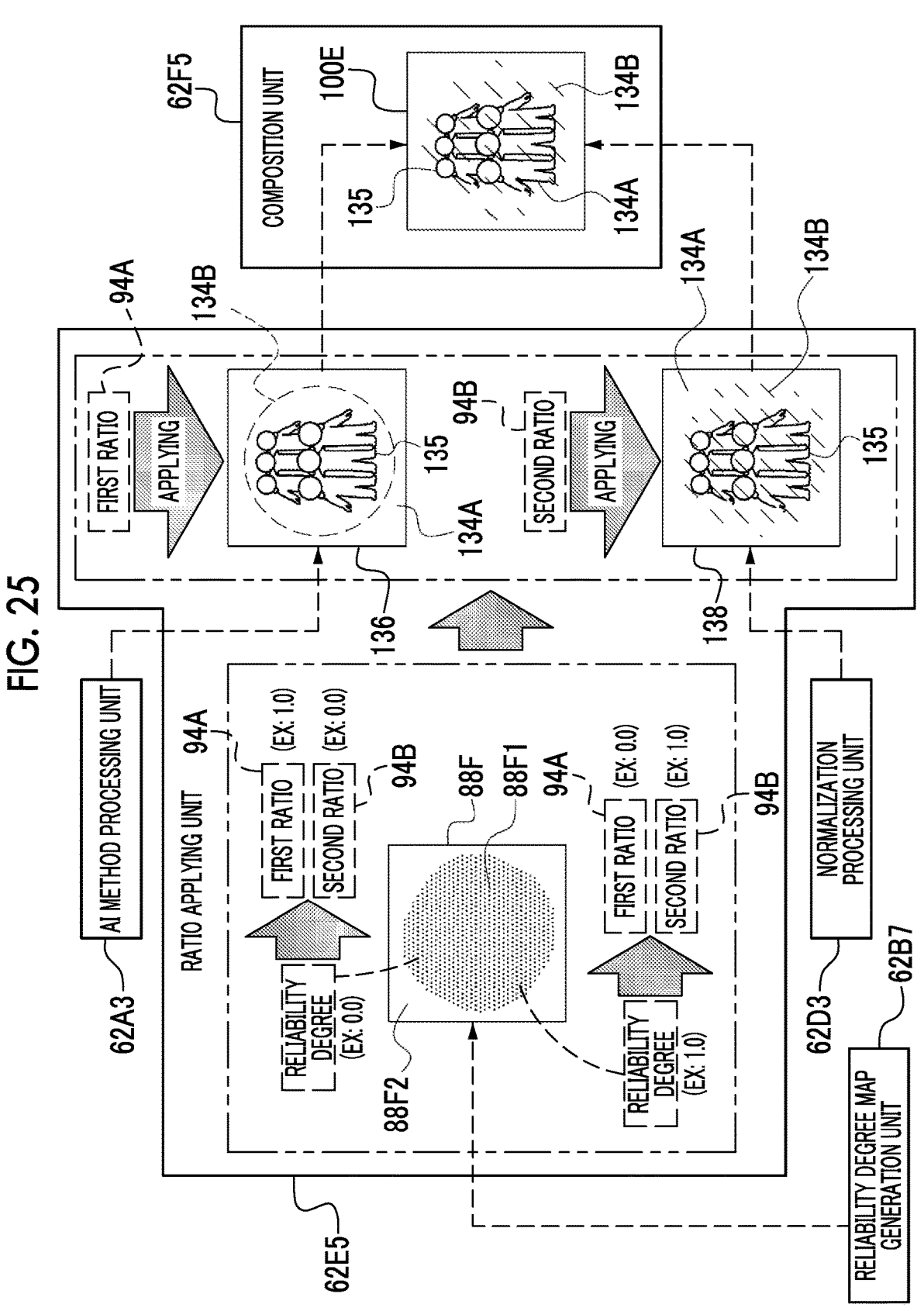
FIG. 25 is a conceptual diagram showing an example of the content of processing of the ratio applying unit and the composition unit according to the seventh embodiment.

As an example shown in FIGS. 23 to 25, the processor 62 operates as an AI method processing unit 62A3, a reliability degree map generation unit 62B7, a non-AI method processing unit 62C3, a normalization processing unit 62D3, a ratio applying unit 62E5, and a composition unit 62F5 by executing an image composition processing program 132 (see FIG. 4) on the RAM 66.

As an example shown in FIG. 23, a captured image 75A1*c* is input to the AI method processing unit 62A3 and the reliability degree map generation unit 62B7. The captured image 75A1*c* is an example of the captured image 75A1 shown in FIG. 3. The captured image 75A1*c* includes a non-haze region 134A and a haze region 134B. The captured image 75A1*c* is an example of a "first image" and an "image obtained by imaging a subject including haze" according to the present disclosed technology. The non-haze region 134A and the haze region 134B are examples of an "indicator" and "information that is capable of specifying a haze region" according to the present disclosed technology.

The non-haze region 134A is an image region where the haze is not captured (that is, an image region other than the haze region 134B). The haze region 134B is an image region where the haze is captured. In the example shown in FIG. 23, the haze region 134B includes a person region 135 where a person is captured. The haze that is captured in the captured image 75A1*c* is an example of "haze" according to the present disclosed technology. The haze region 134B is an example of a "haze region" according to the present disclosed technology.

The AI method processing unit 62A3 generates an image 136 by performing the AI method processing on the captured image 75A1*c*. The AI method processing with respect to the captured image 75A1c refers, for example, processing that uses the generation model 82A3. The generation model 82A3 is an example of the generation model 82A shown in FIG. 4. The AI method processing with respect to the captured image 75A1c is an example of "first AI processing" according to the present disclosed technology. The generation model 82A3 is a generation network in which a training of reducing the haze that is captured in the image was already performed. The image 136 is an image in which the haze that is captured in the captured image 75A1c is erased. Here, although an image in which the haze that is captured in the captured image 75A1c is erased is exemplified as the image 136, this is only an example, and the image 136 may be an image in which the haze is not completely erased and remains slightly, and the image 136 may be an image in which reflection of the haze is reduced compared to the captured image 75A1c. Further, the image 136 is an example of a "second image" and an "image in which the reflection of haze is reduced from a first image by performing first AI processing on the first image" according to the present disclosed technology.

The reliability degree map generation unit 62B7 performs processing that uses a reliability degree network 102F. For example, the reliability degree network 102F generates a reliability degree map 88F based on the input captured image 75A1c. The reliability degree network 102F is a convolutional neural network capable of detecting the haze region 134B, and the reliability degree map 88F is generated based on a feature amount map obtained from an interlayer of the reliability degree network 102F.

The reliability degree map 88F is a map showing a distribution of the reliability degrees (that is, the reliable degrees) with respect to the haze region 134B and is formed to have the same size as the captured image 75A1c. The reliability degree map 88F includes a first region 88F1 and a second region 88F2. The first region 88F1 is a region corresponding to the haze region 134B. The second region 88F2 is a region corresponding to the non-haze region 134A. In the example shown in FIG. 23, the reliability degree of the first region 88F1 is "1.0", and the reliability degree of the second region 88F2 is "0.0".

As an example shown in FIG. 24, the non-AI method processing unit 62C3 generates the image 138 by performing the non-AI method processing on the captured image 75A1c. The image 138 is an example of a "fourth image" and an "image obtained by performing non-AI method processing of reducing the reflection of the haze from a first image" according to the present disclosed technology.

An example of the non-AI method processing on the captured image 75A1c includes processing that uses the digital filter 84A2. The image 138 is an image in which the reflection of the haze is reduced as compared to the captured image 75A1c. An example of the image in which the reflection of the haze is reduced includes an image in which the reflection of the haze in the captured image 75A1c is not erased and remains slightly or an image in which the reflection of the haze in the captured image 75A1c is erased.

The non-AI method processing unit 62C3 generates the image 138 as described above and outputs the generated image 138 to the normalization processing unit 62D3. The normalization processing unit 62D3 normalizes the image 138 in the same manner as the normalization processing described in the first or second embodiment. Then, the image 138 normalized in this way is combined with the image 136 (see FIG. 23).

By the way, the performance of the generation model 82A3 may vary depending on a scene captured in the captured image 75A1c. In this case, there is a possibility that the reduction of the reflection of the haze is insufficient, or that a part of the non-haze region 134A is erroneously determined to be the haze region 134B and is erased. Further, there is a possibility that the reflection of the haze may be completely erased even though the user wants to leave a slight reflection of the haze.

Therefore, in the present seventh embodiment, the haze region 134B in the captured image 75A1c is specified by using the reliability degree map 88F in a previous step of combining the image 136 and the image 138, and the haze region 134B in the image 138 is used for combining the image 136 and the image 138 instead of the haze region 134B in the image 136.

In order to realize this, for example, as shown in FIG. 25, the ratio applying unit 62E5 derives a first ratio 94A and a second ratio 94B according to the reliability degree of the first region 88F1 in the reliability degree map 88F and derives the first ratio 94A and the second ratio 94B according to the reliability degree of the second region 88F2 in the reliability degree map 88F.

The reliability degree of the first region 88F1 is "1.0". In this case, in order to use the haze region 134B in the image 138 instead of the haze region 134B in the image 136 for combining the image 136 and the image 138, "1.0" is used as the first ratio 94A derived according to the reliability degree of the first region 88F1, and "0.0" is used as the second ratio 94B derived according to the reliability degree of the second region 88F2. The first ratio 94A, which is derived according to the reliability degree of the first region 88F1, may be a value larger than 0.5 in a range of 0.0 to 1.0. In this case, as a value of the second ratio 94B, a value obtained by subtracting the value of the first ratio 94A from 1.0 is used.

On the other hand, the reliability degree of the second region 88F2 is "0.0". In this case, the first ratio 94A that is derived according to the reliability degree of the second region 88F2 is "1.0", and the second ratio 94B that is derived according to the reliability degree of the second region 88F2 is "0.0".

The ratio applying unit 62E5 applies the first ratio 94A that is derived according to the reliability degree of the first region 88F1 to the haze region 134B in the image 136. Further, the ratio applying unit 62E5 applies the second ratio 94B that is derived according to the reliability degree of the first region 88F1 to the haze region 134B in the image 138.

The ratio applying unit 62E5 applies the first ratio 94A that is derived according to the reliability degree of the second region 88F2 to the non-haze region 134A in the image 136. Further, the ratio applying unit 62E5 applies the second ratio 94B that is derived according to the reliability degree of the second region 88F2 to the non-haze region 134A in the image 138.

The composition unit 62F5 generates a composite image 100E by combining the image 136 and the image 138 at the first ratio 94A and the second ratio 94B in the same manner as in each of the embodiments described above. That is, the haze region 134B in the image 138 is combined at a higher ratio than the haze region 134B in the image 136 (here, as an example, "1.0"). Further, the non-haze region 134A in the image 136 is combined at a higher ratio than the non-haze region 134A in the image 138 (here, as an example, "1.0"). Accordingly, it is possible to obtain the composite image 100E in which the reflection of the haze is reduced as compared with the captured image 75A1c. Further, it is possible to suppress that the degree to which the reflection of the haze is reduced in the composite image 100E becomes unstable due to the fact that the performance of the generation model 82A3 varies depending on the scene that is captured in the captured image 75A1c.

In the seventh embodiment described above, although an example of the embodiment in which the same captured image 75A1c is input to the AI method processing unit 62A3 and the non-AI method processing unit 62C3 has been described, this is only an example. For example, among the plurality of captured images 75A1c that are obtained by performing the continuous shooting, one captured image 75A1c of a pair of preceding and following captured images 75A1c in terms of time may be input to the AI method processing unit 62A3 and the other captured image 75A1c may be input to the non-AI method processing unit 62C3. In this case, one captured image 75A1c is an example of a "first image" according to the present disclosed technology, and the other captured image 75A1c is an example of a "third image" according to the present disclosed technology.

Eighth Embodiment

In each of the embodiments described above, an example of the embodiment in which a pair of images that are generated based on the visible light image is combined has been described, and in the present eighth embodiment, an example of the embodiment in which an infrared light image and an image generated based on a visible light image are combined.

Figure 26:
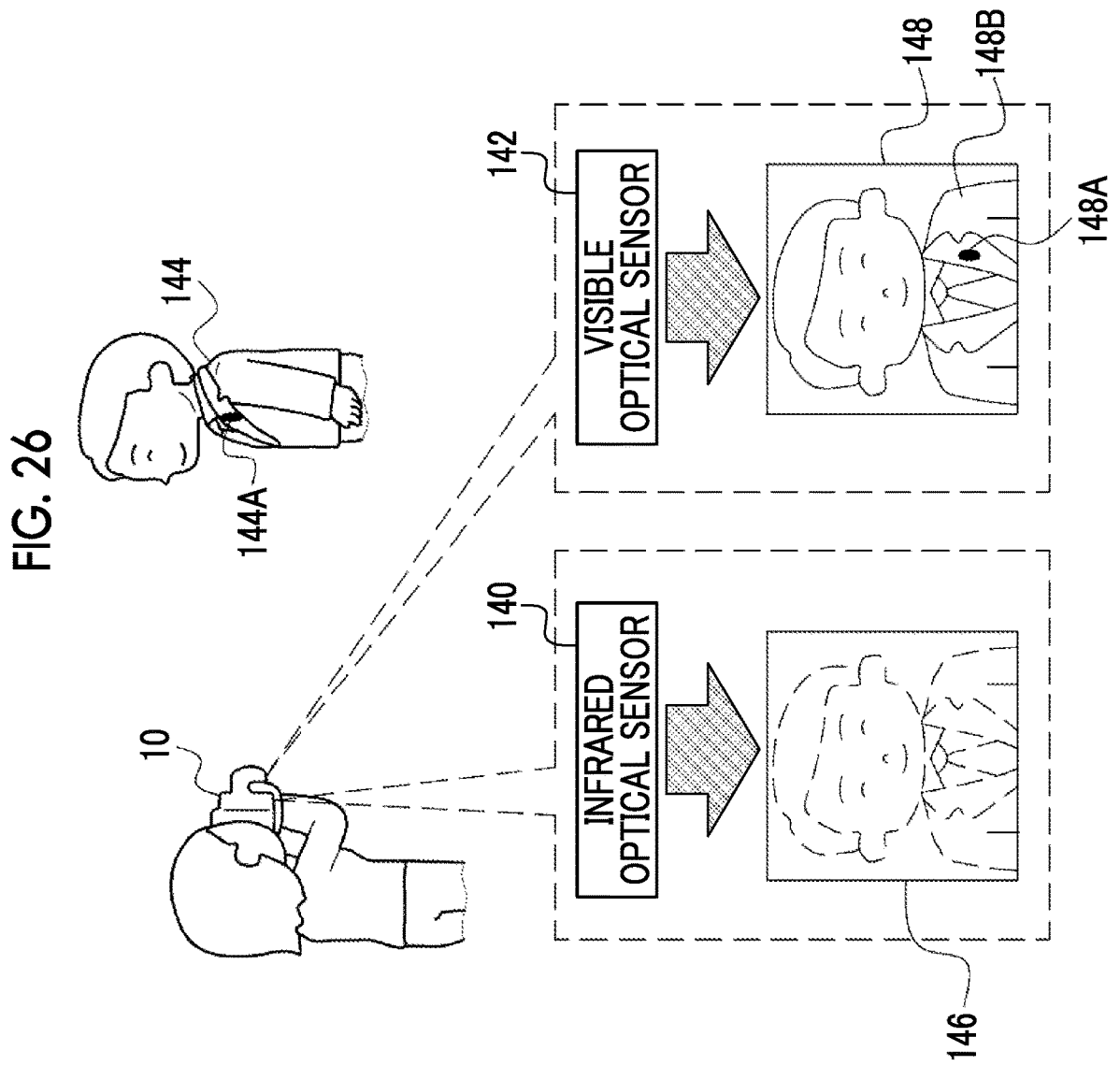
FIG. 26 is a conceptual diagram showing an example of an infrared light image and a visible light image generated by the imaging apparatus according to an eighth embodiment.

As an example shown in FIG. 26, the imaging apparatus 10 includes an infrared optical sensor 140 and a visible optical sensor 142. An example of the visible optical sensor 142 includes the image sensor 20 shown in FIGS. 1 to 3. The infrared optical sensor 140 is incorporated in the image sensor 20.

The infrared optical sensor 140 generates the infrared light image 146 by imaging a subject 144. The subject 144 is an example of an "imaging target region" according to the present disclosed technology. The infrared light image 146 is an example of a "third image" and an "infrared light image" according to the present disclosed technology. The visible optical sensor 142 generates the visible light image 148 by imaging the subject 144. The visible light image 148 is an example of a "first image" according to the present disclosed technology. The infrared light image 146 and the visible light image 148 are examples of the captured image 75A1 shown in FIG. 3.

A thermal radiator 144A is attached to a surface of the subject 144. The thermal radiator 144A is not reflected in the infrared light image 146 because the thermal radiation is small, but is reflected in the visible light image 148. The entire image region in the visible light image 148 is divided into an image region 148A showing the thermal radiator 144A and an image region 148B other than the image region 148A.

The image region 148A is an example of a "first region that is an image region showing a thermal radiator that is not captured in a first temperature distribution image in a second temperature distribution image" according to the present disclosed technology. The image region 148B is an example of a "second region that is an image region other than the first region" according to the present disclosed technology. The image region 148A and the image region 148B are examples of an "indicator" and "information capable of distinguishing between the first region, which is an image region showing a thermal radiator that is not captured in a first temperature distribution image in a second temperature distribution image, and a second region, which is an image region other than a thermal radiator region" according to the present disclosed technology.

Figure 27:
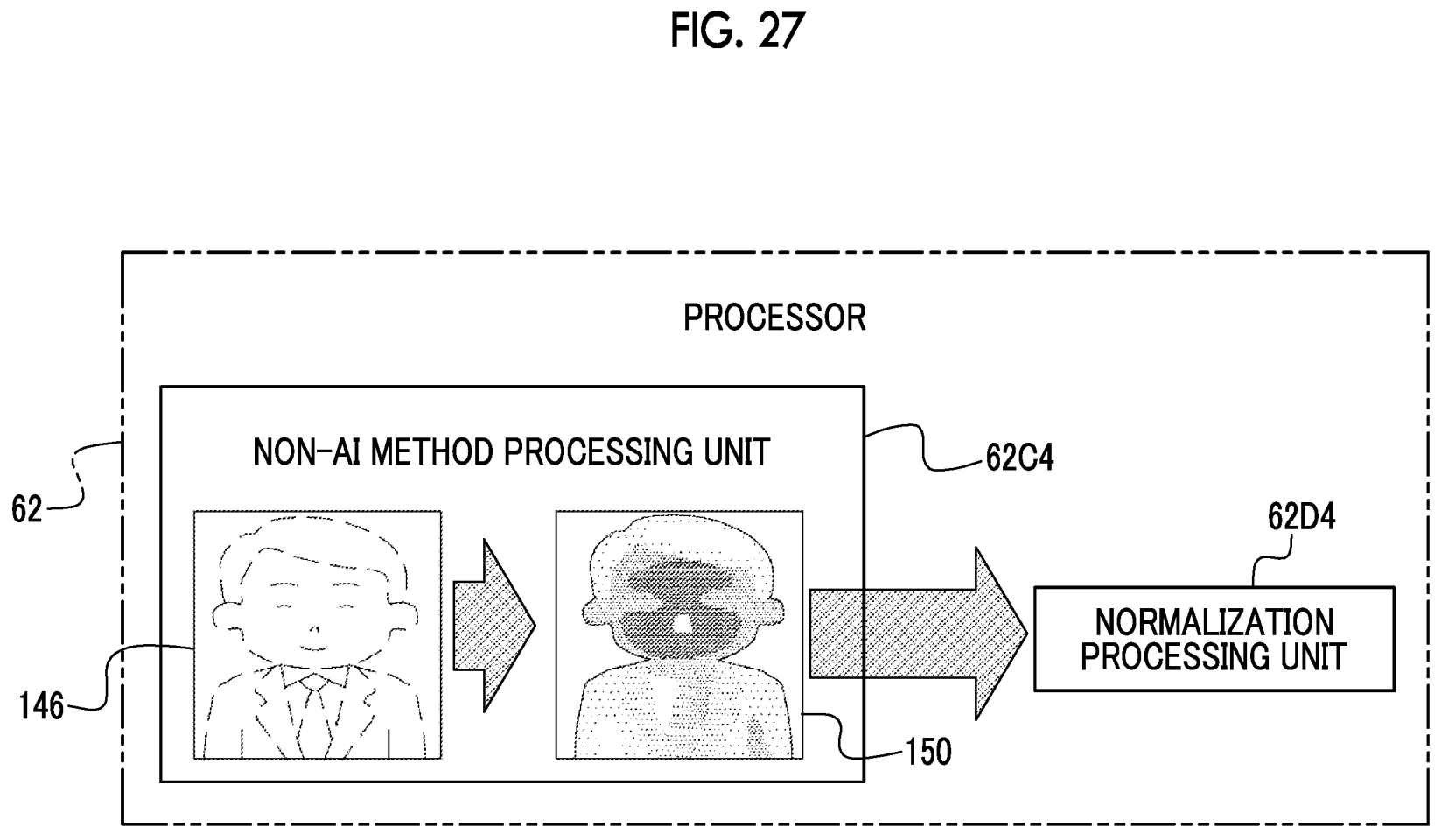
Figure 28:
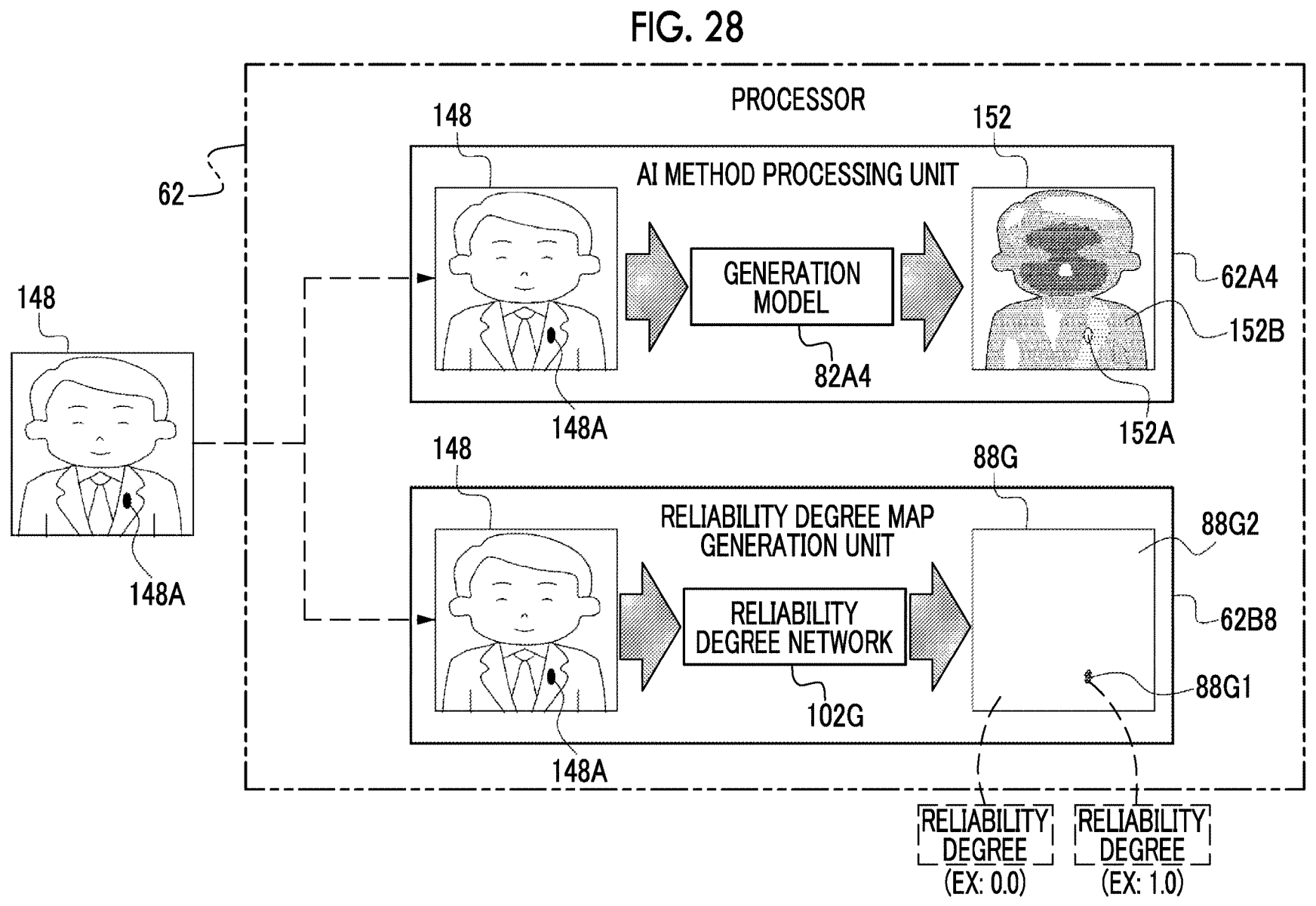
Figure 29:
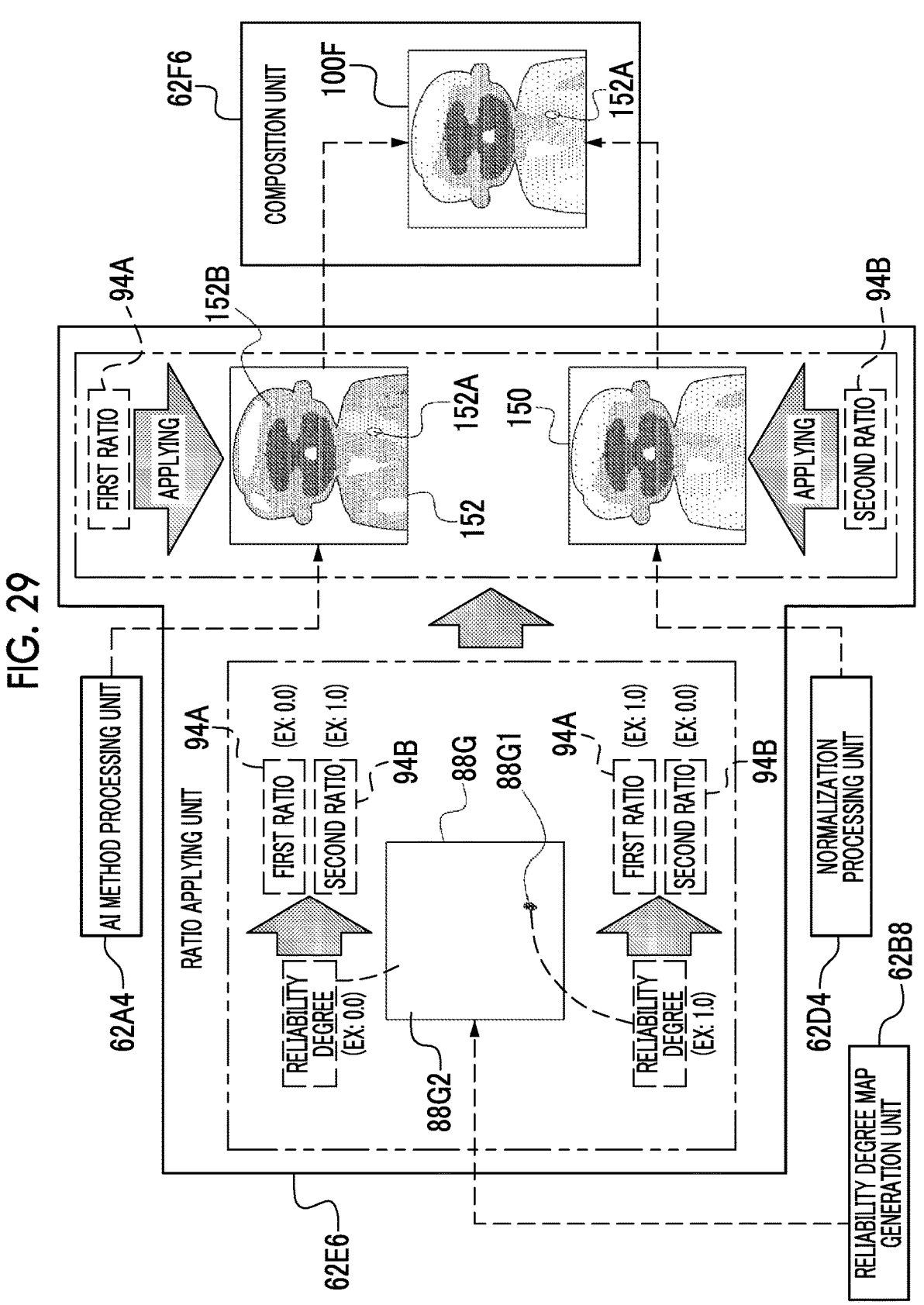
FIG. 29 is a conceptual diagram showing an example of the content of processing of the ratio applying unit and the composition unit according to the eighth embodiment.

As an example shown in FIGS. 27 to 29, the processor 62 operates as an AI method processing unit 62A4, a reliability degree map generation unit 62B8, a non-AI method processing unit 62C4, a normalization processing unit 62D4, a ratio applying unit 62E6, and a composition unit 62F6 by executing an image composition processing program 149 (see FIG. 4) on the RAM 66.

As an example shown in FIG. 27, the non-AI method processing unit 62C4 generates a first temperature distribution image 150 by performing the non-AT method processing on the infrared light image 146. The first temperature distribution image 150 is an example of a "first temperature distribution image" according to the present disclosed technology. The first temperature distribution image 150 is a so-called thermography. The non-AI method processing unit 62C4 specifies a distribution of temperature of the subject 144 by analyzing the infrared light image 146, generates an image that represents the distribution of the temperature of the subject 144 in chromatic colors as the first temperature distribution image 150, and outputs the image to the normalization processing unit 62D4. Since a method of generating the first temperature distribution image 150 based on the infrared light image 146 is known, the description thereof will be omitted here.

The normalization processing unit 62D4 normalizes the first temperature distribution image 150 in the same manner as the normalization processing described in the first or second embodiment.

As an example shown in FIG. 28, the visible light image 148 is input to the AI method processing unit 62A4 and the reliability degree map generation unit 62B8.

The AI method processing unit 62A4 generates a second temperature distribution image 152 by performing the AI method processing on the visible light image 148. The AI method processing with respect to the visible light image 148 is an example of "first AI processing" according to the present disclosed technology. The second temperature distribution image 152 is an example of a "second temperature distribution image" according to the present disclosed technology. The AI method processing with respect to the visible light image 148 refers to, for example, processing that uses the generation model 82A4. The generation model 82A4 is an example of the generation model 82A shown in FIG. 4. The generation model 82A4 is a generation network in which a training of generating an image (that is, a thermography) that represents the distribution of the temperature of the subject in chromatic colors from an image obtained by imaging visible light, was already performed.

The second temperature distribution image 152 is an image (that is, a thermography) that represents the distribution of the temperature of the subject 144 and the thermal radiator 144A (see FIG. 26) shown by the visible light image 148 in chromatic colors. The entire image region in the second temperature distribution image 152 is divided into an image region 152A showing the thermal radiator 144A and an image region 152B other than the image region 152A. The position of the image region 152A in the second temperature distribution image 152 corresponds to a position of the image region 148A in the visible light image 148.

The reliability degree map generation unit 62B8 performs processing that uses a reliability degree network 102G For example, the reliability degree network 102G generates a reliability degree map 88G based on the input visible light image 148. The reliability degree network 102G is a convolutional neural network capable of detecting an image showing the thermal radiator 144A, and the reliability degree map 88G is generated based on a feature amount map obtained from an interlayer of the reliability degree network 102G.

The reliability degree map 88G is a map showing a distribution of the reliability degrees (that is, the reliable degrees) with respect to the image region 148A and is formed to have the same size as the visible light image 148. The reliability degree map 88G includes a first region 88G1 and a second region 88G2. The first region 88G1 is a region corresponding to the image region 148A. The second region 88G2 is a region corresponding to the image region 148B. In the example shown in FIG. 28, the reliability degree of the first region 88G1 is "1.0", and the reliability degree of the second region 88G2 is "0.0".

By the way, the first temperature distribution image 150 does not include an image region showing the thermal radiator 144A. Therefore, the user cannot recognize that the thermal radiator 144A is attached to the subject 144 only by visually recognizing the first temperature distribution image 150.

Therefore, in the present eighth embodiment, in order to allow the user to visually specify the fact that the thermal radiator 144A is attached to the subject 144 from the image, the first temperature distribution image 150 and the second temperature distribution image 152, which includes the image region 152A showing the thermal radiator 144A, are combined.

In order to realize this, for example, as shown in FIG. 29, the ratio applying unit 62E6 derives a first ratio 94A and a second ratio 94B according to the reliability degree of the first region 88G1 in the reliability degree map 88G and derives the first ratio 94A and the second ratio 94B according to the reliability degree of the second region 88G2 in the reliability degree map 88G.

The reliability degree of the first region 88G1 is "1.0". In this case, in order to visualize the image region 152A showing the thermal radiator 144A by combining the first temperature distribution image 150 and the second temperature distribution image 152, "1.0" is used as the first ratio 94A that is derived according to the reliability degree of the first region 88G1, and "0.0" is used as the second ratio 94B that is derived according to the reliability degree of the first region 88G1.

Here, although an example of the embodiment in which "1.0" is used as the first ratio 94A and "0.0" is used as the second ratio 94B has been described, the present disclosed technology is not limited to this. For example, respective values of the first ratio 94A and the second ratio 94B may be values at which the image region 152A, which shows the thermal radiator 144A in a case where the first temperature distribution image 150 and the second temperature distribution image 152 are combined according to the first ratio 94A and the second ratio 94B, is visualized.

On the other hand, the reliability degree of the second region 88G2 is "0.0". In this case, the first ratio 94A that is derived according to the reliability degree of the second region 88G2 is "0.0", and the second ratio 94B that is derived according to the reliability degree of the second region 88G2 is "1.0".

The ratio applying unit 62E6 applies the first ratio 94A that is derived according to the reliability degree of the first region 88G1 to the image region 152A in the second temperature distribution image 152. Further, the ratio applying unit 62E6 applies the second ratio 94B that is derived according to the reliability degree of the first region 88G1 to an image region corresponding to the image region 152A among all the image regions in the first temperature distribution image 150.

The ratio applying unit 62E6 applies the first ratio 94A that is derived according to the reliability degree of the second region 88G2 to the image region 152B in the second temperature distribution image 152. Further, the ratio applying unit 62E6 applies the second ratio 94B that is derived according to the reliability degree of the second region 88G2 to an image region corresponding to the image region 152B among all the image regions in the first temperature distribution image 150.

The composition unit 62F6 generates a composite image 100F by combining the first temperature distribution image 150 and the second temperature distribution image 152 at the first ratio 94A and the second ratio 94B in the same manner as in each of the embodiments described above. That is, the image region 152A in the second temperature distribution image 152 is combined at a higher ratio (here, as an example, "1.0") than an image region corresponding to the image region 152A among all the image regions in the first temperature distribution image 150. Further, the image region corresponding to the image region 152B among all the image regions in the first temperature distribution image 150 is combined at a higher ratio (here, as an example, "1.0") than the image region 152B in the second temperature distribution image 152. Accordingly, since the image region 152A that shows the thermal radiator 144A is visualized in the composite image 100F, the user can understand that the thermal radiator 144A is attached to the subject 144 through the composite image 100F.

Ninth Embodiment

Figure 30:
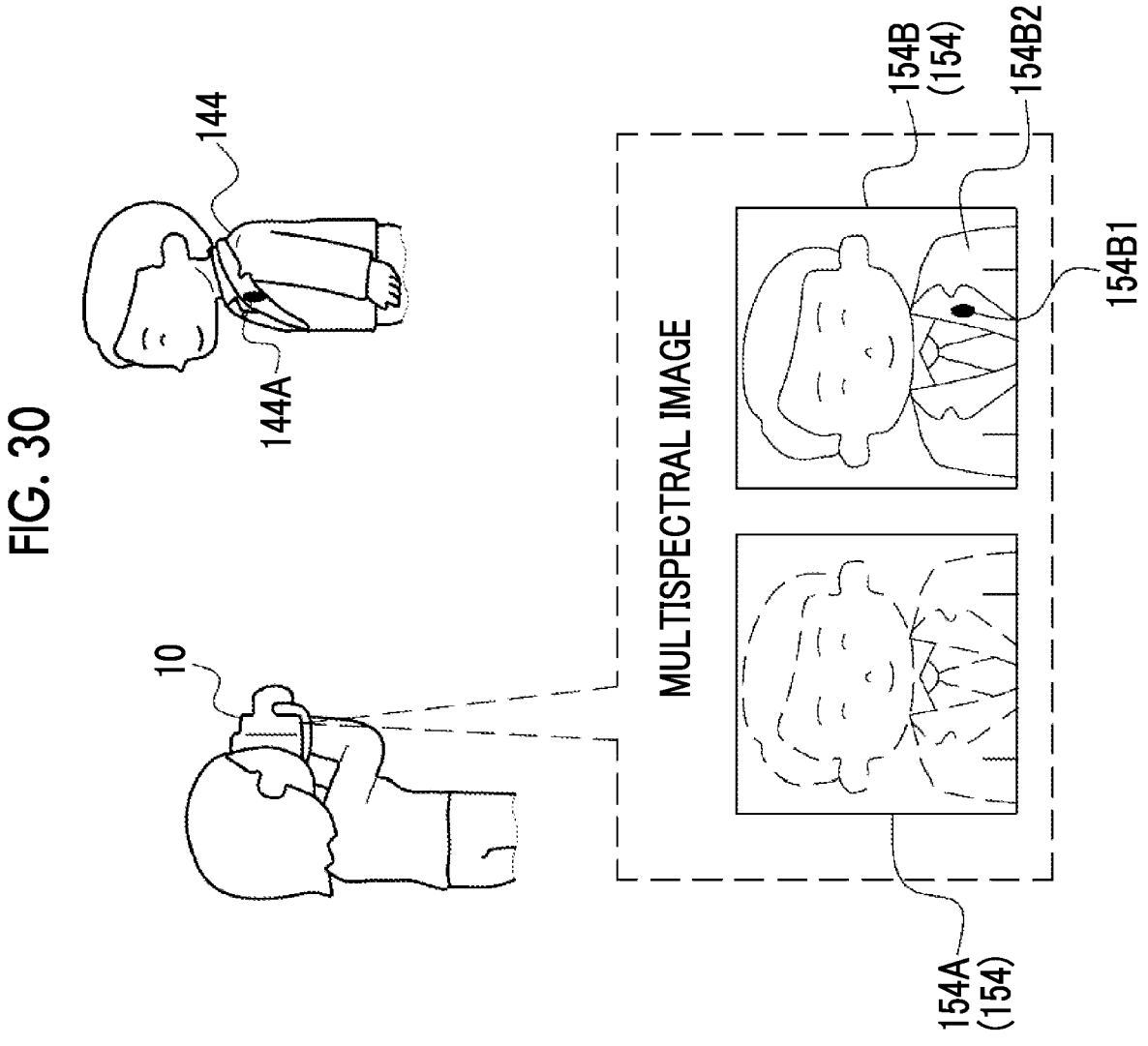
FIG. 30 is a conceptual diagram showing an example of a multispectral image generated by the imaging apparatus according to a ninth embodiment.

In the eighth embodiment described above, although an example of the embodiment in which the infrared light image 146 is generated by imaging the subject 144 by using the infrared optical sensor 140, and the visible light image 148 is generated by imaging the subject 144 by using the visible optical sensor 142 has been described, the present disclosed technology is not limited to this. For example, as shown in FIG. 30, the imaging apparatus 10 may be configured to function as a multispectral camera, and a multispectral image 154 that shows the subject 144 may be generated by imaging the subject 144 by the imaging apparatus 10.

The multispectral image 154 is an image that can be separated into a plurality of wavelength bandwidths. In the example shown in FIG. 30, an image that includes an infrared light image 154A and a visible light image 154B is shown as the multispectral image 154. The entire image region in the visible light image 154B is divided into an image region 154B1 and an image region 154B2. The image region 154B1 is an image region corresponding to the image region 148A in the eighth embodiment described above, and the image region 154B2 is an image region corresponding to the image region 148B in the eighth embodiment described above.

In the present ninth embodiment, the first temperature distribution image 150 (see FIG. 27) is generated based on the infrared light image 154A in the same manner as in the eighth embodiment described above. Further, in the present ninth embodiment, the second temperature distribution image 152 (see FIG. 28) is generated based on the visible light image 154B in the same manner as in the eighth embodiment described above. Further, in the present ninth embodiment, the reliability degree map 88G (see FIG. 28) is generated based on the visible light image 154B in the same manner as in the eighth embodiment described above. Therefore, even in a case where the imaging apparatus 10 is configured to function as a multispectral camera and the multispectral image 154 is generated by the imaging apparatus 10, the same effect as that of the eighth embodiment can be obtained.

In the present ninth embodiment, the multispectral image 154 is an example of a "multispectral image" according to the present disclosed technology. Further, the first temperature distribution image 150 that is generated based on the infrared light image 154A is an example of a "fourth image" and an "image based on a multispectral image" according to the present disclosed technology. Further, the second temperature distribution image 152 that is generated based on the visible light image 154B is an example of a "second image" and an "image obtained by performing first AI processing on a multispectral image", according to the present disclosed technology. Further, the image region 154B1 is an example of a "specific subject region" according to the present disclosed technology. Further, the image region 154B2 is an example of a "non-specific subject region" according to the present disclosed technology. Further, the image region 154B1 and the image region 154B2 are examples of an "indicator" and "information capable of distinguishing between a specific subject region that is an image region showing a specific subject and a non-specific subject region that is an image region other than the specific subject region in a second image" according to the present disclosed technology. Further, the subject 144 shown in FIG. 30 is an example of a "subject" according to the present disclosed technology. Further, the thermal radiator 144A shown in FIG. 30 is an example of a "specific subject" according to the present disclosed technology.

OTHER MODIFICATION EXAMPLES

In the following, for convenience of explanation, in a case where it is not necessary to distinguish among the image composition processing programs 80, 121, 132, and 149, a term "image composition processing program" will be used without reference numerals. Further, in the following description, for convenience of explanation, in a case where it is not necessary to distinguish among the composite images 100A to 100F, a term "composite image 100A" will be used.

Although the phase difference image 75A2 is exemplified as an example of the "third image" according to the present disclosed technology in the first embodiment, and the infrared light image 146 is exemplified as an example of the "third image" according to the present disclosed technology in the eighth embodiment, these are only examples. Examples of the "third image" according to the present disclosed technology include the following eight images.

The first image is an image (hereinafter, referred to as a "first unprocessed image") in which the above-described AI method processing or the above-described non-AI method processing is not performed. An example of the first unprocessed image includes an image (for example, a visible light image or a non-visible light image) represented by RAW data. The second image is an image obtained by performing non-AI method processing on the first unprocessed image. The third image is an image obtained by performing the AI processing that is different from the processing described as an example of the "first AI processing" according to the present disclosed technology, on the first unprocessed image. The fourth image is an image obtained by performing the AI processing that is different from the processing described as an example of the "first AI processing" according to the present disclosed technology and by performing the non-AT processing, on the first unprocessed image. The fifth image is an image (hereinafter, referred to as a "second unprocessed image") in which a subject that is shown in the first unprocessed image is represented by using a representation method (for example, a method of creating a phase difference image) different from the representation method (for example, a method of creating a visible light image) of the first unprocessed image. The sixth image is an image (for example, a distance image) obtained by performing the non-AI processing on the second unprocessed image. The seventh image is an image (for example, a distance image) obtained by performing the AI processing that is different from the processing described as an example of the "first AI processing" according to the present disclosed technology, on the second unprocessed image. The eighth image is an image obtained by performing the AI processing, which is different from the processing described as an example of the "first AI processing" according to the present disclosed technology and by performing the non-AI processing, on the second unprocessed image (for example, an image obtained by generating a distance image by using the AI processing and performing the non-AI processing such as filtering processing on the generated distance image).

In each of the embodiments described above, although an example of the embodiment in which the processor 62 performs the processing that uses the generation model 82A has been described, a plurality of types of the generation models 82A may be used by the processor 62 depending on a condition. For example, the generation model 82A, which is used by the processor 62, may be switched according to an imaging scene imaged by the imaging apparatus 10. Further, the ratio 94 may be changed according to the generation model 82A that is used by the processor 62.

In each of the embodiments described above, although an example of the embodiment in which the image composition processing is performed by the processor 62 of the image processing engine 12 included in the imaging apparatus 10 has been described, the present disclosed technology is not limited to this, and a device that performs the image composition processing may be provided outside the imaging apparatus 10. In this case, as an example shown in FIG. 31, the imaging system 160 may be used. The imaging system 160 includes the imaging apparatus 10 and an external apparatus 162. The external apparatus 162 is, for example, a server. The server is implemented by cloud computing, for example. Here, although the cloud computing is exemplified, this is only an example, and for example, the server may be implemented by a mainframe or implemented by network computing such as fog computing, edge computing, or grid computing. Here, although a server is exemplified as an example of the external apparatus 162, this is only an example, and at least one personal computer or the like may be used as the external apparatus 162 instead of the server.

The external apparatus 162 includes a processor 164, an NVM 166, a RAM 168, and a communication I/F 170, and the processor 164, the NVM 166, the RAM 168, and the communication I/F 170 are connected via a bus 172. The communication I/F 170 is connected to the imaging apparatus 10 via the network 174. The network 174 is, for example, the Internet. The network 174 is not limited to the Internet and may be a WAN and/or a LAN such as an intranet or the like.

The image composition processing program, the generation model 82A, and the digital filter 84A are stored in the NVM 166. The processor 164 executes the image composition processing program on the RAM 168. The processor 164 performs the above described image composition processing according to the image composition processing program executed on the RAM 168. In a case where the image composition processing is performed, the processor 164 processes the processing target image 75A by using the generation model 82A and the digital filter 84A as described in each of the embodiments described above. The processing target image 75A is transmitted from the imaging apparatus 10 to the external apparatus 162 via the network 174, for example. The communication I/F 170 of the external apparatus 162 receives the processing target image 75A. The processor 164 performs the image composition processing on the processing target image 75A received via the communication I/F 170. The processor 164 generates the composite image 100A by performing the image composition processing and transmits the generated composite image 100A to the imaging apparatus 10. The imaging apparatus 10 receives the composite image 100A, which is transmitted from the external apparatus 162, via the communication I/F 52 (see FIG. 2).

Figure 31:
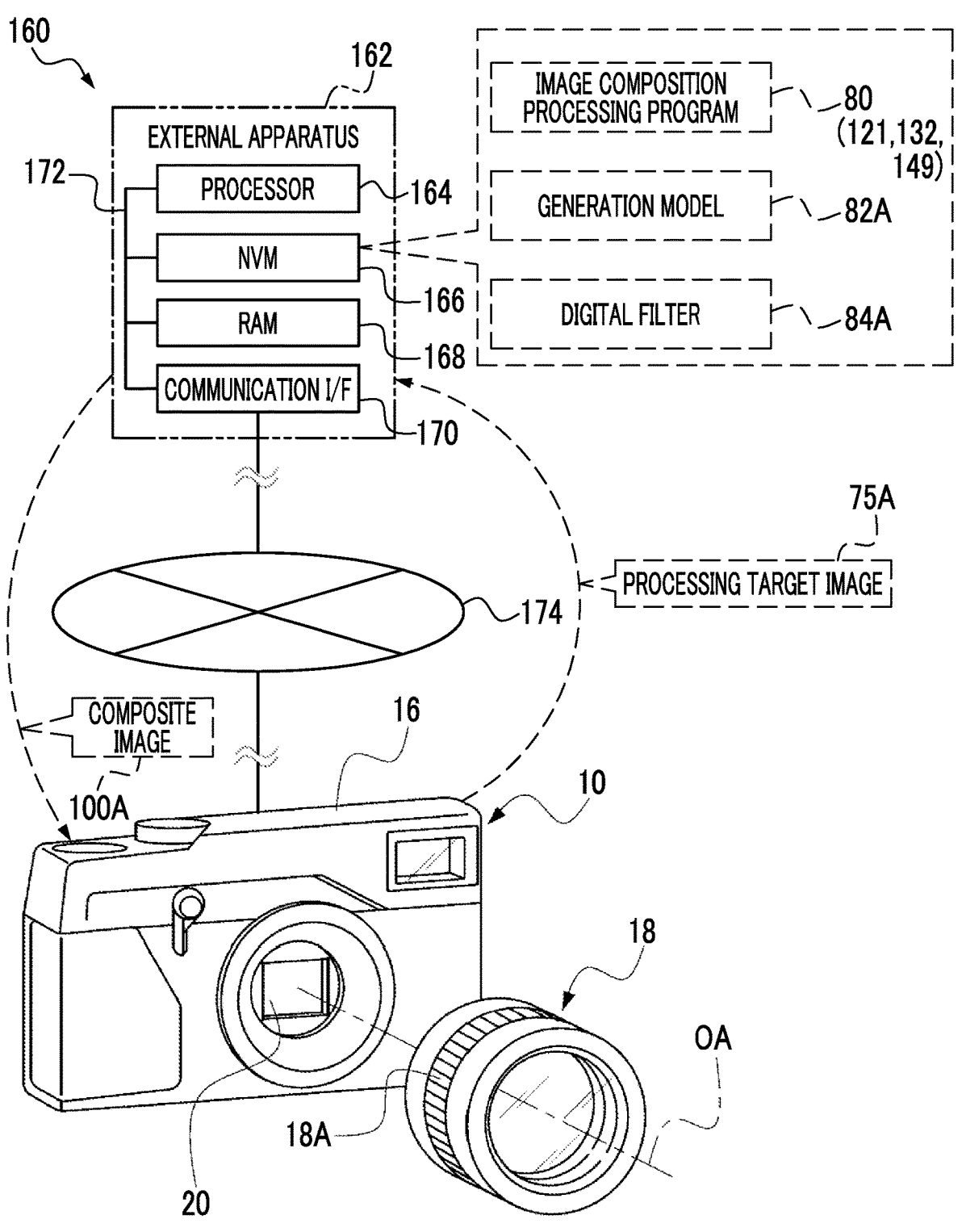
FIG. 31 is a conceptual diagram showing an example of a configuration of an imaging system.

In the example shown in FIG. 31, the external apparatus 162 is an example of an "image processing apparatus" and a "computer" according to the present disclosed technology, and the processor 164 is an example of a "processor" according to the present disclosed technology.

Further, the image composition processing may be performed in a distributed manner by a plurality of apparatuses including the imaging apparatus 10 and the external apparatus 162.

In each of the embodiments described above, although the processor 62 is exemplified, at least one other CPU, at least one GPU, and/or at least one TPU may be used instead of the processor 62 or together with the processor 62.

In the above embodiment, although an example of the embodiment in which the image composition processing program is stored in the NVM 64 has been described, the present disclosed technology is not limited to this. For example, image composition processing program may be stored in a portable non-temporary storage medium such as an SSD or a USB memory. The image composition processing program stored in the non-temporary storage medium is installed in the image processing engine 12 of the imaging apparatus 10. The processor 62 executes the image composition processing according to the image composition processing program.

Further, the image composition processing program may be stored in the storage device such as another computer or a server device connected to the imaging apparatus 10 via the network, the image composition processing program may be downloaded in response to the request of the imaging apparatus 10, and the image composition processing program may be installed in the image processing engine 12.

It is not necessary to store all of the image composition processing programs in the storage device such as another computer or a server device connected to the imaging apparatus 10, or the NVM 64, and a part of the image composition processing program may be stored.

Further, although the imaging apparatus 10 shown in FIGS. 1 and 3 has a built-in image processing engine 12, the present disclosed technology is not limited to this, and for example, the image processing engine 12 may be provided outside the imaging apparatus 10.

In each of the embodiments described above, although the image processing engine 12 is exemplified, the present disclosed technology is not limited to this, and a device including an ASIC, FPGA, and/or PLD may be applied instead of the image processing engine 12. Further, instead of the image processing engine 12, a combination of a hardware configuration and a software configuration may be used.

As a hardware resource for executing the image composition processing described in the above embodiment, the following various types of processors can be used. Examples of the processor include software, that is, a CPU, which is a general-purpose processor that functions as a hardware resource for executing the image composition processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the image composition processing by using the memory.

The hardware resource for executing the image composition processing may be configured with one of these various types of processors or may be configured with a combination (for example, a combination of a plurality of FPGAs or a combination of a CPU and an FPGA) of two or more processors of the same type or different types. Further, the hardware resource for executing the image composition processing may be one processor.

As an example of configuring with one processor, first, one processor is configured with a combination of one or more CPUs and software, and there is an embodiment in which this processor functions as a hardware resource for executing the image composition processing. Secondly, as typified by SoC, there is an embodiment in which a processor that implements the functions of the entire system including a plurality of hardware resources for executing the image composition processing with one IC chip is used. As described above, the image composition processing is implemented by using one or more of the above-mentioned various types of processors as a hardware resource.

Further, as the hardware structure of these various types of processors, more specifically, an electric circuit in which circuit elements such as semiconductor elements are combined can be used. Further, the above-mentioned image composition processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are merely an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

What is claimed is:

1. An image processing apparatus comprising:
a processor,
wherein the processor is configured to:
　acquire a second image, which is obtained by performing first AI processing on a first image, and a fourth image, which is obtained without performing the first AI processing on the first image or a third image; and
　combine the second image and the fourth image according to an indicator of the first image and/or the third image,
wherein the first image is an image obtained by imaging a subject that includes haze,
the fourth image is an image obtained by performing non-AI method processing of reducing reflection of the haze from the first image,
the second image is an image in which the reflection of the haze is reduced from the first image by performing first AI processing on the first image,
the indicator includes information that is capable of specifying a haze region, which is an image region in the first image where the haze is captured, and
in a case where the second image and the fourth image are combined, an image region in the fourth image, which corresponds to the haze region specified based on the indicator, is combined at a higher ratio than an image region in the second image, which corresponds to the haze region specified based on the indicator.

2. An image processing apparatus comprising:
a processor,
wherein the processor is configured to:
　acquire a second image, which is obtained by performing first AI processing on a first image, and a fourth image, which is obtained without performing the first AI processing on the first image or a third image; and
　combine the second image and the fourth image according to an indicator of the first image and/or the third image,
wherein the third image is an infrared light image obtained by imaging an imaging target region,
the fourth image is a first temperature distribution image that shows a distribution of temperature within the imaging target region and that is based on the infrared light image,
the second image is a second temperature distribution image that shows a distribution of temperature within the imaging target region and that is obtained by performing the first AI processing on the first image,
the indicator includes information that is capable of distinguishing between a first region, which is an image region showing a thermal radiator that is not captured in the first temperature distribution image, and a second region, which is an image region other than the first region, in the second temperature distribution image, and
in a case where the second image and the fourth image are combined, and based on the indicator,
　an image region in the first temperature distribution image, which corresponds to the second region, is combined at a higher ratio than the second region, and
　the first region is combined at a higher ratio than an image region in the first temperature distribution image, which corresponds to the first region.

3. An image processing apparatus comprising:
a processor,
wherein the processor is configured to:
　acquire a second image, which is obtained by performing first AI processing on a first image, and a fourth image, which is obtained without performing the first AI processing on the first image or a third image; and
　combine the second image and the fourth image according to an indicator of the first image and/or the third image,
wherein the third image is a multispectral image obtained by imaging a subject,
the fourth image is an image based on the multispectral image,
the second image is an image obtained by performing the first AI processing on the multispectral image,
the indicator includes information that is capable of distinguishing between a specific subject region, which is an image region that shows a specific subject, and a non-specific subject region, which is an image region other than the specific subject region, in the second image, and
in a case where the second image and the fourth image are combined, and based on the indicator,
　an image region in the fourth image, which corresponds to the non-specific subject region, is combined at a higher ratio than the non-specific subject region, and
　the specific subject region is combined at a higher ratio than an image region in the fourth image, which corresponds to the specific subject region.

4. An image processing method comprising:
acquiring a second image, which is obtained by performing first AI processing on a first image, and a fourth image, which is obtained without performing the first AI processing on the first image or a third image; and
combining the second image and the fourth image according to an indicator of the first image and/or the third image,
wherein the first image is an image obtained by imaging a subject that includes haze,
the fourth image is an image obtained by performing non-AI method processing of reducing reflection of the haze from the first image,
the second image is an image in which the reflection of the haze is reduced from the first image by performing first AI processing on the first image,
the indicator includes information that is capable of specifying a haze region, which is an image region in the first image where the haze is captured, and
in a case where the second image and the fourth image are combined, an image region in the fourth image, which corresponds to the haze region specified based on the indicator, is combined at a higher ratio than an image region in the second image, which corresponds to the haze region specified based on the indicator.

5. An image processing method comprising:

acquiring a second image, which is obtained by performing first AI processing on a first image, and a fourth image, which is obtained without performing the first AI processing on the first image or a third image; and combining the second image and the fourth image according to an indicator of the first image and/or the third image, wherein the third image is an infrared light image obtained by imaging an imaging target region, the fourth image is a first temperature distribution image that shows a distribution of temperature within the imaging target region and that is based on the infrared light image, the second image is a second temperature distribution image that shows a distribution of temperature within the imaging target region and that is obtained by performing the first AI processing on the first image, the indicator includes information that is capable of distinguishing between a first region, which is an image region showing a thermal radiator that is not captured in the first temperature distribution image, and a second region, which is an image region other than the first region, in the second temperature distribution image, and in a case where the second image and the fourth image are combined, and based on the indicator, an image region in the first temperature distribution image, which corresponds to the second region, is combined at a higher ratio than the second region, and the first region is combined at a higher ratio than an image region in the first temperature distribution image, which corresponds to the first region.

6. An image processing method comprising:

acquiring a second image, which is obtained by performing first AI processing on a first image, and a fourth image, which is obtained without performing the first AI processing on the first image or a third image; and combining the second image and the fourth image according to an indicator of the first image and/or the third image, wherein the third image is a multispectral image obtained by imaging a subject, the fourth image is an image based on the multispectral image, the second image is an image obtained by performing the first AI processing on the multispectral image, the indicator includes information that is capable of distinguishing between a specific subject region, which is an image region that shows a specific subject, and a non-specific subject region, which is an image region other than the specific subject region, in the second image, and in a case where the second image and the fourth image are combined, and based on the indicator, an image region in the fourth image, which corresponds to the non-specific subject region, is combined at a higher ratio than the non-specific subject region, and the specific subject region is combined at a higher ratio than an image region in the fourth image, which corresponds to the specific subject region.

7. A non-transitory computer-readable storage medium storing a program executable by a computer to perform a process comprising:

acquiring a second image, which is obtained by performing first AI processing on a first image, and a fourth image, which is obtained without performing the first AI processing on the first image or a third image; and combining the second image and the fourth image according to an indicator of the first image and/or the third image, wherein the first image is an image obtained by imaging a subject that includes haze, the fourth image is an image obtained by performing non-AI method processing of reducing reflection of the haze from the first image, the second image is an image in which the reflection of the haze is reduced from the first image by performing the first AI processing on the first image, the indicator includes information that is capable of specifying a haze region, which is an image region in the first image where the haze is captured, and in a case where the second image and the fourth image are combined, an image region in the fourth image, which corresponds to the haze region specified based on the indicator, is combined at a higher ratio than an image region in the second image, which corresponds to the haze region specified based on the indicator.

8. A non-transitory computer-readable storage medium storing a program executable by a computer to perform a process comprising:

acquiring a second image, which is obtained by performing first AI processing on a first image, and a fourth image, which is obtained without performing the first AI processing on the first image or a third image; and combining the second image and the fourth image according to an indicator of the first image and/or the third image, wherein the third image is an infrared light image obtained by imaging an imaging target region, the fourth image is a first temperature distribution image that shows a distribution of temperature within the imaging target region and that is based on the infrared light image, the second image is a second temperature distribution image that shows a distribution of temperature within the imaging target region and that is obtained by performing the first AI processing on the first image, the indicator includes information that is capable of distinguishing between a first region, which is an image region showing a thermal radiator that is not captured in the first temperature distribution image, and a second region, which is an image region other than the first region, in the second temperature distribution image, and in a case where the second image and the fourth image are combined, and based on the indicator, an image region in the first temperature distribution image, which corresponds to the second region, is combined at a higher ratio than the second region, and the first region is combined at a higher ratio than an image region in the first temperature distribution image, which corresponds to the first region.

9. A non-transitory computer-readable storage medium storing a program executable by a computer to perform a process comprising:

acquiring a second image, which is obtained by performing first AI processing on a first image, and a fourth image, which is obtained without performing the first AI processing on the first image or a third image; and combining the second image and the fourth image according to an indicator of the first image and/or the third image, wherein the third image is a multispectral image obtained by imaging a subject, the fourth image is an image based on the multispectral image, the second image is an image obtained by performing the first AI processing on the multispectral image, the indicator includes information that is capable of distinguishing between a specific subject region, which is an image region that shows a specific subject, and a non-specific subject region, which is an image region other than the specific subject region, in the second image, and in a case where the second image and the fourth image are combined, and based on the indicator, an image region in the fourth image, which corresponds to the non-specific subject region, is combined at a higher ratio than the non-specific subject region, and the specific subject region is combined at a higher ratio than an image region in the fourth image, which corresponds to the specific subject region.

\* \* \* \* \*